United States Patent
Dueck et al.

(10) Patent No.: US 9,607,326 B2
(45) Date of Patent: Mar. 28, 2017

(54) ORDER MANAGEMENT SYSTEM WITH A DECOMPOSITION SEQUENCE

(75) Inventors: Brian Dueck, Collingwood (CA); Ahmad Naser Abdelrahman, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 690 days.

(21) Appl. No.: 13/315,625

(22) Filed: Dec. 9, 2011

(65) Prior Publication Data

US 2012/0150583 A1  Jun. 14, 2012

Related U.S. Application Data

(60) Provisional application No. 61/422,423, filed on Dec. 13, 2010, provisional application No. 61/422,432, (Continued)

(51) Int. Cl.
*G06Q 30/04* (2012.01)
*G06Q 10/06* (2012.01)
(Continued)

(52) U.S. Cl.
CPC ....... *G06Q 30/04* (2013.01); *G06Q 10/06312* (2013.01); *G06Q 10/06316* (2013.01);
(Continued)

(58) Field of Classification Search
CPC ......... G06Q 30/00–30/08; G06Q 10/00–10/30
(Continued)

(56) References Cited

U.S. PATENT DOCUMENTS

| 5,666,493 A | 9/1997 | Wojcik et al. |
| 5,737,498 A | 4/1998 | Murray |

(Continued)

FOREIGN PATENT DOCUMENTS

| EP | 1892966 A1 | 2/2008 |
| WO | 01/06430 A1 | 1/2001 |

OTHER PUBLICATIONS

Siebel Order Management—An Overview ; Siebel Expert Services; http://siebeloracle.wordpress.com/2009/06/20/siebel-order-management-ther-order-management-life-cycle; Jun. 20, 2009.
(Continued)

*Primary Examiner* — Michael Misiaszek
(74) *Attorney, Agent, or Firm* — Miles & Stockbridge P.C.

(57) ABSTRACT

An order management system is provided. The order management system receives an order that includes one or more order lines, fulfillment topology data, and fulfillment flow data. The order management system generates one or more first order components from the order, the fulfillment topology data, and the fulfillment flow data based on a first criteria, where the first criteria is based on a first stage of a decomposition sequence, where the decomposition sequence comprises one or more stages. The order management system determines which of the one or more first order components each order line of the order is to be applied to, based on the first criteria. The order management system stores each order line of the order at each of the determined one or more first order components.

20 Claims, 55 Drawing Sheets

Related U.S. Application Data filed on Dec. 13, 2010, provisional application No. 61/422,436, filed on Dec. 13, 2010, provisional application No. 61/482,423, filed on May 4, 2011.

(51) Int. Cl.
 *G06Q 10/08* (2012.01)
 *G06Q 30/06* (2012.01)

(52) U.S. Cl.
 CPC ....... *G06Q 10/087* (2013.01); *G06Q 30/0601* (2013.01); *G06Q 30/0635* (2013.01)

(58) Field of Classification Search
 USPC .............................................. 705/26.1–27.2
 See application file for complete search history.

(56) References Cited

U.S. PATENT DOCUMENTS

| | | | |
|---|---|---|---|
| 5,745,687 | A | 4/1998 | Randell |
| 6,058,373 | A | 5/2000 | Blinn et al. |
| 6,539,386 | B1 | 3/2003 | Athavale et al. |
| 7,024,423 | B1 | 4/2006 | Aboujaoude et al. |
| 7,096,189 | B1 | 8/2006 | Srinivasan |
| 7,379,909 | B1 | 5/2008 | Cruz et al. |
| 7,448,046 | B2 | 11/2008 | Navani et al. |
| 7,469,219 | B2 | 12/2008 | Goldberg |
| 7,571,123 | B1 | 8/2009 | Hill et al. |
| 7,640,213 | B2 | 12/2009 | Reunert et al. |
| 7,693,791 | B2 | 4/2010 | Hahn-Carlson et al. |
| 7,707,055 | B2 | 4/2010 | Behmoiras et al. |
| 7,729,944 | B1 | 6/2010 | Peyser et al. |
| 7,765,291 | B1 | 7/2010 | Khan et al. |
| 2003/0171962 | A1 | 9/2003 | Hirth et al. |
| 2004/0220937 | A1 | 11/2004 | Bickford et al. |
| 2005/0004826 | A1 | 1/2005 | Chen et al. |
| 2005/0102192 | A1 | 5/2005 | Gerrits et al. |
| 2005/0197910 | A1 | 9/2005 | Wittmer et al. |
| 2005/0289013 | A1* | 12/2005 | Goldberg ........................ 705/26 |
| 2007/0050224 | A1 | 3/2007 | Malitski |
| 2008/0120189 | A1 | 5/2008 | Singh et al. |
| 2009/0012828 | A1 | 1/2009 | Brower, Jr. et al. |
| 2009/0043673 | A1* | 2/2009 | Caballero et al. .............. 705/26 |
| 2010/0121740 | A1 | 5/2010 | Reed et al. |
| 2010/0223159 | A1 | 9/2010 | MacKay et al. |
| 2010/0281456 | A1 | 11/2010 | Eizenman et al. |
| 2011/0218924 | A1 | 9/2011 | Addala et al. |
| 2011/0218925 | A1 | 9/2011 | Addala et al. |
| 2011/0302132 | A1 | 12/2011 | Muthuvelu |

OTHER PUBLICATIONS

"Rapid Offer Design and Order Delivery"; Oracle Communications; an Oracle White Paper, May 2010; http:/www.oracle.com/us/industries/communications/049176.pdf.

HP Operations Orchestration Software; https://h10078.www1.hp.conn/cda/hpms/display/main/hpms_content.jsp?zn=bto&cp=1-11-271-273%5E14694-4000-100; © 2010 Hewlett-Packard Develpment Company, L.P.

Daniel L. Moody et al.; "A Decomposition Method for Entity Relationship Models: A Systems Theoretic Approach"; 1st International Conference on Systems Thinking in Management; 2000; pp. 462-469; htpp://citeseerx.ist.psu.edu/viewdoc/summary?doi=10.1.1.142.8729&rep=rep1&type-pdf.

Vitria: Order AccelertorTM, Integrated Order Management; Vitria Telecommunications; © 2004 Vitria Technology, Inc.; http:www.eaibrasil.com.br/documentos/ingles/downlaod.php?file=vitria_voa_brochure.pdf.

H.J. Pels et al.; "Decomposition of Information Systems for Production Management"; North Holland Computers in Industry 6 (1985); 435-452; pp. 25-38; http://alexandria.tue.nl/repository/freearticles/612129.pdf.

Daniela Wunsch et al.; "Multilevel Order Decomposition in Distributed Production"; http://www.iiss.oeaw.ac.at/files/pub/2007-ETFA-Multilevel-Order-Decomposition-in-Distributed-Production.pdf; 2007.

Martin Owen et al.; BPMN and Business Process Management Introduction to the New Business Process Modeling Standard; © Pokin Software 2003; http:/www.omg.org/bpmn/Documents/6AD5D16960.BPMN_and_BPM.pdf.

Oracle Data Sheet; "Oracle commuinications Rapid Offer Design and Order Delivery Solution"; Copyright 2009, Oracle; htpp://www.oracle.com/us/industries/communicatins/rapid-offer-design-order-wp-077276.pdf.

Gera A. Welker et al.; "Formalisation of the Ordering Process"; SOM0theme A: Primary processes within firms; 2002; http://www.som.eldoc.ub.rug.nl/FILES/reports/themeA2002/02A08/02A08.pdf.

NetCracker Order Management; the Order Management Challenge; NetCracker Technology Corp.; Waltham, MA; http://www.netcracker.com/clmmon/pdf/NetCracker_Order_Management.pdf; downloaded Dec. 15, 2010.

Svetlana Mansmann et al.; "Hierarchy-driven Visual Exploration of Multidimensional Data Cubes"; University of Konstanz, Germany, Department of Computer & Information Science; pp. 96-111; 2007; http://www.inf.uni-konstanz.de/cgip/bib/files/MaMaSc07.pdf.

Tibco, "Order Management," http://www.tibco.com/industries/telecommunications/fulfillment-orchestration/order-management/default.jsp (last visited Mar. 2, 2012).

Amdocs, "Service Order Management," http://www.amdocs.com/products/oss/service-management/Pages/Service-Management.aspx (last visited Mar. 2, 2012).

TeleManagement (TM) Forum, "High-Level Guide for Managers: The Information Framework," Mar. 2010, TMFManager_Guides_InformationFramework.pdf, http://www.tmforum.org/BestPracticesStandards/InformationFramework/1684/Home.html (last visited Mar. 2, 2012).

Brian Dueck, et al., U.S. Appl. No. 13/315,597, filed Dec. 9, 2011.
Brian Dueck, U.S. Appl. No. 13/315,692, filed Dec. 9, 2011.
Brian Dueck, et al., U.S. Appl. No. 13/315,665, filed Dec. 9, 2011.
Brian Dueck, et al., U.S. Appl. No. 13/315,722, filed Dec. 9, 2011.

* cited by examiner

| Ln# | Action | Subject | Subject Type | Price | Billing Acct | Service Acct | Billing Profile |
|---|---|---|---|---|---|---|---|
| 1 | ADD | On Top of the World Broadband-VoIP | Offer | | Green ... | Dan ... | Bill Me |
| 2 | ADD | High Speed Internet Service | Bundle | | Green ... | Dan ... | Bill Me |
| 2.1 | ADD | Internet Service | Service Bundle | | Green ... | Dan ... | Bill Me |
| 2.1.1 | ADD | High Speed Internet Basic | Product | MRC $15 | Green ... | Dan ... | Bill Me |
| 2.1.2 | ADD | Internet Secure Firewall | Product | MRC $1 | Green ... | Dan ... | Bill Me |
| 2.1.3 | ADD | HIS First Month Free Discount | Discount | | Green ... | Dan ... | Bill Me |
| 2.1.4 | ADD | Electronic Mail | Service Bundle | | Green ... | Dan ... | Bill Me |
| 2.2 | ADD | Broadband Modem | Product | OTC $30 | Green ... | Dan ... | Bill Me |
| 2.3 | ADD | Wireless Router | Product | OTC $75 | Green ... | Dan ... | Bill Me |
| 2.4 | ADD | High Speed Internet Installation | Product | OTC $60 | Green ... | Dan ... | Bill Me |
| 2.5 | ADD | High Speed Internet Activation | Product | OTC $30 | Green ... | Dan ... | Bill Me |
| 3 | ADD | VoIP Service | Bundle | | Green ... | Dan ... | Bill Me |
| 3.1 | ADD | VoIP Service Plan | Service Bundle | | Green ... | Dan ... | Bill Me |
| 3.1.1 | ADD | VoIP Unlimited | Product | MRC $40 | Green ... | Dan ... | Bill Me |
| 3.1.2 | ADD | VoIP Recurring Discount | Discount | | Green ... | Dan ... | Bill Me |
| 3.1.3 | ADD | VoIP First Month Free Discount | Discount | | Green ... | Dan ... | Bill Me |
| 3.2 | ADD | VoIP Adaptor | Product | OTC $45 | Green ... | Dan ... | Bill Me |
| 3.3 | ADD | VoIP Phone | Product | OTC $50 | Green ... | Dan ... | Bill Me |
| 4 | ADD | High Speed Internet Activation Discount | Discount | | Green ... | Dan ... | Bill Me |

Sync Customer
On Top of the World Broadband-VoIP
High Speed Internet Service
Internet Service
High Speed Internet Basic
Internet Secure Firewall
HIS First Month Free Discount
Electronic Mail
Broadband Modem
Wireless Router
High Speed Internet Installation
High Speed Internet Activation
High Speed Internet Activation Discount

1020

Sync Customer VoIP
On Top of the World Broadband-VoIP
VoIP Service
VoIP Service Plan
VoIP Unlimited
VoIP Recurring Discount
VoIP First Month Free Discount
VoIP Adaptor
VoIP Phone

1030

Sync Customer
On Top of the World Broadband-VoIP
High Speed Internet Service
Internet Service
High Speed Internet Basic
Internet Secure Firewall
HIS First Month Free Discount
Electronic Mail
Broadband Modem
Wireless Router
High Speed Internet Installation
High Speed Internet Activation
VoIP Service
VoIP Service Plan
VoIP Unlimited
VoIP Recurring Discount
VoIP First Month Free Discount
VoIP Adaptor
VoIP Phone
High Speed Internet Activation Discount

| Ln# | Action | Subject | Subject Type | Price | Billing Acct | Service Acct | Billing Profile |
|---|---|---|---|---|---|---|---|
| 1 | -- | VoIP Service | Bundle | | Green .. | Dan .. | Bill Me |
| 1.1 | -- | VoIP Service Plan | Service Bundle | | Green .. | Dan .. | Bill Me |
| 1.1.1 | DELETE | VoIP Unlimited | Product | MRC $40 | Green .. | Dan .. | Bill Me |
| 1.1.2 | ADD | VoIP Basic | Product | MRC $15 | Green .. | Dan .. | Bill Me |
| 1.1.3 | -- | VoIP Recurring Discount | Discount | | Green .. | Dan .. | Bill Me |
| 1.1.4 | -- | VoIP First Month Free Discount | Discount | | Green .. | Dan .. | Bill Me |
| 1.2 | -- | VoIP Adaptor | Product | OTC $45 | Green .. | Dan .. | Bill Me |
| 1.3 | -- | VoIP Phone | Product | OTC $50 | Green .. | Dan .. | Bill Me |

Fig. 14

Change Order — 1400

| Ln# | Action | Subject | Subject Type | Price | Billing Acct | Service Acct | Billing Profile |
|---|---|---|---|---|---|---|---|
| 1 | -- | VoIP Service | Bundle | | Green .. | Dan .. | Bill Me |
| 1.1 | -- | VoIP Service Plan | Service Bundle | | Green .. | Dan .. | Bill Me |
| 1.1.1 | DELETE | VoIP Unlimited | Product | MRC $40 | Green .. | Dan .. | Bill Me |
| 1.1.2 | ADD | VoIP Basic | Product | MRC $15 | Green .. | Dan .. | Bill Me |
| 1.1.3 | -- | VoIP Recurring Discount | Discount | | Green .. | Dan .. | Bill Me |
| 1.1.4 | -- | VoIP First Month Free Discount | Discount | OTC $45 | Green .. | Dan .. | Bill Me |
| 1.2 | -- | VoIP Adaptor | Product | OTC $45 | Green .. | Dan .. | Bill Me |
| 1.3 | -- | VoIP Phone | Product | OTC $50 | Green .. | Dan .. | Bill Me |

1401  1402

Revision Order — 1900

| Ln# | Action | Subject | Subject Type | Price | Billing Acct | Service Acct | Billing Profile |
|---|---|---|---|---|---|---|---|
| 1 | -- | VoIP Service | Bundle | | Green .. | Dan .. | Bill Me |
| 1.1 | -- | VoIP Service Plan | Service Bundle | | Green .. | Dan .. | Bill Me |
| 1.1.1 | -- | VoIP Unlimited | Product | MRC $40 | Green .. | Dan .. | Bill Me |
| 1.1.2 | ADD | VoIP Voicemail | Product | MRC $1 | Green .. | Dan .. | Bill Me |
| 1.1.3 | -- | VoIP Recurring Discount | Discount | | Green .. | Dan .. | Bill Me |
| 1.1.4 | -- | VoIP First Month Free Discount | Discount | OTC $45 | Green .. | Dan .. | Bill Me |
| 1.2 | -- | VoIP Adaptor | Product | OTC $45 | Green .. | Dan .. | Bill Me |
| 1.3 | -- | VoIP Phone | Product | OTC $50 | Green .. | Dan .. | Bill Me |

| Fourth Modify Order 5550 | Order Component A 5551 | Order Component B 5552 | Order Component C 5553 | Order Component D 5554 | Order Component E 5555 |
| --- | --- | --- | --- | --- | --- |
| Third Modify Order 5540 | Order Component A 5541 | Order Component B 5542 | Order Component C 5543 | Order Component D 5544 | Order Component E 5545 |
| Second Modify Order 5530 | Order Component A 5531 | Order Component B 5532 | Order Component C 5533 | Order Component D 5534 | Order Component E 5535 |
| First Modify Order 5520 | Order Component A 5521 | Order Component B 5522 | Order Component C 5523 | Order Component D 5524 | Order Component E 5525 |
| Order 5510 | Order Component A 5511 | Order Component B 5512 | Order Component C 5513 | Order Component D 5514 | Order Component E 5515 |

Fig. 55

ORDER MANAGEMENT SYSTEM WITH A DECOMPOSITION SEQUENCE

CROSS-REFERENCE TO RELATED APPLICATIONS

This application claims priority of the following applications:
U.S. Provisional Patent Application Ser. No. 61/422,423, filed on Dec. 13, 2010 (the subject matter of which is herein incorporated by reference);
U.S. Provisional Patent Application Ser. No. 61/422,432, filed on Dec. 13, 2010 (the subject matter of which is herein incorporated by reference);
U.S. Provisional Patent Application Ser. No. 61/422,436, filed on Dec. 13, 2010 (the subject matter of which is herein incorporated by reference); and
U.S. Provisional Patent Application Ser. No. 61/482,423, filed on May 4, 2011 (the subject matter of which is herein incorporated by reference).

FIELD

One embodiment is directed to a computer system, and more particularly, to computer systems that provision services, such as telecommunication services.

BACKGROUND

Certain computer systems are used in a number of industries, such as the telecommunications industry, for order entry and order fulfillment. Order entry is the process of electronically receiving orders and entering the orders into the computer system, where the orders are stored as one or more entities within the computer system, so that the orders can be electronically fulfilled. Orders can contain data regarding one or more products, pricing of the one or more products, and one or more offers related to the one or more products. Orders can be received from any type of customer, such as businesses and individual consumers. Order fulfillment is the process of electronically fulfilling the orders, once the orders have been entered into the computer system. Order fulfillment generally entails one or more of the following steps: validating the order, interfacing the order to a billing system or subsystem, shipping physical goods, scheduling installation of equipment, installing equipment, and activating services. Order fulfillment can also entail other steps not listed that are part of a process of electronically fulfilling an order.

Prior computer systems would generally include a single static executable process (i.e., instance of a computer program) for electronically fulfilling an entered order. The static executable process, in general, would include a fixed number of steps, with each step performing one or more defined functions. The use of the static executable process in prior computer systems was effective because orders were generally static (i.e., did not change much), there were generally a small number of orders, and there was generally not a lot of variety in orders. Furthermore, because product offers were generally not rolled out more than once a year, the turnaround time for modifying the static executable process in light of new product offers had a minimal impact on an overall effectiveness of the prior computer systems.

However, changes to industries, such as the telecommunications industry, have rendered the single static executable process largely ineffective to handle today's order management challenges. Through the proliferation of technology, as well as the proliferation of services and technologies, orders have, in general, become more dynamic than they were in the past. Today, there are many variables and conditions that can affect an order, and these dynamic variables and conditions make it very difficult to fulfill an order using a static executable process. This is because a static executable process will usually require a significant amount of source code to handle all the different variables and conditions that could potentially affect an order. Furthermore, new product offers are generally rolled out on a much more frequent basis (for example every month, or even every week), which, in general, requires frequent modifications to the source code of the static executable process. Because of shrinking margins allotted for executable process development, the increased turnaround time for modifying source code of static executable processes has become a liability. In addition, due to bundling of one or more products (where the one or more products are offered together, as if they were a single product), an entire order may not be able to go through a single static executable process. Instead, one portion of the order may require a sequence of steps of the static executable process, but another portion may require a different sequence of steps of the static executable process. Such industry changes make it very difficult to utilize a single static executable process within a computer system to fulfill orders; short of building up complexity to levels that become unmanageable.

SUMMARY

One embodiment is directed to a computer-readable medium having instructions stored thereon that, when executed by a processor, cause the processor to execute a decomposition sequence. The instructions include receiving an order that includes one or more order lines, fulfillment topology data, and fulfillment flow data. The instructions further include generating one or more first order components from the order, the fulfillment topology data, and the fulfillment flow data based on a first criteria, where the first criteria is based on a first stage of the decomposition sequence, where the decomposition sequence comprises one or more stages. The instructions further includes determining which of the one or more first order components each order line of the order is to be applied to, based on the first criteria. The instructions further include storing each order line of the order at each of the determined one or more first order components.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 3 illustrates an example of an order, according to an embodiment of the invention.

FIG. 11 illustrates an example of a second decomposition stage of a decomposition sequence, according to an embodiment of the invention.

FIG. 14 illustrates an example of a change order, according to an embodiment of the invention.

FIG. 19 illustrates an example of a revision order that revises a change order, according to an embodiment of the invention.

FIG. 55 illustrates an example of order perspectives, according to an embodiment of the invention.

DETAILED DESCRIPTION

Figure 1:
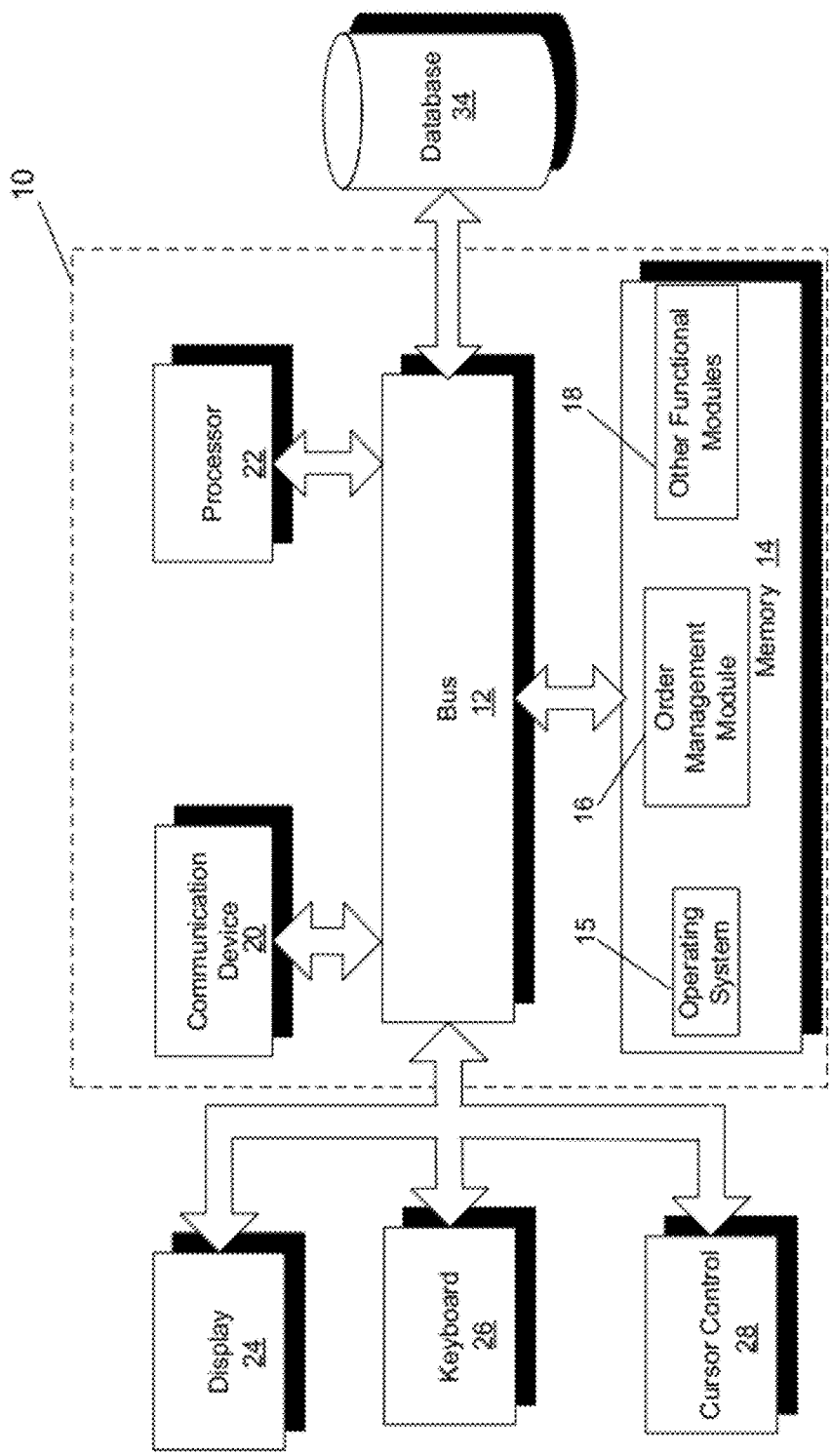
FIG. 1 illustrates a block diagram of an order management system that may implement an embodiment of the invention.

An "orchestration order" or "order" refers to an entity that contains data for an orchestration plan, and that represents a customer's order. In one embodiment, an order can include an order header and one or more order lines. An "order header" refers to a portion of an order that identifies the order. In one embodiment, the order header includes an order identity and a fulfillment mode. An "order line," "order item," or "order line item" refers to a portion of an order that identifies an action of the order. In one embodiment, the order line includes an action and a subject. According to one embodiment, the subject includes a fulfillment item code, a product type code, and a billing type.

An "order component" refers to an entity that contains data corresponding to a portion of an order, where the portion of the order includes one or more order lines. In one embodiment, the one or more order lines that are included within an order component have a common fulfillment provider. In another embodiment, the one or more order lines that are included within an order component have a common fulfillment pattern. In yet another embodiment, the one or more order lines that are included within an order component have a common processing granularity. In another embodiment, the one or more order lines that are included within an order component have both a common fulfillment provider and a common fulfillment pattern. In yet another embodiment, the one or more order lines that are included within an order component have a common fulfillment provider, a common fulfillment pattern, and a common processing granularity.

A "fulfillment function" refers to a distinct fulfillment capability exposed by a fulfillment provider. A "fulfillment system" refers to a computer system that can execute one or more fulfillment functions. A "fulfillment provider" refers to an instance of a fulfillment system. A "fulfillment system type" refers to a class of fulfillment providers that can provide a single fulfillment function or a single class of fulfillment functions. A "fulfillment topology" refers to a set of one or more fulfillment providers that can participate in the fulfillment of an order. A "fulfillment mode" refers to a kind of fulfillment request. In one embodiment, a fulfillment function can be exposed by multiple fulfillment providers that belong to a same fulfillment system type.

A "fulfillment pattern" refers to an entity that includes a set of fulfillment functions and dependencies. A "dependency" refers to when an execution of a fulfillment function depends on the execution of another fulfillment function. Types of dependencies can include: (1) a dependency between two or more fulfillment functions associated with a fulfillment pattern, where the fulfillment pattern is associated with a single order line; (2) a dependency between two or more fulfillment functions, where at least two fulfillment functions are each associated with a separate fulfillment pattern, but the separate fulfillment patterns are associated with a single order; and (3) a dependency between two or more fulfillment functions, where at least two fulfillment functions are each associated with a separate order. A "product specification," "service specification," and a "resource specification," is a type of entity that contains data which describes a core capability that can be provided by a fulfillment provider, where the core capability is a product, service, or resource, respectively. A product specification, service specification, or resource specification can be associated with a fulfillment pattern that can carry out the core capability described by the product specification, service specification, or resource specification, and can contain metadata that can be used to create the fulfillment pattern that carries out the core capability. A "fulfillment flow" refers to an entity that includes a set of fulfillment patterns.

"Decomposition" refers to the partitioning of an order into one or more order components. A "decomposition sequence" refers to a definition of logic that drives a decomposition of an order into one or more order components. A decomposition sequence can comprise any number of stages, also identified as "decomposition stages."

"Order management" refers to an execution, coordination, and management of one or more fulfillment providers to fulfill an order. An "orchestration plan" refers to a metadata-driven executable process that includes a set of process steps for fulfilling the order, where the set of process steps can each execute on one or more order components, and where each order component includes one or more order lines. "Orchestration plan generation" refers to the creation of an orchestration plan based on one or more order components. "Orchestration plan execution" refers to the execution of the orchestration plan, once the orchestration plan has been generated.

"Change management" refers to either the revision, or cancellation, of an in-flight order. An "in-flight order" refers to an order whose orchestration plan execution has started, but has not completed. A "revision order" refers to a request to revise an in-flight order. A "cancel order" refers to a request to cancel an in-flight order. A "change order" refers to a request to modify an order whose orchestration plan execution has already completed, rather than an in-flight order. A "modify" order refers to either a revision order or a cancel order. A "revision order orchestration plan" refers to an orchestration plan for revising the in-flight order. A "cancel order orchestration plan" refers to an orchestration plan for cancelling the in-flight order. A "modify order orchestration plan" refers to either a revision order orchestration plan or a cancel order orchestration plan.

A "customer-facing service specification" is a type of entity that contains data which describes a service, where the service can provide one or more core capabilities. A customer-facing service specification can be mapped to one or more product specifications. A customer-facing service specification does not include data that describes a technical implementation that is utilized to provide the service, except to the extent necessary to facilitate a mapping of a customer-facing service to a technical solution (i.e., a collection of one or more resources, one or more resource-facing services, or a combination therein). Instead, a customer-facing service specification can be mapped to one or more resource-facing service specifications, one or more resource specifications, or a combination therein. Thus, a customer-facing service specification is a technology-agnostic abstraction of a holistic capability at a boundary of a service provider infrastructure that facilitates service commercialization, fulfillment, and management. A customer-facing service specification can be realized through one or more technical solutions, where a technical solution comprises one or more resources, one or more resource-facing services, or a combination therein. A "resource-facing service specification" is a type of entity that contains data which describes a technical implementation that is utilized to provide a service. A "resource specification" is a type of entity that contains data which describes a technical resource that is utilized by a technical implementation to provide a service. A resource-facing service specification can be mapped to one or more resource specifications.

According to an embodiment, an order management system can dynamically generate an orchestration plan specific to an order that is to be fulfilled, where an orchestration plan includes a metadata-driven executable process. The order can include one or more order lines, each order line can be mapped to a product specification, where each product specification can be associated with a fulfillment pattern. The one or more fulfillment patterns can be combined into a fulfillment flow to create the orchestration plan. The orchestration plan can then be executed to fulfill the order. The meta-data driven executable process of the orchestration plan is a dynamic executable process, as the executable process depends on the one or more order lines of the order.

According to another embodiment, an order management system can execute a decomposition sequence on an order. The order management system can first receive the order. The order management system can then partition the order into one or more order components through a number of decomposition stages. With each decomposition stage, the order management system can take an order component or order as input, and the order management system can partition the input into one or more order components based on a specific criteria. The order management system can then use the resulting one or more order components to generate an orchestration plan. The order management system can then determine if there are any applicable dependencies that have been defined in metadata based on the one or more order components, and the order lines that are contained within each order component. The order management system applies dependencies between order lines of order components. The dependencies provide instructions about the order in which the order components contained within the calculated orchestration plan are to be executed.

According to another embodiment, the order management system can perform change management of an in-fight order. The order management system can receive an order that modifies or cancels an original order that the order management system is currently fulfilling (i.e., in-flight order). The order management system can generate an orchestration plan that corresponds to the new order, compare the orchestration plan with an orchestration plan for the corresponding in-flight order, and generate either a revision order orchestration plan or a cancel order orchestration plan that, when executed, can manage the revision, or cancellation, of the in-flight order. The revision order orchestration plan, or cancel order orchestration plan, also includes a metadata-driven executable process.

According to another embodiment, a fulfillment flow can be decoupled from a fulfillment topology. The fulfillment flow can not include any fulfillment topology data within its metadata. The fulfillment topology information can be abstracted from the fulfillment flow, and can be used with a decomposition sequence in order to partition an order into one or more order components. The fulfillment flow can be input into the decomposition sequence, and one or more dependencies of the fulfillment flow can be applied to the one or more order components to generate an orchestration plan, where the orchestration plan includes the fulfillment topology data.

According to another embodiment, a product offering can be decoupled from a technical implementation used to realize the product offering. An order that describes a product or service, such as an action on a product or service, can be transformed to a service order, which is technology-agnostic. The transformation can be based on a mapping of a product specification to a customer-facing service specification. From there, the service can be transformed to a technical order, which includes one or more technical implementations for fulfilling the action on the product or service. The transformation can be based on a mapping of a customer-facing service specification to one or more resource-facing service specifications, one or more resource specifications, or a combination therein.

FIG. 1 illustrates a block diagram of an order management system 10 that may implement one embodiment of the invention. Order management system 10 includes a bus 12 or other communications mechanism for communicating information between components of order management system 10. Order management system 10 also includes a processor 22, operatively coupled to bus 12, for processing information and executing instructions or operations. Processor 22 may be any type of general or specific purpose processor. Order management system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Order management system 10 further includes a communication device 20, such as a network interface card or other communications interface, to provide access to a network. As a result, a user may interface with order management system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with order management system 10.

According to one embodiment, memory 14 can store software modules that may provide functionality when executed by processor 22. The modules can include an operating system 15, an order management module 16, as well as other functional modules 18. Operating system 15 can provide an operating system functionality for order management system 10. Order management module 16 can provide functionality for managing a fulfillment of an order, as is described in more detail below. In certain embodiments, order management module 16 can comprise a plurality of modules that each provide specific individual functionality for managing a fulfillment of an order. Order management system 10 can also be part of a larger system. Thus, order management system 10 can include one or more additional functional modules 18 to include the additional functionality. For example, functional modules 18 may include modules that provide additional functionality, such as an "Oracle Communications Order and Server Management" product from Oracle Corporation. In another example, functional modules 18 may include enterprise resource planning ("ERP") modules of an ERP system, where an ERP system is a computer system that integrates several data sources and processes of an organization into a unified system. In yet another example, functional modules 18 may include customer relationship management ("CRM") modules of a CRM system, where a CRM system is a computer system that manages customer information.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
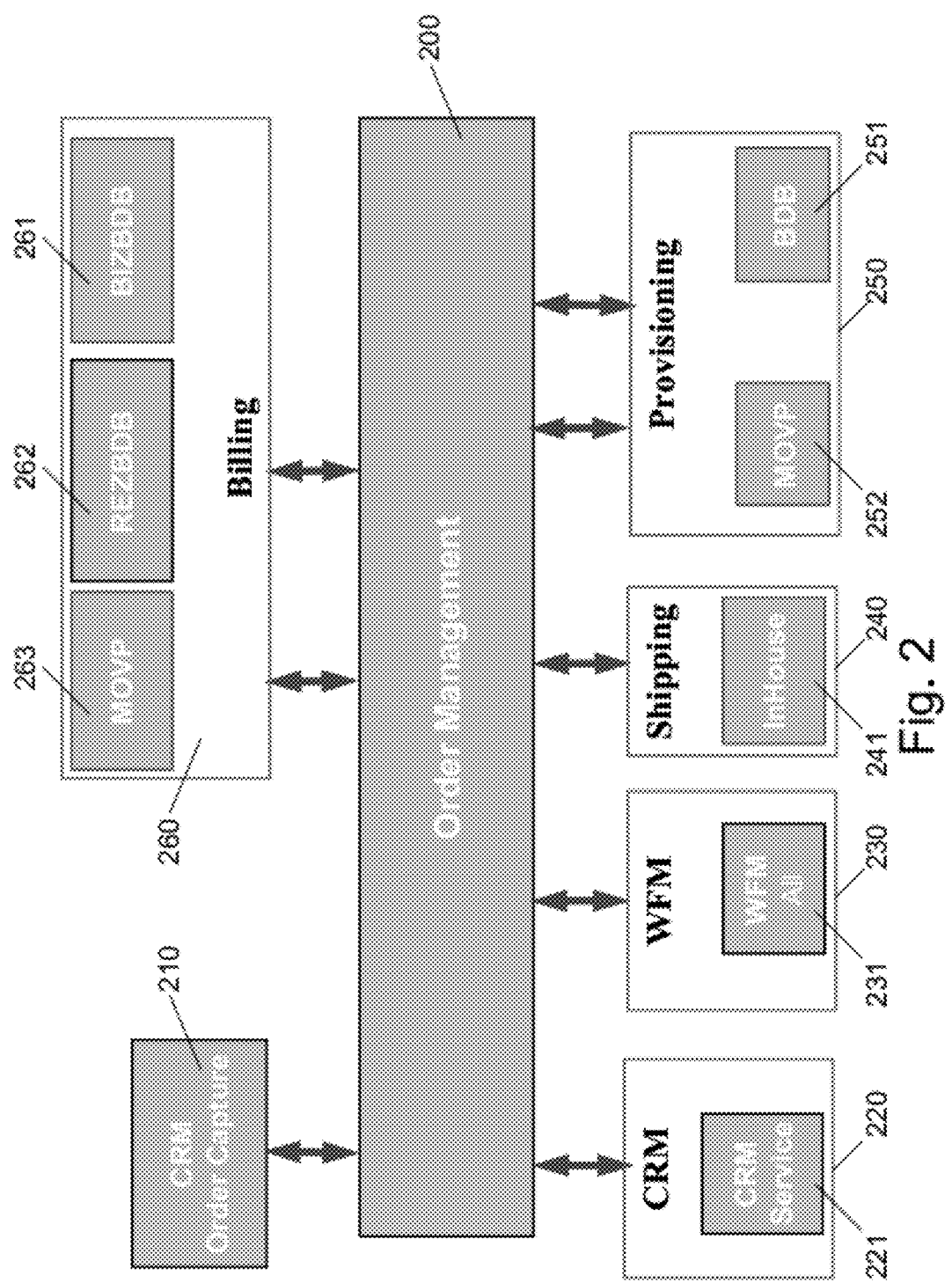
FIG. 2 illustrates an example of a fulfillment topology that includes an order management system, according to an embodiment of the invention.

FIG. 2 illustrates an example of a fulfillment topology that includes an order management system 200, according to an embodiment of the invention. Order management system 200 can be a computer system configured to manage a fulfillment of an order, as is described below in greater detail. In one embodiment, order management system 200 can be similar to order management system 10 illustrated in FIG. 1.

According to the embodiment, the fulfillment topology illustrated in FIG. 2 includes an order capture system 210. Order capture system 210 is a computer system configured to receive a customer order placed by a customer, and capture the customer order. A customer order can be an order for one or more products. The customer order can be transformed into a service order that represents services necessary to fulfill the one or more products, such as network services or telecommunication services. For example, a customer order can be an order for a product offering that includes wireless communication services. In one embodiment, order capture system 210 includes a catalog of products or services whose fulfillment information (such as fulfillment functions, fulfillment systems, and fulfillment patterns) is known by order management system 200. According to the embodiment, a customer can select one or more products and/or services using order capture system 210, and place an order for the one or more selected products and/or services. In one embodiment, the one or more products and/or services may be bundled into one or more bundles and may include price modifications, such as price discounts. Furthermore, in one embodiment, the one or more bundles can be part of an offer, where an offer is a configuration of one or more bundles, and may include additional price modifications, such as additional price discounts. Order capture system 210 can then create an order that can subsequently be transmitted to order management system 200. In one embodiment, where one or more products and/or services are bundled, each bundled product/service (and each price discount, if any) can be converted into a separate order line of the order that is transmitted to order management system 200.

In one embodiment, order capture system 210 is a customer relationship management ("CRM") order capture system, as illustrated in FIG. 2. A CRM system is a computer system configured to manage data related to customers and prospective customers. Thus, according to an embodiment, order capture system 210 can create new customer data associated with the customer, and can associate the new customer data with the customer order. Alternatively, order capture system 210 can retrieve customer data that is already associated with the customer, and can associate the retrieved customer data with the customer order.

In an embodiment where order capture system 210 is a CRM order capture system, the fulfillment topology includes a CRM system 220, illustrated in FIG. 2. CRM system 220 is a computer system that can provide CRM services to order management system 200, such as CRM service 221, as illustrated in FIG. 2, to assist order management system 200 in managing a fulfillment of the order. For example, CRM system 220 can provide fulfillment data associated with a customer, such as billing data, using CRM service 221. Order management system 200 can utilize the fulfillment data associated with the customer that places the order, to manage a fulfillment of the order. For example, order management system 200 can utilize the billing data associated with the customer that places an order to select a specific billing fulfillment provider to fulfill the billing fulfillment function for the order.

According to the embodiment, order management system 200 can receive the order transmitted by order capture system 210 and can recognize the order. Recognizing the order can include, in one embodiment, identifying the order as an order that order management system 200 can fulfill. By identifying the order as an order that can be fulfilled, order management system 200 can also identify specific information about the order, such as an order header of the order, one or more order lines of the order, and when the order is required to be fulfilled. Furthermore, for each order line of the order, order management system 200 can identify information that allows order management system 200 to map the order line to a product specification, where the product specification maps to a fulfillment pattern used to generate an orchestration plan used to fulfill an order, as is described below in greater detail.

According to the embodiment, the fulfillment topology illustrated in FIG. 2 includes the following fulfillment systems: work force management ("WFM") system 230, shipping system 240, provisioning system 250, and billing system 260. Each fulfillment system can provide one or more fulfillment providers for providing fulfillment functions necessary to fulfill an order, and order management system 200 can coordinate and manage the fulfillment functions performed by the one or more fulfillment providers, so that the order can be fulfilled.

In the illustrated embodiment, WFM system 230 includes one fulfillment provider, WFM All 231, that can provide fulfillment functions, such as installing a product/service. Similarly, shipping system 240 includes one fulfillment provider, InHouse 241, that can provide fulfillment functions, such as shipping a product.

Furthermore, provisioning system 250 includes two fulfillment providers: broadband ("BDB") 251 and Mobile and VoIP ("MOVP") 252, that can each provide fulfillment functions, such as provisioning a service. Similarly, billing system 260 includes three fulfillment providers: business broadband ("BIZBDB") 261, residential broadband ("REZBDB") 262, and MOVP 263, that can each provide fulfillment functions, such as billing for a product/service.

Once order management system 200 identifies the order transmitted by order capture system 210 as an order that order management system 200 can fulfill, order management system 200 manages a fulfillment of the order using the fulfillment systems that are part of the fulfillment topology, as illustrated in FIG. 2. To fulfill the order, order management system 200 first partitions the order into one or more order components. Order decomposition is described in greater detail below in relation to FIGS. 10-13. Once the order is partitioned into one or more order components, order management system 200 generates an orchestration plan. Orchestration plan generation is described in greater detail below in relation to FIGS. 8-9 and 14.

Once the orchestration plan is generated, order management system 200 executes the orchestration plan and coordinates a fulfillment of the order, using the fulfillment systems that are part of the fulfillment topology, as illustrated in FIG. 2. In one embodiment, order management system 200 executes the orchestration plan and coordinates a fulfillment of the order by invoking one or more fulfillment functions of one or more fulfillment providers of one or more fulfillment systems, such as WFM system 230, shipping system 240, provisioning system 250, and billing system 260. More specifically, in one embodiment, for each fulfillment function of the orchestration plan, order management system 200 invokes a corresponding fulfillment function of a fulfillment provider of either WFM system 230, shipping system 240, provisioning system 250, or billing system 260, One of ordinary skill in the art would readily appreciate that the fulfillment topology illustrated in FIG. 2 is merely an example fulfillment topology, and that order management system 200 can be a part of other fulfillment topologies, whose shape and format differ from the fulfillment topology illustrated in FIG. 2. For example, order management system 200 can be a part of a fulfillment topology with a greater number of fulfillment systems, a fewer number of fulfillment systems, a same number of fulfillment systems, but where each fulfillment system has a greater or fewer number of fulfillment providers, or any combination therein.

FIG. 3 illustrates an example of an order (i.e., order 300), according to an embodiment of the invention. According to an embodiment, order 300 is an example of an order that represents a customer order that is captured by an order capture system (such as order capture system 210 of FIG. 2), where the order can be fulfilled by an order management system (such as order management system 10 of FIG. 1, and order management system 200 of FIG. 2). Order 300 includes a plurality of order lines, where each order line represents a product offering (either simple or bundled). According to the embodiment, each order line includes data that can be mapped to a product specification that corresponds to each product offering. Each product specification maps to a fulfillment pattern used to generate an orchestration plan used to fulfill order 300, where the fulfillment pattern can perform one or more fulfillment capabilities.

In the illustrated embodiment of FIG. 3, order 300 includes order lines 1, 2, 2.1, 2.1.1, 2.1.2, 2.1.3, 2.1.4, 2.2, 2.3, 2.4, 2.5, 3, 3.1, 3.1.1, 3.1.2, 3.1.3, 3.2, 3.3, and 4, where each order line includes an action to add a product offering for a customer. More specifically, order line 1 includes an action to add a product offering "On Top of the World Broadband-VoIP," which is an offering for broadband and voice over Internet Protocol ("VoIP") products/services, and contains two bundles of products/services that are described in order lines 2 and 3, and a discount that is described in order line 4. Order line 2 includes an action to add the products/services that comprise the bundle "High Speed Internet Service," which is a bundle of broadband products/services and discounts that are described in order lines 2.1, 2.1.1, 2.1.2, 2.1.3, 2.1.4, 2.2, 2.3, 2.4, and 2.5. Order line 3 includes an action to add the products/services that comprise the bundle "VoIP Service," which is a bundle of VoIP products/services and discounts that are described in order lines 3.1, 3.1.1, 3.1.2, 3.1.3, 3.2, and 3.3. Order line 4 includes a discount that is applied to the broadband and VoIP products/services contained within the bundle identified in order line 2, and the bundle identified in order line 3.

One of ordinary skill in the art would readily appreciate that order 300 illustrated in FIG. 3 is merely an example order, and that order 300 can include any number of order lines, where each order line can identify any action, such as adding or deleting any product/service, bundle, offer, or discount.

Figure 4:
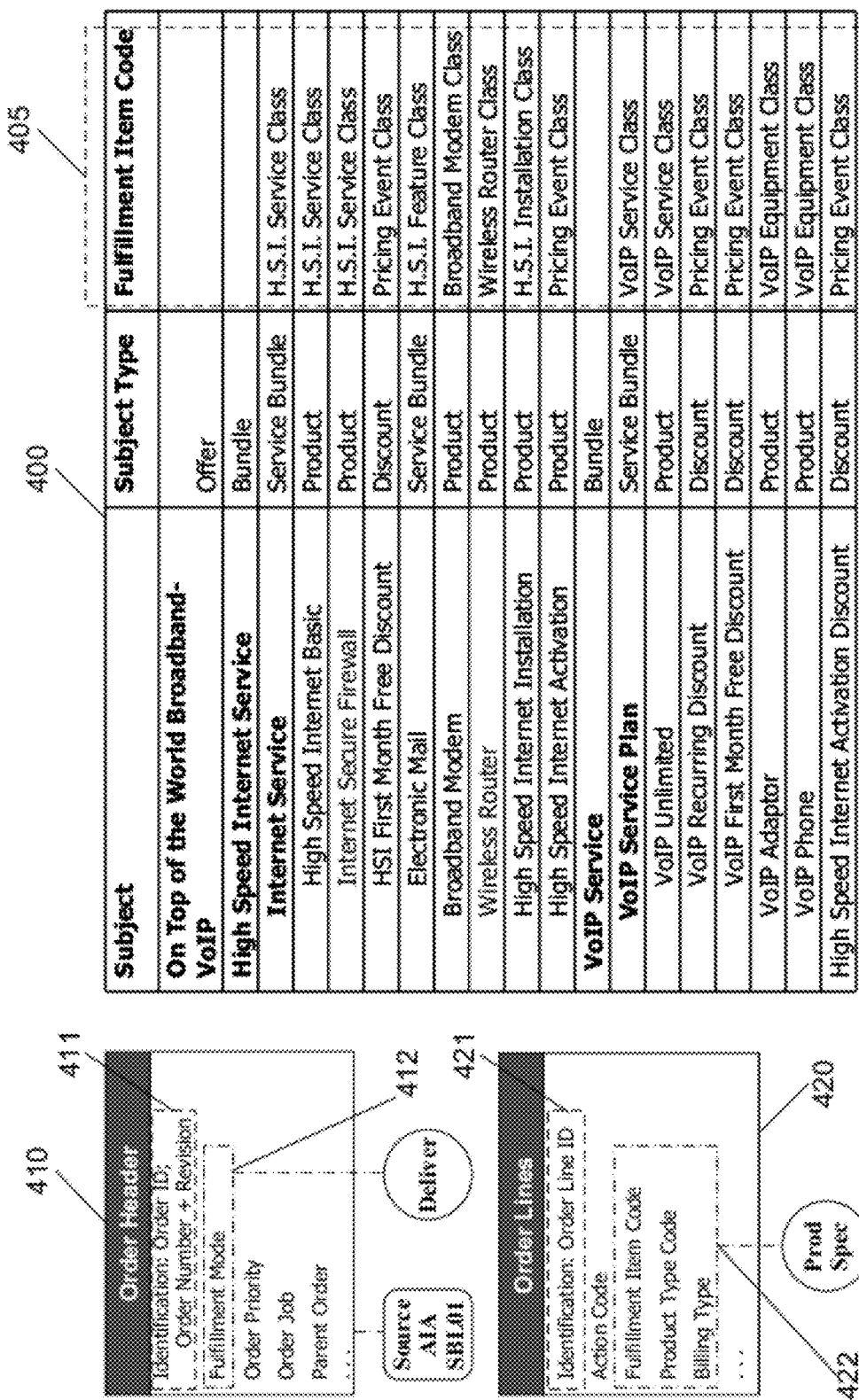
FIG. 4 illustrates an example of an order header and an order line of an order, according to an embodiment of the invention.

FIG. 4 illustrates an example of an order header (i.e., order header 410) and an example of an order line (i.e., order line 420) of an order 400, according to an embodiment of the invention. Order 400 is an example of an order that represents a customer order that is captured by an order capture system (such as order capture system 210 of FIG. 2), where the order can be fulfilled by an order management system (such as order management system 10 of FIG. 1, and order management system 200 of FIG. 2). Order 400 is identical to order 300 of FIG. 3, but different details of order 400 are illustrated in FIG. 4. As illustrated in FIG. 4, for each product/service or discount identified in order 400, order 400 includes a fulfillment item code 405. A fulfillment item code can be used, in part, to identify a product specification that is associated with the product/service or discount of order 400. As previously described, a product specification maps to a fulfillment pattern that is used to generate an orchestration plan used to fulfill order 400, where the fulfillment pattern can perform one or more fulfillment capabilities. For example, as illustrated in FIG. 4, the product "VoIP Adaptor" in order 400 includes a value of "VoIP equipment class" for fulfillment item code 405. This value can be used, in part, to identify the product specification that is associated with the product "VoIP Adaptor."

According to the embodiment, order header 410 and order line 420 represent an order header and order line of order 400, respectively. Order header 410 includes, in part, order identity ("ID") 411 and fulfillment mode 412. Order ID 411 provides an identification of order 400, so that order 400 can be distinguished from other orders. Fulfillment mode 412 identifies a fulfillment request type and allows for a selection of a fulfillment pattern that matches the fulfillment mode and product specification combination. A product specification may expose one or more fulfillment modes, each of which may be mapped to a same fulfillment pattern or each of which may be mapped to a different fulfillment pattern. For example, in an embodiment of the invention, a product specification may have two fulfillment modes: a deliver mode and a qualify mode. A deliver mode delivers a capability promised by an order line. A qualify mode, on the other hand, checks whether a provider is capable of delivering a capability promised by the order line.

Order line 420 includes, in part, order line ID 421, and subject 422. Order line ID 421 provides an identification of order line 420, so that order line 420 can be distinguished from other order lines. Subject 422 provides an identification of a product that is associated with an action of order line 420. According to the embodiment, subject 422 is comprised of one or more attributes. The one or more attributes comprise, relevant to this context, a fulfillment item code, a product type code, and a billing type. Together, the combination of the fulfillment item code, the product type code, and the billing type can identify the correct product specification that the order line maps to.

In an embodiment, fulfillment mode 412 and a product specification for subject 422 can be utilized to determine which fulfillment pattern is needed to fulfill order line 420. A product specification is described in greater detail in relation to FIGS. 5-6. A fulfillment pattern is described in greater detail in relation to FIG. 7. A mapping of the combination of a fulfillment mode and a subject to a product specification associated with a fulfillment pattern is described in greater detail in relation to FIG. 8.

Figure 5:
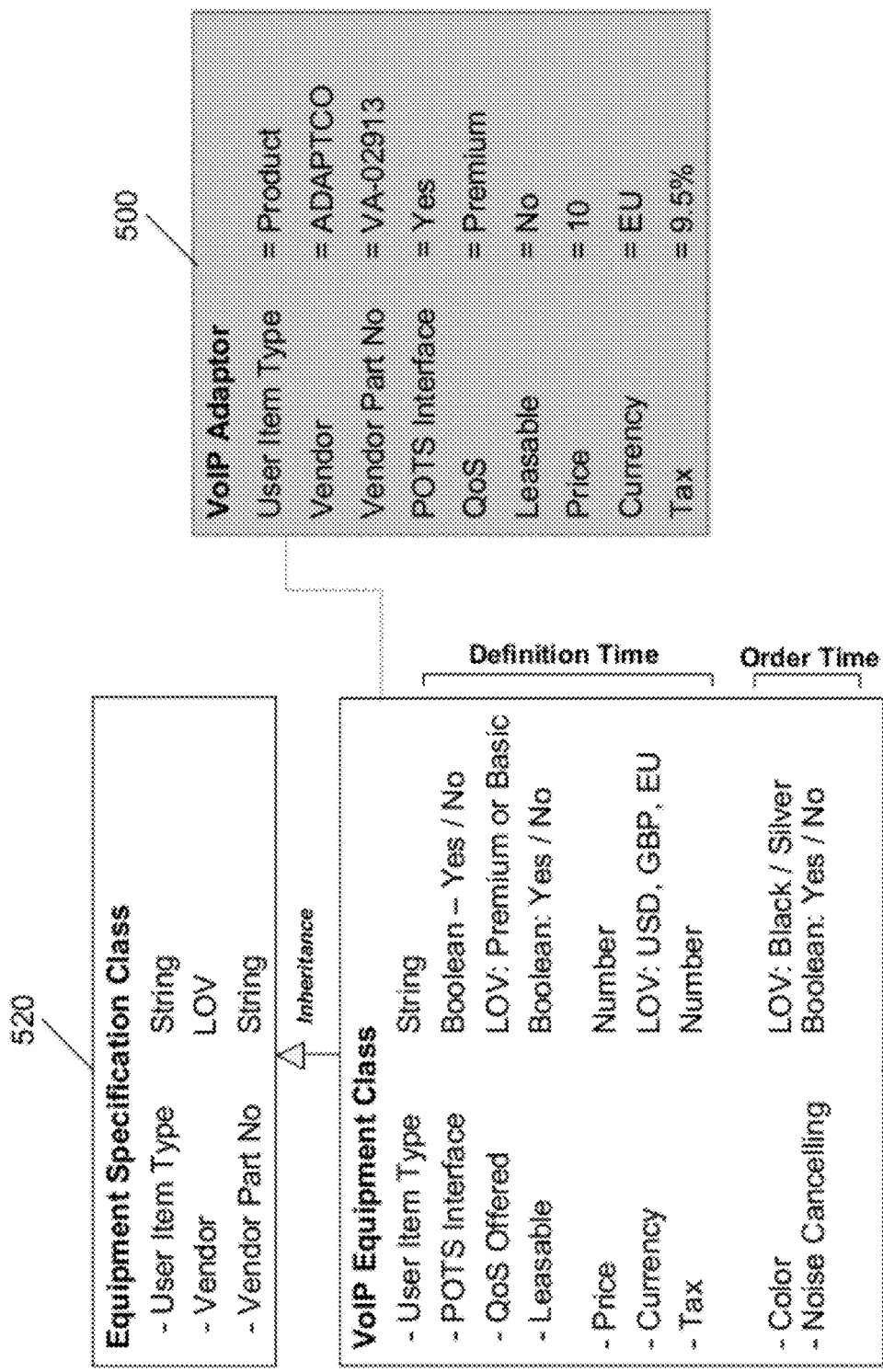
FIG. 5 illustrates an example of a product specification, according to an embodiment of the invention.

FIG. 5 illustrates an example of a product specification (i.e., product specification 510), according to an embodiment of the invention. As previously described, a product specification describes a core capability that can be provided by a fulfillment provider, and can contain metadata that can be used to create a fulfillment pattern that carries out the core capability. A product specification can be used to create a product offering, where a product offering can be realized as a physical good or a service. According to an embodiment, a product specification can be defined for an order management system, and can be implemented as a class, where a class is a software construct that can be used to create an entity that contains data. In one embodiment, a product specification can be implemented as a product class, where the product class extends one of a plurality of product classes stored within a data storage. The data storage can be any type of data storage known to one of ordinary skill in the art that is configured to store product information. Examples of a data storage configured to store product information include a "Product Hub" product from Oracle Corporation.

In the illustrated embodiment, product specification 510 (VoIP Equipment Class) is a product specification for a product 500 "VoIP Adaptor." Product specification 510 is also a product class that extends product class 520, which is identified as "Equipment Specification Class," as the product "VoIP Adaptor" is a type of VoIP equipment. In alternate embodiments, a product specification can extend any number of product classes. Product 500 includes attributes that are inherited from product class 510, and attributes that are inherited from both product class 510 and product class 520. According to the example embodiment illustrated in FIG. 5, product 500 includes the following attributes: user item type, vendor, vendor part number, plain old telephone service ("POTS") interface, quality of service ("QoS") offered, leasable, price, currency, and tax. As can be seen in FIG. 5, values for these attributes are defined at design time, at the same time that product 500 is defined. As can also be seen in FIG. 5, product specification 510 includes additional attributes that are defined at ordering time, rather than definition time: color, and noise cancelling. These attributes are not defined when product 500 is defined, but are defined during order capture.

Figure 6:
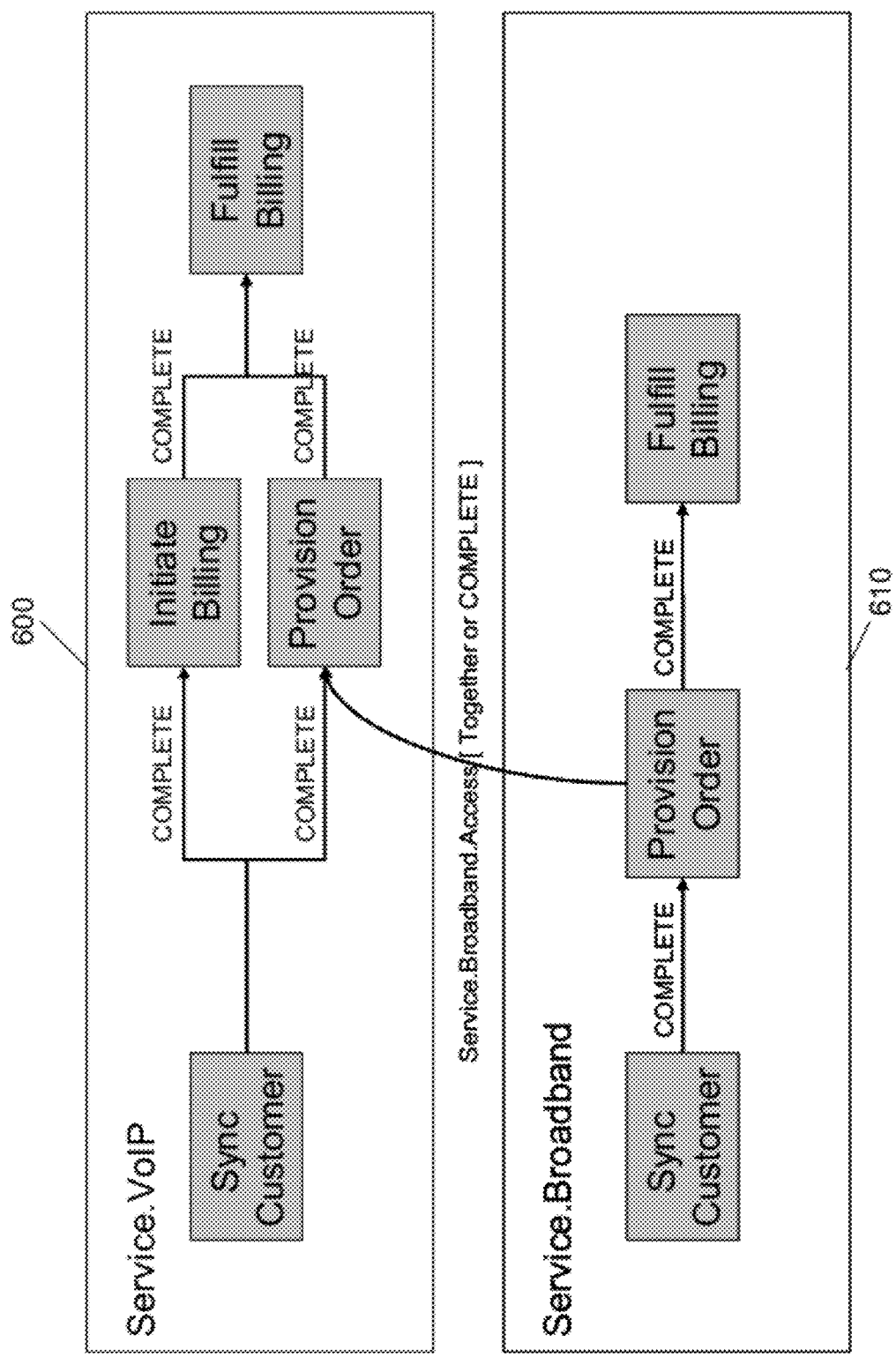
FIG. 6 illustrates examples of fulfillment patterns, according to an embodiment of the invention.

FIG. 6 illustrates examples of fulfillment patterns (i.e., fulfillment patterns 600 and 610), according to an embodiment of the invention. As previously described, a fulfillment pattern includes one or more fulfillment functions, and one or more dependencies. In addition, a fulfillment pattern can be associated with one or more product specifications.

In the illustrated embodiment of FIG. 6, fulfillment pattern 600 is associated with a product specification "Service.VoIP," and includes the following fulfillment functions: "Sync Customer," "Initiate Billing," "Provision Order," and "Fulfill Billing." According to the illustrated embodiment, fulfillment pattern 600 also includes dependencies between the fulfillment functions of fulfillment pattern 600. Specifically, fulfillment function "Initiate Billing" is dependent on fulfillment function "Sync Customer" completing (as indicated in FIG. 6 by the arrow between the two fulfillment functions within fulfillment pattern 700, and the text "COMPLETE"). Thus, fulfillment function "Initiate Billing" does not execute until fulfillment function "Sync Customer" has completed. Similarly, fulfillment function "Provision Order" is also dependent on fulfillment function "Sync Customer" completing (as also indicated in FIG. 6 by the arrow between the two fulfillment functions within fulfillment pattern 600, and the text "COMPLETE"). Thus, fulfillment function "Provision Order" also does not execute until fulfillment function "Sync Customer" has completed. Additionally, fulfillment function "Fulfill Billing" is dependent on both fulfillment function "Initiate Billing" completing and fulfillment function "Provision Order" completing (as indicated in FIG. 6 by the arrow between the three fulfillment functions within fulfillment pattern 600, and the text "COMPLETE"). Thus, fulfillment function "Fulfill Billing" does not execute until both fulfillment function "Initiate Billing" and fulfillment function "Provision Order" have completed.

Furthermore, in the illustrated embodiment of FIG. 6, fulfillment pattern 610 is associated with a product specification "Service.Broadband," and includes the following fulfillment functions: "Sync Customer," "Provision Order," and "Fulfill Billing." According to the illustrated embodiment, fulfillment pattern 610 also includes dependencies between the fulfillment functions of fulfillment pattern 610. Specifically, fulfillment function "Provision Order" is dependent on fulfillment function "Sync Customer" completing (as indicated in FIG. 6 by the arrow between the two fulfillment functions within fulfillment pattern 610, and the text "COMPLETE"). Thus, fulfillment function "Provision Order" does not execute until fulfillment function "Sync Customer" has completed. Additionally, fulfillment function "Fulfill Billing" is dependent on fulfillment function "Provision Order" completing (as indicated in FIG. 6 by the arrow between the two fulfillment functions within fulfillment pattern 610, and the text "COMPLETE"). Thus, fulfillment function "Fulfill Billing" does not execute until fulfillment function "Provision Order" have completed.

In addition to the dependencies described above, there is also a dependency between a fulfillment function of fulfillment pattern 600, and a fulfillment function of fulfillment pattern 610. Specifically, fulfillment function "Provision Order" of fulfillment pattern 600 is dependent on fulfillment function "Provision Order" of fulfillment pattern 610 (as indicated in FIG. 6 by the arrow between the two fulfillment functions, and the text "Together or COMPLETE"). Thus, fulfillment function "Provision Order" of fulfillment pattern 600 either does not execute until fulfillment function "Provision Order" of fulfillment pattern 610 completes, or fulfillment function "Provision Order" of fulfillment pattern 600 and fulfillment function "Provision Order" of fulfillment pattern 610 execute as a single order component (i.e. combine into one fulfillment function invocation). Thus, according to the embodiment, fulfillment pattern 600 is dependent on fulfillment pattern 610 based on the identified dependency between fulfillment function "Provision Order" of fulfillment pattern 600 and fulfillment function "Provision Order" of fulfillment pattern 610. This dependency is conditioned on the presence of order lines on the same order that map to the two corresponding product specifications: Service.VoIP and Service.Broadband. If either of the product specifications does not map to at least one order line, the dependency from, or to, that product specification is considered resolved (i.e., the dependency is treated as if it does not exist).

In one embodiment, a fulfillment pattern, such as fulfillment patterns 600 and 610, include a point of no return. A point of no return is a milestone within a fulfillment pattern, where an order associated with the fulfillment pattern cannot be revised or cancelled once it reaches the milestone. Up until the point of no return, an order can be revised or cancelled, even while the orchestration plan associated with the fulfillment pattern is being executed, as is described below in greater detail.

Figure 7:
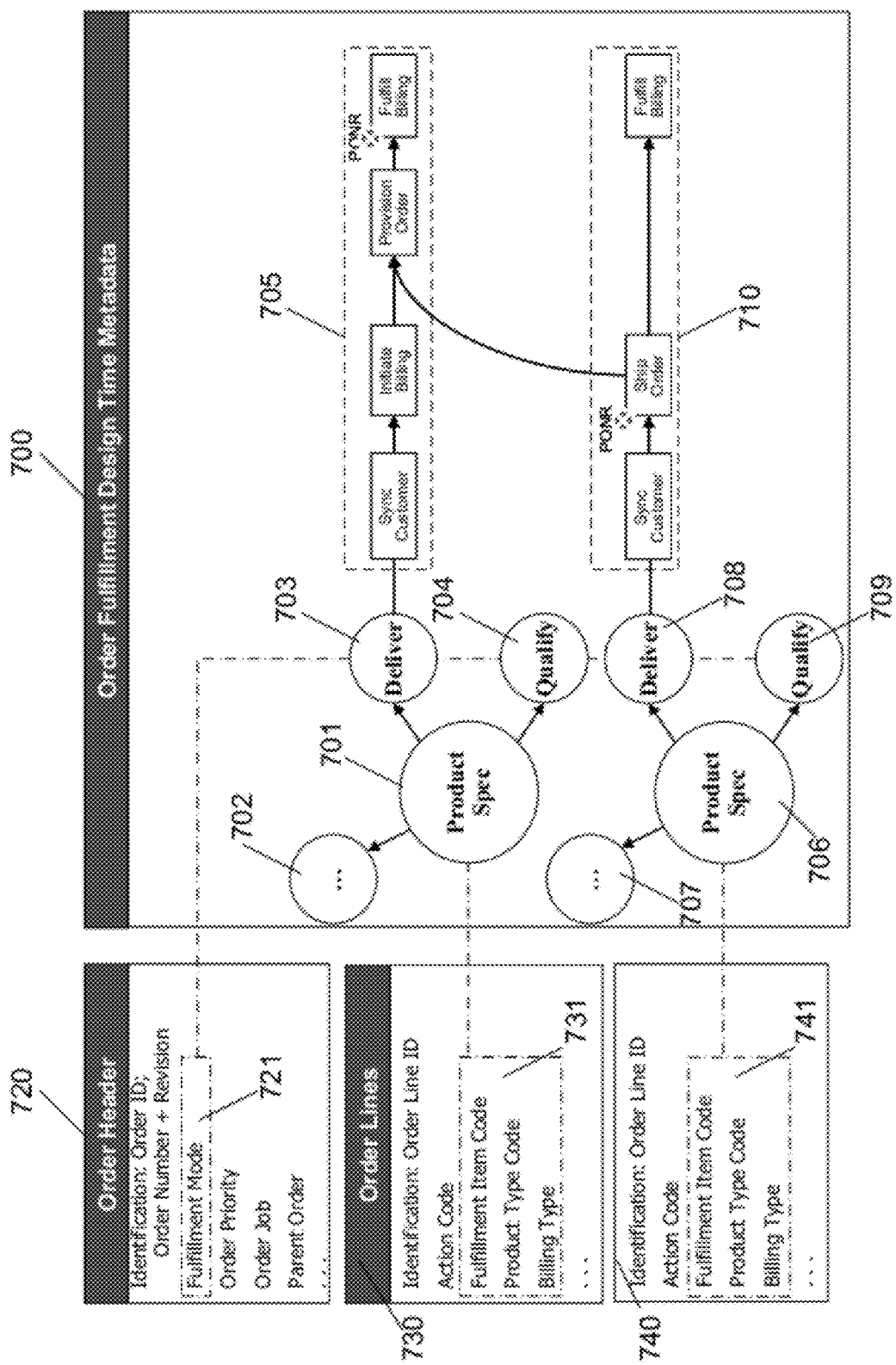
FIG. 7 illustrates an example of order fulfillment metadata, according to an embodiment of the invention.

FIG. 7 illustrates an example of order fulfillment metadata (i.e., order fulfillment metadata 700), according to an embodiment of the invention. Order fulfillment metadata 700 includes metadata used to generate a fulfillment flow for an order, where the fulfillment flow is ultimately used to generate an orchestration plan for the order. According to an embodiment, the metadata is generated at design time, before an order management system executes an executable process to fulfill an order. At run time, once the order management system executes an executable process to fulfill an order, the metadata can be used to generate an orchestration plan for the order. According to an embodiment, as is described below in greater detail, when the order management system is fulfilling the order, an order header, and each order line of the order, are each mapped to a product specification stored within order fulfillment metadata 700, where the product specification is associated with a fulfillment pattern, also stored within order fulfillment metadata 700. As is also described below in greater detail, the one or more fulfillment patterns are combined to created a fulfillment flow used to generate an orchestration plan for the order.

In one embodiment, order fulfillment metadata 700 includes one or more product specifications that map to a fulfillment pattern. In the illustrated embodiment of FIG. 7, order fulfillment metadata 700 includes product specification 701 and product specification 706. However, this is an example embodiment, and in alternate embodiments, order fulfillment metadata can include any number of product specifications.

As previously described, a product specification can extend any number of product classes. In the illustrated embodiment of FIG. 7, product specification 701 extends product class 702, and product specification 706 extends product class 707. However, this is an example embodiment, and in alternate embodiments, product specification 701 and product specification 706 can each extend any number of product classes.

Furthermore, as also previously described, a product specification can support any number of fulfillment modes, and thus, can also be associated with any number of fulfillment patterns, where each fulfillment pattern matches a request type specified in each fulfillment mode. In the illustrated embodiment of FIG. 7, product specification 701 is associated with fulfillment modes 703 and 704, and product specification 706 is associated with fulfillment modes 708 and 709. According to the illustrated embodiment, fulfillment modes 703 and 708 are deliver modes. As previously described, a deliver mode is a fulfillment mode that delivers a fulfillment capability associated with the product specification. Furthermore, according to the illustrated embodiment, fulfillment modes 704 and 709 are qualify modes. As previously described, a qualify mode is a fulfillment mode that checks whether the provider is capable of delivering a fulfillment capability associated with the product specification. However, this is an example embodiment, and in alternate embodiments, product specification 701 and product specification 706 can each be associated with any number of fulfillment modes, and where each fulfillment mode is any type of fulfillment mode, including types of fulfillment modes other than deliver modes and qualify modes.

Furthermore, as also previously described, a product specification can be associated with a fulfillment pattern. In the illustrated embodiment, product specification 701 is associated with fulfillment pattern 705, and product specification 706 is associated with fulfillment pattern 710. As previously described, a fulfillment pattern can include one or more fulfillment functions, and can perform one or more fulfillment capabilities for an action of an order line.

In the illustrated embodiment, fulfillment pattern 705 includes the following fulfillment functions: "Sync Customer," "Initiate Billing," "Provision Order," and "Fulfill Billing." Furthermore, according to the illustrated embodiment, fulfillment pattern 710 includes the following fulfillment functions: "Sync Customer," "Ship Order," and "Fulfill Billing."

According to the embodiment, fulfillment pattern 705 can also include dependencies between the fulfillment functions of fulfillment pattern 705, where the dependencies control the sequence in which the fulfillment functions are executed. For example, according to the illustrated embodiment of FIG. 7, fulfillment function "Initiate Billing" does not execute until fulfillment function "Sync Customer" has completed, fulfillment function "Provision Order" does not execute until fulfillment function "Initiate Billing" has completed, and fulfillment function "Fulfill Billing" does not execute until fulfillment function "Provision Order" has completed.

Likewise, fulfillment pattern 710 can also include dependencies between the fulfillment functions of fulfillment pattern 710, where the dependencies control the sequence in which the fulfillment functions are executed. For example, according to the illustrated embodiment of FIG. 7, fulfillment function "Ship Order" does not execute until fulfillment function "Sync Customer" has completed, and fulfillment function "Fulfill Billing" does not execute until fulfillment function "Ship Order" has completed.

Furthermore, fulfillment patterns 705 and 710 can include a dependency between each other, where the dependency controls the sequence in which fulfillment functions of both fulfillment patterns 705 and 710 are executed. For example, according to the illustrated embodiment of FIG. 7, there is a dependency between a fulfillment function of fulfillment pattern 705 and a fulfillment function of fulfillment pattern 710, so that fulfillment function "Provision Order" of fulfillment pattern 705 also does not execute until fulfillment function "Ship Order" of fulfillment pattern 710 has completed.

According to the illustrated embodiment of FIG. 7, fulfillment patterns 705 and 710 each include a point of no return (identified in FIG. 7 by the term "PONR"). As can be seen in the illustrated embodiment of FIG. 7, the point of no return for fulfillment pattern 705 is the fulfillment function "Fulfill Billing." Thus, once the order line associated with fulfillment pattern 705 reaches the point of no return while executing, the order line cannot be revised or cancelled. Similarly, as can also be seen in the illustrated embodiment of FIG. 7, the point of no return for fulfillment pattern 710 is the fulfillment function "Ship Order." Thus, once the order line associated with fulfillment pattern 710 reaches the point of no return while executing, the order line cannot be revised or cancelled.

The illustrated embodiment of FIG. 7 also includes order header 720, and order lines 730 and 740. Order header 720 represents an order header of an order, and order lines 730 and 740 represents order lines of the order. According to the embodiment, order lines 730 and 740 each have an action associated with the order line, and order lines 730 and 740 are each mapped to a product specification, where each product specification is associated with a fulfillment pattern that can fulfill the corresponding action. More specifically, a subject of each of order lines 730 and 740 is used to select a product specification for each of order lines 730 and 740, and a fulfillment mode of order header 720 is used to select a fulfillment mode, and thus, a fulfillment pattern, that corresponds to the product specification. In the illustrated embodiment of FIG. 7, order header 720 includes fulfillment mode 721, order line 730 includes subject 731, and order line 740 includes subject 741 (where subjects 731 and 741 each comprise a fulfillment item code, a product type code, and a billing type, as well as possibly comprising other attributes). As illustrated in FIG. 7, in the case of order line 730, subject 731 of order line 730 can be mapped to product specification 701, and fulfillment mode 721 of order header 720 can be mapped to deliver mode 703. From these mappings, fulfillment pattern 705 can be selected to fulfill the action associated with order line 730. As similarly illustrated in FIG. 7, in the case of order line 740, subject 741 can be mapped to product specification 706, and fulfillment mode 721 can be mapped to deliver mode 708. From these mappings, fulfillment pattern 710 can be selected to fulfill the action associated with order line 740.

In accordance with an embodiment, a fulfillment pattern can be identified and selected for each order line of an order. Once the fulfillment patterns have been identified and selected, the fulfillment patterns can be combined into a fulfillment flow that can fulfill the order. This is discussed in greater detail in relation to FIG. 8.

Figure 8:
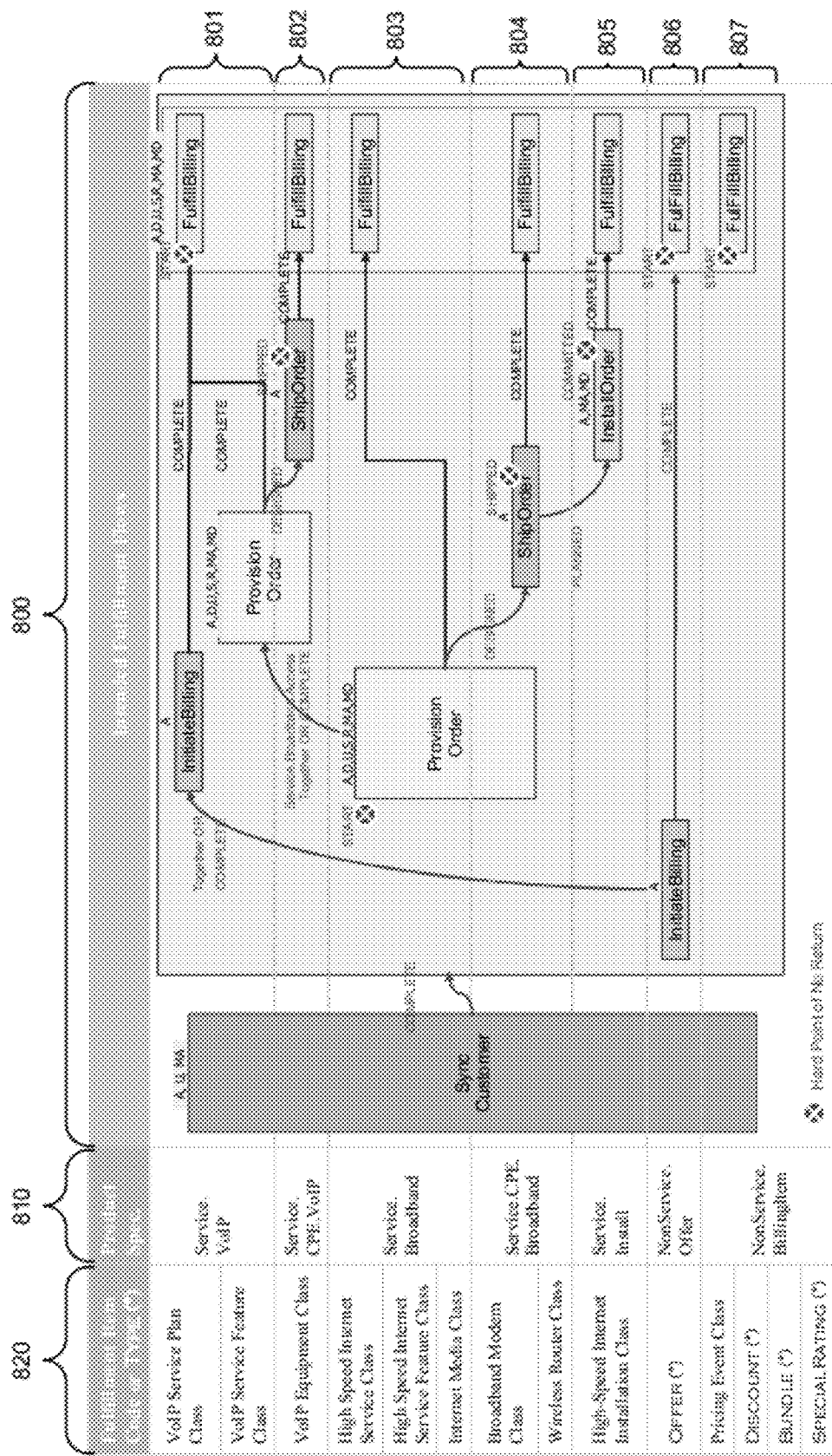
FIG. 8 illustrates an example of a fulfillment flow, according to an embodiment of the invention.

FIG. 8 illustrates an example of a fulfillment flow (i.e., fulfillment flow 800), according to an embodiment of the invention. As previously described, a fulfillment flow is a combination of one or more fulfillment patterns. In the illustrated embodiment of FIG. 8, fulfillment flow 800 is a combination of fulfillment patterns, where each fulfillment pattern corresponds to a product specification of product specifications 810. More specifically, fulfillment flow 800 is a combination of the following fulfillment patterns: a fulfillment pattern corresponding to product specification "Service.VoIP" (i.e., fulfillment pattern 801), a fulfillment pattern corresponding to product specification "Service.CPE.VoIP" (i.e., fulfillment pattern 802); a fulfillment pattern corresponding to product specification "Service.Broadband" (i.e., fulfillment pattern 803), a fulfillment pattern corresponding to product specification "Service.CPE.Broadband" (i.e., fulfillment pattern 804), a fulfillment pattern corresponding to product specification "Service.Install" (i.e., fulfillment pattern 805), a fulfillment pattern corresponding to product specification "NonService.Offer" (i.e., fulfillment pattern 806), and a fulfillment pattern corresponding to product specification "NonService.BillingItem" (fulfillment pattern 807).

In the illustrated embodiment of FIG. 8, each fulfillment item code/type of fulfillment item codes/types 820 is associated with a product specification of product specifications 810. More specifically: fulfillment item codes "VoIP Service Class," and "VoIP Service Feature Class" are each associated with product specification "Service.VoIP," fulfillment item code "VoIP Equipment Class" is associated with product specification "Service.CPE.VoIP," fulfillment item codes "High Speed Internet Service Class," "High Speed Internet Service Feature Class," and "Internet Media Class," are each associated with "Service.Broadband," fulfillment item codes "Broadband Modem Class," and "Wireless Router Class," are each associated with product specification "Service.CPE.Broadband," fulfillment item code "High-Speed Internet Installation Class" is associated with product specification "Service.Install," type "OFFER" is associated with product specification "NonService.Offer," and fulfillment item code "Pricing Event Class," and types "DISCOUNT," "BUNDLE," and "SPECIAL RATINGS" are associated with product specification "NonService.BillingItem."

According to the embodiment, fulfillment item codes/types 820 represent order lines of an order. Based on fulfillment item codes/types 820, product specifications 810 are selected. Furthermore, based on product specifications 810, a fulfillment pattern that corresponds to each product specification of product specifications 810 is selected, and the fulfillment patterns are combined into fulfillment flow 800. One or more dependencies of fulfillment flow 800 can then be applied to one or more order components of the order to generate an orchestration plan for the order, as is described below in greater detail. An orchestration plan is different from a typical workflow or a Business Process Execution Language ("BPEL") process in two ways. First, dependencies between fulfillment functions from a fulfillment flow can translate to any number of dependencies between one or more order lines of the one or more order components. Second, the dependencies can be at a completion of a fulfillment function for a specific order line or at any other milestone prior to completion. Thus, a first order component can be dependent upon a second order component, and an execution of the first order component can start at or prior to a completion of an execution of the second order component.

According to an embodiment, when fulfillment patterns 801, 802, 803, 804, 805, 806, and 807 are combined into fulfillment flow 800, the dependencies of these fulfillment patterns are also combined. Thus, in the illustrated embodiment of FIG. 8, an arrow between two or more fulfillment functions represents a dependency between the two or more fulfillment functions. Furthermore, in the illustrated embodiment of FIG. 8, the corresponding text adjacent to the arrow identifies the nature of the dependency between the two or more fulfillment functions. For example, the arrow between the fulfillment function "Sync Customer" and the remaining fulfillment functions, with the adjacent text "COMPLETE" represents a dependency where the other fulfillment functions of fulfillment flow 800 are dependent upon fulfillment function "Sync Customer" completing. Thus, according to the embodiment, the fulfillment functions of fulfillment flow 800 can be executed in an order based on the dependencies of fulfillment flow 800.

In one embodiment, a fulfillment flow does not contain any fulfillment topology information. In this manner, the fulfillment flow is agnostic as to fulfillment topology details, and one or more dependencies of the fulfillment flow can be applied to any fulfillment topology that can provide the fulfillment functions of the fulfillment flow. In contrast, an orchestration plan can include fulfillment topology information and can be generated for a specific fulfillment topology. According to an embodiment, an order can be partitioned into one or more order components based upon a decomposition sequence, where the decomposition sequence utilizes decomposition metadata. In accordance with the embodiment, the decomposition metadata can include fulfillment topology information so that the fulfillment topology is taken into account when partitioning the order into one or more order components. In one embodiment, an order can be broken down into one or more order components, where each order component corresponds to a specific fulfillment function of a specific fulfillment system. One or more dependencies of the fulfillment flow then can be applied to the one or more order components to generate an orchestration plan. The decomposition process is described below in greater detail in relation to FIGS. 9-12.

Figure 9:
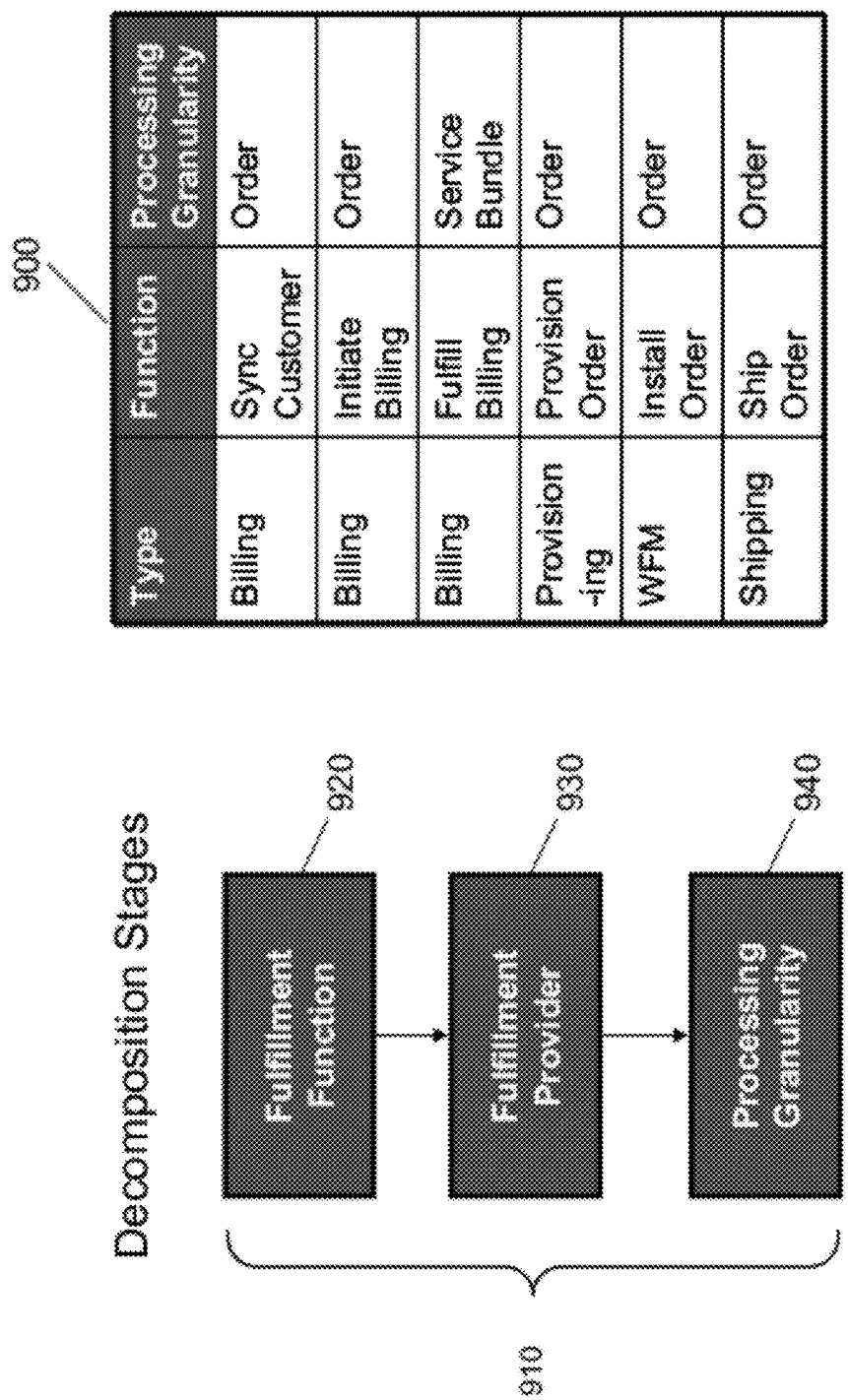
FIG. 9 illustrates an example of decomposition metadata and decomposition stages of a decomposition sequence used to partition an order into one or more order components, according to an embodiment of the invention.

FIG. 9 illustrates an example of decomposition metadata (i.e., decomposition metadata 900) and decomposition stages of a decomposition sequence (i.e., decomposition stages 920, 930, and 940 of decomposition sequence 910) used to partition an order into one or more order components, according to an embodiment of the invention. According to the embodiment, decomposition metadata 900 includes information regarding a fulfillment topology that an order management system is a component of. For example, in the illustrated embodiment, decomposition metadata 900 includes information regarding the fulfillment topology illustrated in FIG. 2. More specifically, decomposition metadata 900 includes, for each fulfillment function, an associated fulfillment system type, and an associated processing granularity. According to the embodiment, a fulfillment system type identifies a class of fulfillment providers for the fulfillment function. Furthermore, according to the embodiment, a processing granularity identifies a minimal order component that the fulfillment function can process, such as a service bundle, a discount, a commercial bundle, an offer, and an order. For example, in the illustrated embodiment of FIG. 9, the fulfillment function "Sync Customer" has an associated fulfillment system type "Billing," and an associated processing granularity "Order."

According to an embodiment, decomposition sequence 910 includes a number of decomposition stages, where each decomposition stage takes in an input, such as an order or an order component, and partitions the input into one or more order components based on a criteria. However, in alternate embodiments, some decompositions stages can take in the input, such as the order or the order component, and combine the input with one or more other order components, or disregard the input altogether. Specifically, in the illustrated embodiment of FIG. 9, decomposition sequence 910 includes decomposition stages 920, 930, and 940. Decomposition stage 920 receives an order and partitions the order into one or more order components based on a fulfillment function. Decomposition stage 930 receives the one or more order components generated by decomposition stage 920, and further partitions each order component into one or more order components based on a fulfillment provider. Decomposition stage 940 receives the one or more order components generated by decomposition stage 930, and further partitions each order component into one or more order components based on a processing granularity. While the illustrated embodiment of FIG. 9 illustrates a decomposition sequence with three decomposition stages, where each decomposition stage has a specific criteria, this is only an example embodiment. One of ordinary skill in the art would readily appreciate that a decomposition sequence can have any number of decomposition stages, where each decomposition stage can have any type of criteria. In certain embodiments, one or more dependencies can be declared between decomposition stages. Thus, in these embodiments, a decomposition stage can depend upon one or more decomposition stages within a decomposition sequence. The one or more dependencies can determine the order in which decomposition sequences are processed during the calculation of the orchestration plan. Dependencies between decomposition stages can be used to determine how an orchestration plan is generated. Dependencies between decomposition stages are distinct from dependencies between order components which are used during execution of the orchestration plan.

Figure 10:
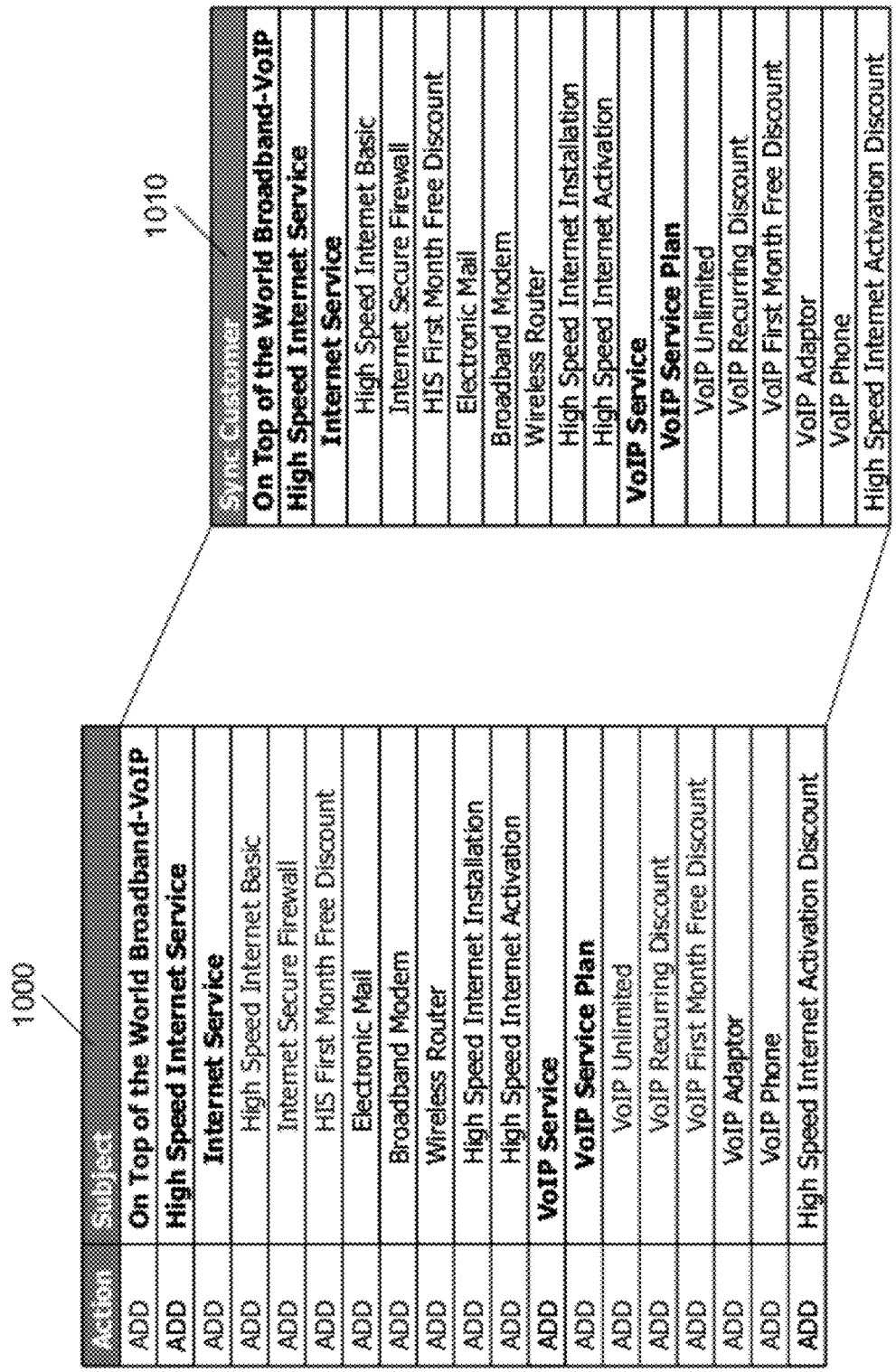
FIG. 10 illustrates an example of a first decomposition stage of a decomposition sequence, according to an embodiment of the invention.
Figure 12:
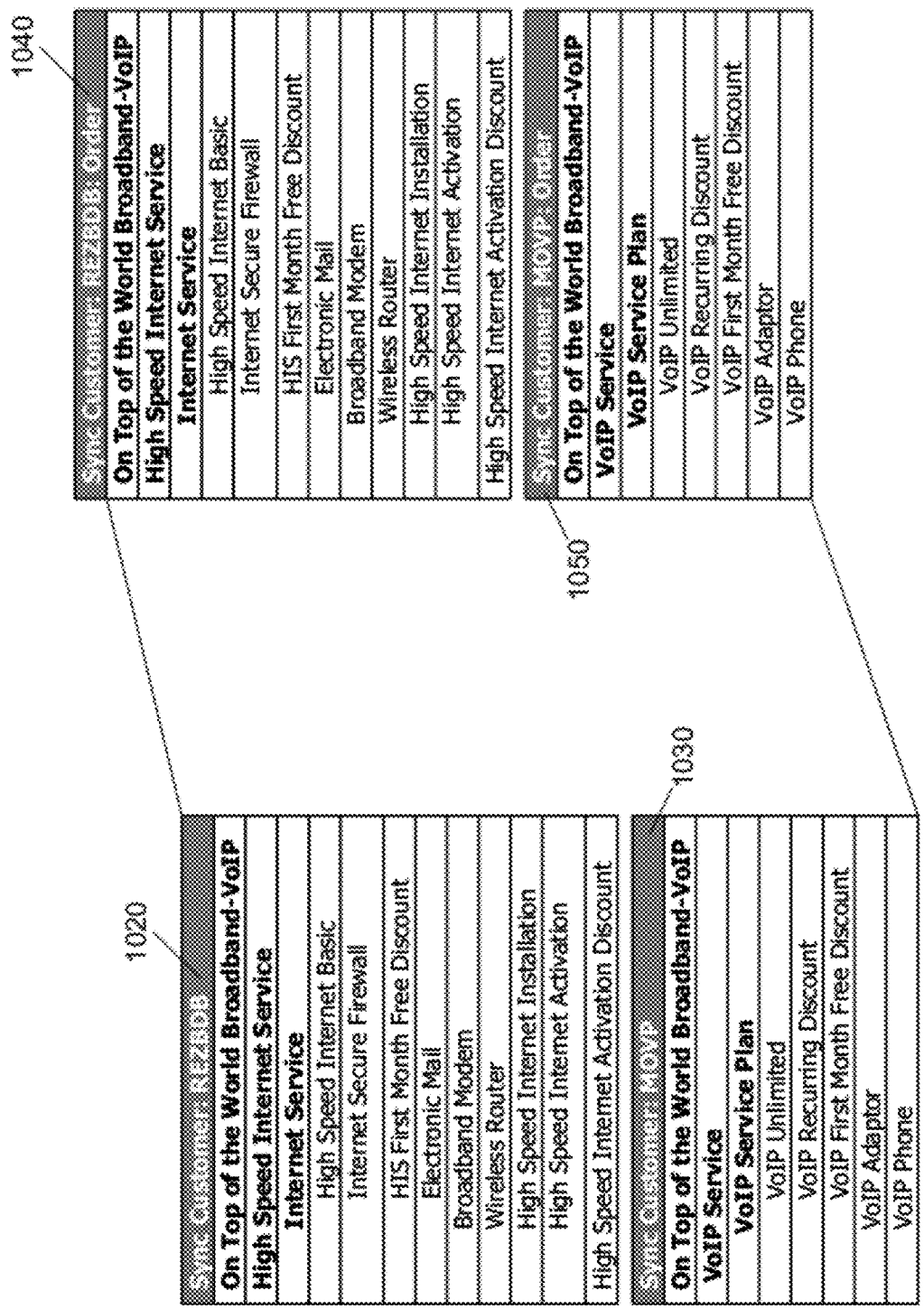
FIG. 12 illustrates an example of a third decomposition stage of a decomposition sequence, according to an embodiment of the invention.

An example of decomposition sequence 910, according to an embodiment, is now described in relation to FIGS. 10-12. In the example, a decomposition sequence is executed for the fulfillment function "Sync Customer." However, according to an embodiment, a similar decomposition sequence can be executed for each fulfillment function of a fulfillment flow, such as fulfillment flow 800 of FIG. 8. Furthermore, one of ordinary skill the art would readily appreciate that the example embodiment described in relation to FIGS. 10-12 is only an example embodiment, and that a decomposition sequence may be executed differently in alternate embodiments, and still be within the scope of the invention.

FIG. 10 illustrates an example of a first decomposition stage of a decomposition sequence, according to an embodiment of the invention. According to the embodiment, order 1000 represents an order to add an offer of bundled services/products (i.e., offer "On Top of the World Broadband-VoIP"), and includes a number of order lines. Also according to the embodiment, the first decomposition stage partitions order 1000 into one or more order components based on a fulfillment function. In accordance with the embodiment, the first decomposition stage of the decomposition sequence generates order component 1010 from order 1000, where order component 1010 corresponds to the fulfillment function "Sync Customer." The first decomposition stage then determines which order lines of order 1000 are to be applied to order component 1010. In the illustrated embodiment, it is determined that all the order lines of order 1000 are to be applied to order component 1010. Thus, the first decomposition stage stores the order lines of order 1000 at order component 1010. In the illustrated embodiment, order component 1010 has a same number of order lines as order 1000. However, this is merely an example embodiment, and in alternate embodiments, order component 1010 may have any number of order lines, including having fewer order lines than order 1000. Furthermore, as previously described, while in the illustrated embodiment, the first decomposition stage of the decomposition sequence is executed for the fulfillment function "Sync Customer," in alternate embodiments, the first decomposition stage of the decomposition sequence can be executed for each fulfillment function of a fulfillment flow. Thus, in an embodiment involving fulfillment flow 800 of FIG. 8, the first decomposition stage of the decomposition sequence can also be executed for the following fulfillment functions as well: "Initiate Billing," "Provision Order," "Ship Order," "Install Order," and "Fulfill Billing."

FIG. 11 illustrates an example of a second decomposition stage of a decomposition sequence, according to an embodiment of the invention. According to the embodiment, the second decomposition stage partitions order component 1010 into one or more order components based on a fulfillment provider. In accordance with the embodiment, the second decomposition stage of the decomposition sequence generates order component 1020, where order component 1020 corresponds to the fulfillment provider "REZBDB," and order component 1030, where order component 1030 corresponds to the fulfillment provider "MOVP." The second decomposition stage then determines which order lines of order component 1010 are to be applied to order component 1020, and which order lines of order component 1010 are to be applied to order component 1030. In the illustrated embodiment, it is determined that some order lines of order component 1010 are to be applied to order component 1020, and the remaining order lines of order component 1010 are to be applied to order component 1030. Thus, the second decomposition stage stores some order lines of order component 1010 at order component 1020, and stores the remaining order lines of order component 1010 at order component 1030. Furthermore, as previously described, while in the illustrated embodiment, the second decomposition stage of the decomposition sequence is executed for the fulfillment function "Sync Customer," in alternate embodiments, the second decomposition stage of the decomposition sequence can be executed for each fulfillment function of a fulfillment flow. Thus, in an embodiment involving fulfillment flow 800 of FIG. 8, the second decomposition stage of the decomposition sequence can also be executed for the following fulfillment functions as well: "Initiate Billing," "Provision Order," "Ship Order," "Install Order," and "Fulfill Billing."

FIG. 12 illustrates an example of a third decomposition stage of a decomposition sequence, according to an embodiment of the invention. According to the embodiment, the third decomposition stage partitions each of order components 1020 and 1030 into one or more order components based on a processing granularity. In accordance with the embodiment, the third decomposition stage of the decomposition sequence generates components 1040 and 1050, where order components 1040 and 1050 each correspond to the processing granularity "Order." The third decomposition stage then determines which order lines of order component 1020 are to be applied to order component 1040, and which order lines of 1030 are to be applied to order component 1050. In the illustrated embodiment, it is determined that all the order lines of order component 1020 are to be applied to order component 1040 and all the order lines of order component 1030 are to be applied to order component 1050. Thus, the third decomposition stage stores the order lines of order component 1020 at order component 1040, and stores the order lines of order component 1030 at order component 1050. In the illustrated embodiment, the third decomposition stage produces a same number of order components. However, this is merely an example embodiment, and in alternate embodiments, the third decomposition stage can produce any number of order components. In addition, in the illustrated embodiment, order component 1040 has a same number of order lines as order component 1020, and order component 1050 has a same number of order lines as order component 1030. However, this is merely an example embodiment, and in alternate embodiments, order components 1040 and 1050 may have any number of order lines, including having fewer order lines than order components 1020 and 1030, respectively. Furthermore, as previously described, while in the illustrated embodiment, the third decomposition stage of the decomposition sequence is executed for the fulfillment function "Sync Customer," in alternate embodiments, the third decomposition stage of the decomposition sequence can be executed for each fulfillment function of a fulfillment flow. Thus, in an embodiment involving fulfillment flow 800 of FIG. 8, the third decomposition stage of the decomposition sequence can also be executed for the following fulfillment functions as well: "Initiate Billing," "Provision Order," "Ship Order," "Install Order," and "Fulfill Billing."

Figure 13:
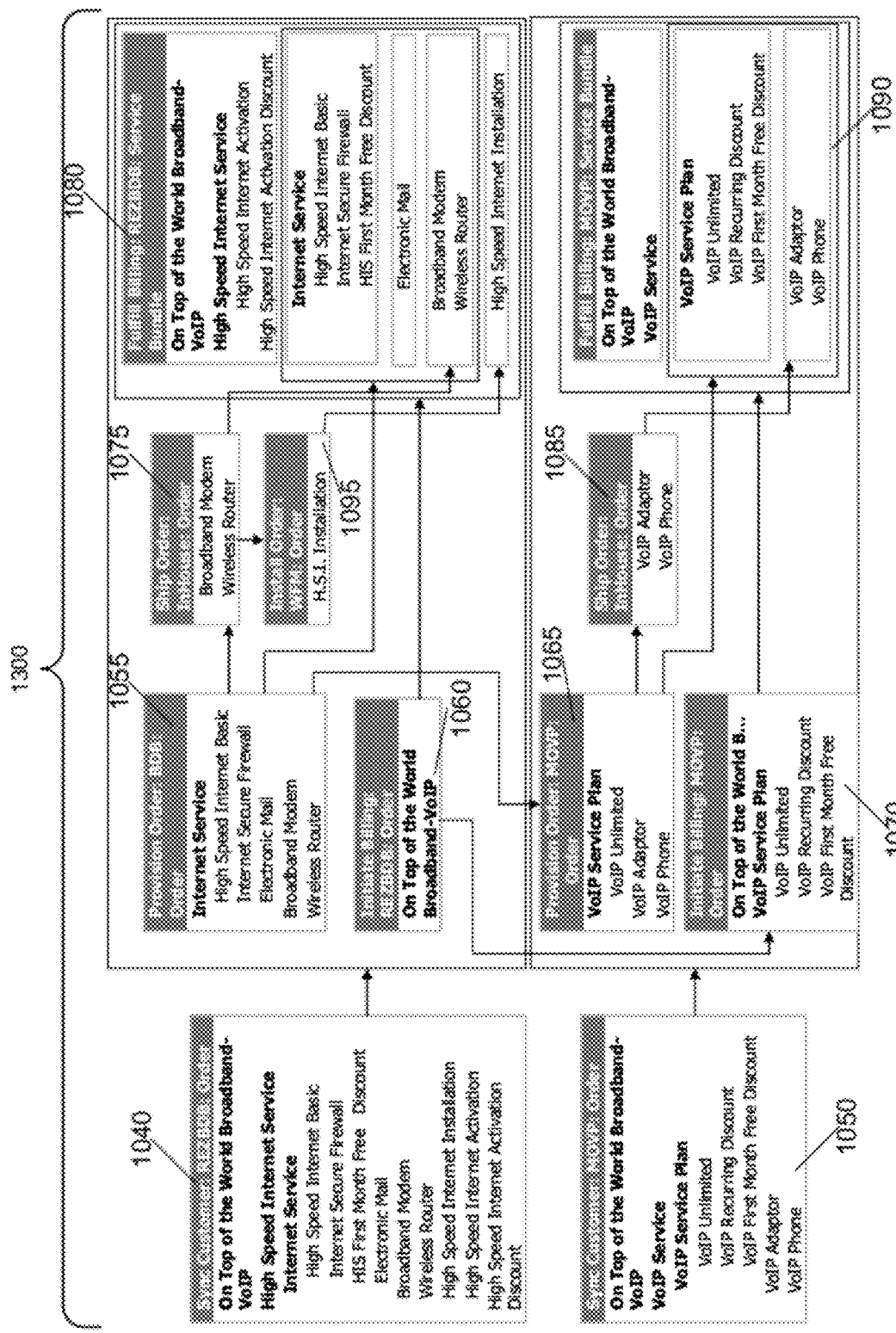
FIG. 13 illustrates an example of an orchestration plan, according to an embodiment of the invention.

FIG. 13 illustrates an example of an orchestration plan (i.e., orchestration plan 1300), according to an embodiment of the invention. According to an embodiment of the invention, an orchestration plan is generated by applying one or more dependencies of a fulfillment flow to one or more order components created by a decomposition sequence. In the illustrated embodiment, orchestration plan 1300 is generated by applying the dependencies of fulfillment flow 800 of FIG. 8, to order components 1040 and 1050 (generated by decomposition sequence 910 of FIG. 9, as illustrated in FIGS. 10-12), and order components 1055, 1060, 1065, 1070, 1075, 1080, 1085, 1090, and 1095 (also generated by decomposition sequence 910 of FIG. 9, not shown in the Figures).

According to the illustrated embodiment, as previously described, order component 1040 is associated with the fulfillment function "Sync Customer," associated with the fulfillment provider "REZBDB," and associated with a processing granularity of "Order." As also previously described, order component 1050 is associated with the fulfillment function "Sync Customer," associated with the fulfillment provider "MOVP," and associated with a processing granularity of "Order." Furthermore, according to the illustrated embodiment, order component 1055 is associated with the fulfillment function "Provision Order," associated with the fulfillment provider "BDB," and associated with a processing granularity of "Order." Order component 1060 is associated with the fulfillment function "Initiate Billing," associated with the fulfillment provider "REZBDB," and associated with a processing granularity of "Order." Order component 1065 is associated with the fulfillment function "Provision Order," associated with the fulfillment provider "MOVP," and associated with a processing granularity of "Order." Order component 1070 is associated with the fulfillment function "Initiate Billing," associated with the fulfillment provider "MOVP," and associated with a processing granularity of "Order." Order component 1075 is associated with the fulfillment function "Ship Order," associated with the fulfillment provider "InHouse," and associated with a processing granularity of "Order." Order component 1080 is associated with the fulfillment function "Fulfill Billing," associated with the fulfillment provider "REZBDB," and associated with a processing granularity of "Service Bundle." Order component 1085 is associated with the fulfillment function "Ship Order," associated with the fulfillment provider "InHouse," and associated with a processing granularity of "Order." Order component 1090 is associated with the fulfillment function "Fulfill Billing," associated with the fulfillment provider "MOVP," and associated with a processing granularity of "Service Bundle." Order component 1095 is associated with the fulfillment function "Install Order," associated with the fulfillment provider "WFM," and associated with a processing granularity of "Order."

According to the embodiment, the dependencies of fulfillment flow 800 are applied to order components 1040, 1050, 1055, 1060, 1065, 1070, 1075, 1080, 1085, 1090, and 1095 to generate orchestration plan 1300, so that orchestration plan 1300 includes the dependencies of fulfillment flow 800. More specifically, a dependency between two or more fulfillment functions within fulfillment flow 800 is applied to all order components of orchestration plan 1300 that correspond to the two or more fulfillment functions. For example, in fulfillment flow 800, all of the other fulfillment functions depend on the fulfillment function "Sync Customer." Thus, this dependency is applied to order components 1040, 1050, 1055, 1060, 1065, 1070, 1075, 1080, 1085, 1090, and 1095, so that order components 1055, 1060, 1065, 1070, 1075, 1080, 1085, 1090, and 1095 all depend upon order components 1040 and 1050 (i.e., the order components associated with the fulfillment function "Sync Customer"), as illustrated in FIG. 13.

Thus, in the illustrated embodiment of FIG. 13, an arrow between two or more order components represents a dependency between the two or more order components. For example, the arrow between order component 1040 and order components 1055, 1060, 1075, 1080, and 1095 represents a dependency where order components 1055, 1060, 1075, 1080, and 1095 are dependent upon order component 1040 completing. Likewise, the arrow between order component 1050, and order components 1065, 1070, 1085, and 1090 represents a dependency where order components 1065, 1070, 1085, and 1090 are dependent upon order component 1040 completing. Thus, according to the embodiment, the order components of orchestration plan 1300 can be executed in an order based on the dependencies of orchestration plan 1300.

Thus, in an embodiment, an orchestration plan, unlike a fulfillment flow, contains the necessary fulfillment topology information so that the orchestration plan can be executed for a specific fulfillment topology. Thus, according to the embodiment, if one or more changes are made to a fulfillment topology, no changes are required for the fulfillment flow. Instead, an order decomposition sequence takes into account the changes to the fulfillment topology, and creates a modified set of order components. One or more dependencies of the fulfillment flow then can be applied to the modified order components to create a modified orchestration plan, where the orchestration plan corresponds to the modified fulfillment flow.

According to an embodiment, once an order management system has generated an orchestration plan to manage a fulfillment of an order, a customer may choose to modify the order. In one example, an order management system has generated and executed an orchestration plan to completion for the original order, and has managed a fulfillment of the original order, when a customer creates a change order, requesting that the purchased products via the original order either be cancelled or modified. According to the embodiment, the order management system treats the change order as a separate order, generates an orchestration plan for the change order, and executes the orchestration plan to manage the fulfillment of the change order.

In another example, an order management system has generated an orchestration plan for the original order, and is executing the orchestration plan to manage a fulfillment of the original order (i.e., in-flight order), when a customer creates a revision order, requesting that the in-flight order be modified. According to the embodiment, the order management system can perform change management of the in-flight order. More specifically, the order management system can dynamically suspend the in-flight order, and generate and execute a revision order orchestration plan for the revision order. The revision order orchestration plan accounts for work done on the original orchestration plan that is still applicable, other work that is not necessary and that needs to be undone, other work that need to be redone and other work to be done.

In another example, an order management system has generated an orchestration plan for the original order, and is executing the orchestration plan to manage a fulfillment of the original order (i.e., in-flight order), when a customer creates a cancel order, requesting that the in-flight order be cancelled. According to the embodiment, the order management system can perform change management of the in-flight order. More specifically, the order management system can dynamically suspend the in-flight order, and generate and execute a cancel order orchestration plan. The cancel order orchestration plan undoes work that was done by the original orchestration plan.

FIG. 14 illustrates an example of a change order (i.e., change order 1400), according to an embodiment of the invention. According to an embodiment, change order 1400 is an example of a change order that represents a customer's request to modify purchased products (i.e., customer assets) from a previously-fulfilled order, where the customer's request is captured by an order capture system (such as order capture system 210 of FIG. 2), and where the change order can be fulfilled by an order management system (such as order management system 10 of FIG. 1, and order management system 200 of FIG. 2). Change order 1400 includes order line 1401, which indicates that the product "VoIP Unlimited" is to be deleted from the customer's assets. Change order 1400 further includes order line 1402, which indicates that the product "VoIP Basic" is to be added to the customer's assets. One of ordinary skill in the art would readily appreciate that change order 1400 illustrated in FIG. 14 is merely an example change order, and that change order 1400 can include any number of order lines, where each order line can identify any action, such as adding, updating, or deleting a customer asset.

According to an embodiment, once an order management system receives change order 1400 and identifies change order 1400 as a change order that the order management system can fulfill, the order management system manages a fulfillment of the change order. To fulfill the change order, the order management system first partitions the change order into one or more order components, as described below in greater detail in relation to FIGS. 15-17. Once the change order is partitioned into one or more order components, the order management system generates an orchestration plan, as described below in greater detail in relation to FIG. 18. Once the orchestration plan is generated, the order management system executes the orchestration plan and coordinates a fulfillment of the change order.

Figure 15:
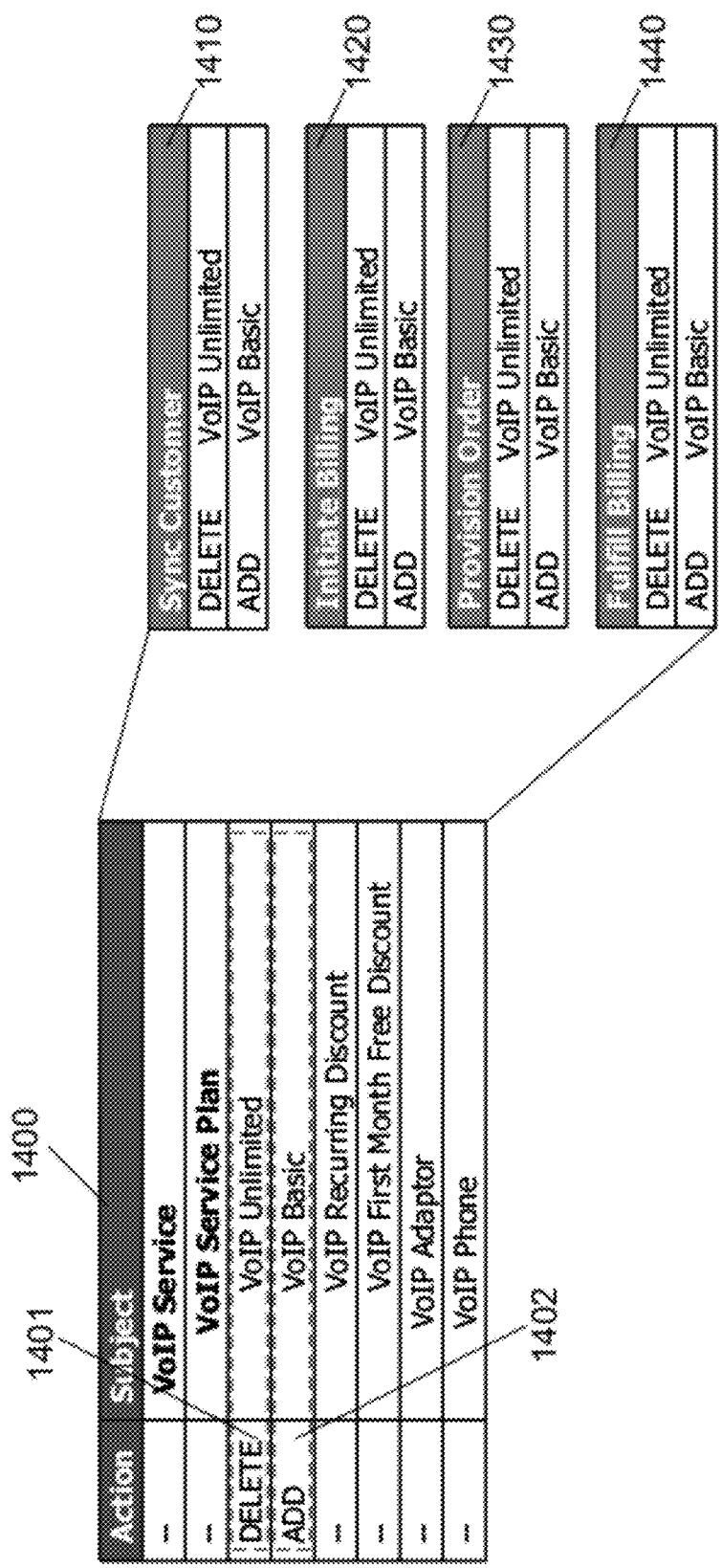
FIG. 15 illustrates an example of a first decomposition stage of a decomposition sequence for the change order, according to an embodiment of the invention.

FIG. 15 illustrates an example of a first decomposition stage of a decomposition sequence for change order 1400, according to an embodiment of the invention. According to the embodiment, the first decomposition stage generates order component 1410 (which corresponds to the fulfillment function "Sync Customer"), order component 1420 (which corresponds to the fulfillment function "Initiate Billing"), order component 1430 (which corresponds to the fulfillment function "Provision Order"), and order component 1440 (which corresponds to the fulfillment function "Fulfill Billing"). The first decomposition stage then determines that order lines 1401 and 1402 of change order 1400 are to be applied to order components 1410, 1420, 1430, and 1440 The first decomposition stage then stores order lines 1401 and 1402 at order components 1410, 1420, 1430, and 1440. Thus, each of order components 1410, 1420, 1430, and 1440 have order lines that correspond to order lines 1401 and 1402 of change order 1400.

Figure 16:
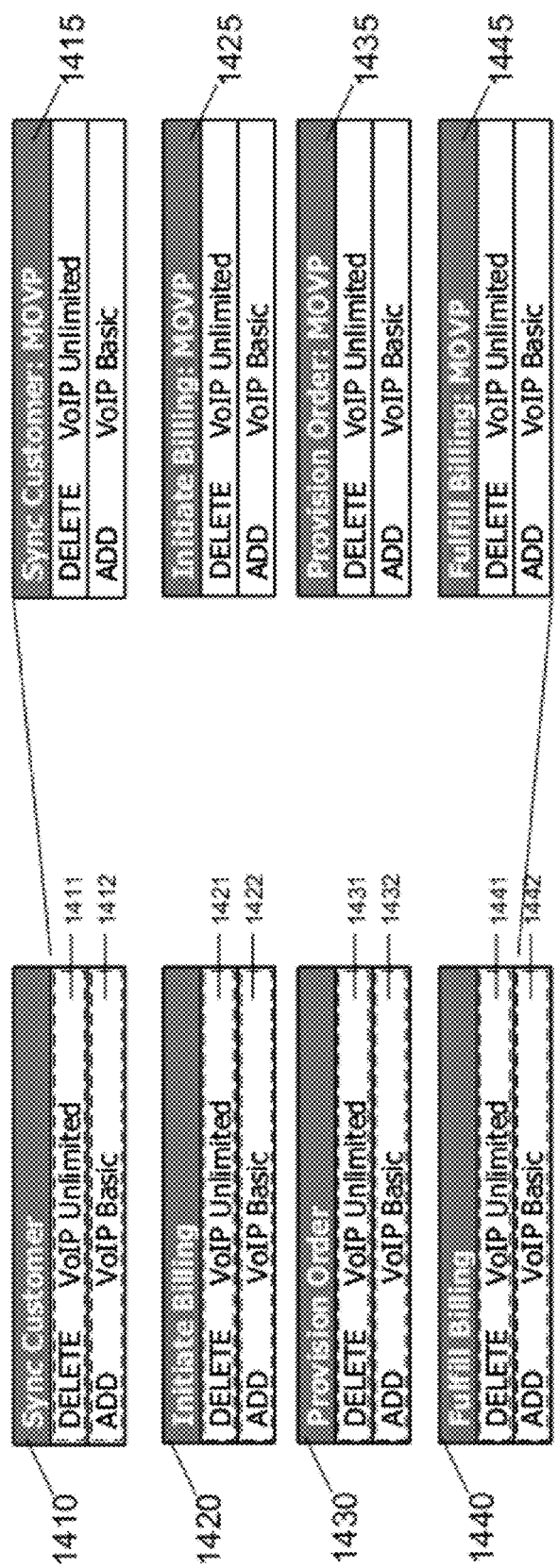
FIG. 16 illustrates an example of a second decomposition stage of a decomposition sequence for the change order, according to an embodiment of the invention.

FIG. 16 illustrates an example of a second decomposition stage of a decomposition sequence for change order 1400, according to an embodiment of the invention. According to the embodiment, the second decomposition stage generates order components 1415, 1425, 1435, and 1445, where each order component corresponds to the fulfillment provider "MOVP." The second decomposition stage then determines that order lines 1411 and 1412 of order component 1410 are to be applied to order component 1415, order lines 1421 and 1422 of order component 1420 are to be applied to order component 1425, order lines 1431 and 1432 of order component 1430 are to be applied to order component 1435, and order lines 1441 and 1442 of order component 1440 are to be applied to order component 1445. The second decomposition stage then stores order lines 1411 and 1412 at order component 1415, stores order lines 1421 and 1422 at order component 1425, stores order lines 1431 and 1432 at order component 1435, and stores order lines 1441 and 1442 at order component 1445. Thus, each of order components 1415, 1425, 1435, and 1445 have order lines that correspond to order lines 1401 and 1402 of change order 1400.

Figure 17:
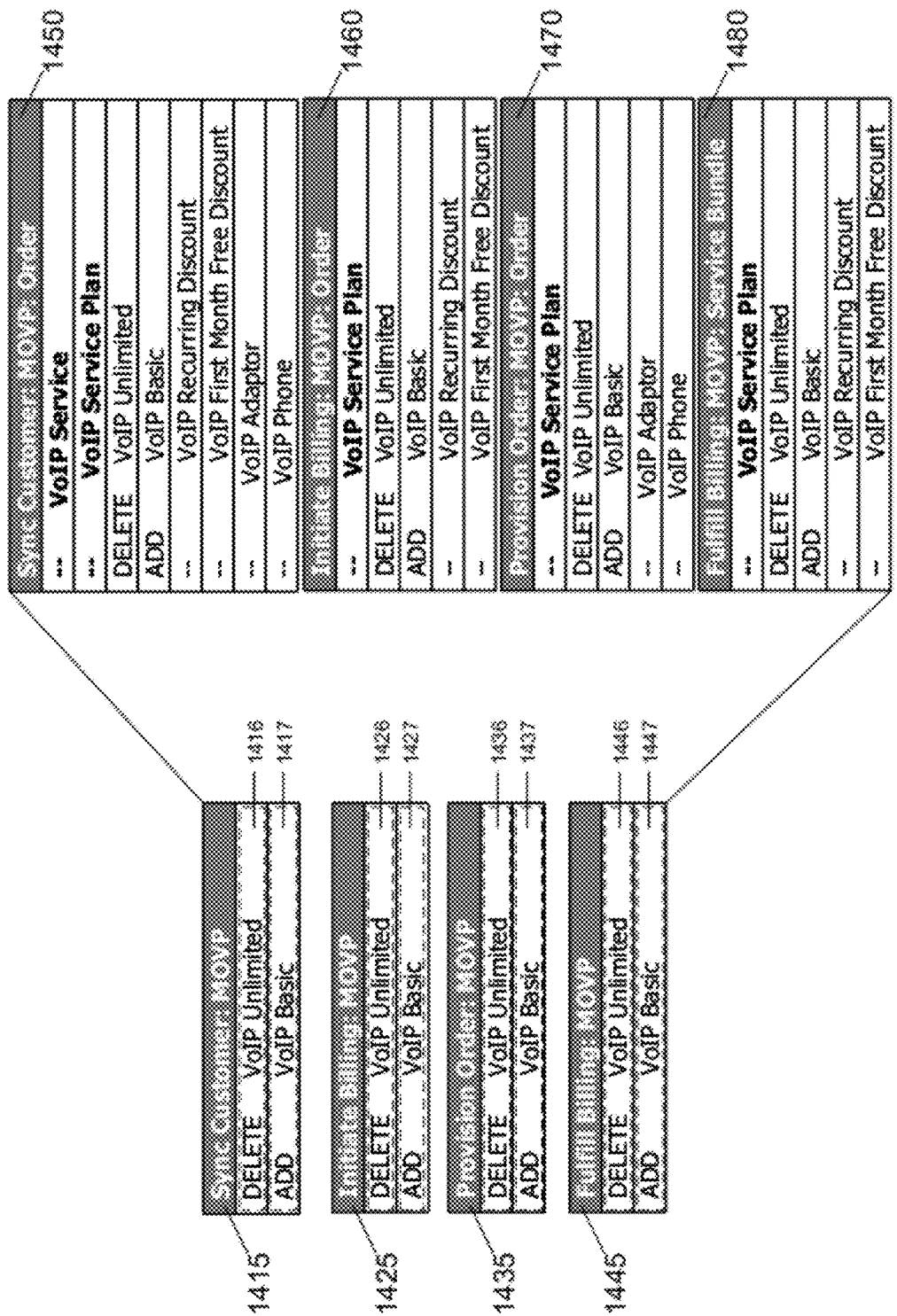
FIG. 17 illustrates an example of a third decomposition stage of a decomposition sequence for the change order, according to an embodiment of the invention.

FIG. 17 illustrates an example of a third decomposition stage of a decomposition sequence for change order 1400, according to an embodiment of the invention. According to the embodiment, the third decomposition stage generates order components 1450, 1460, and 1470 (where each order component corresponds to a processing granularity of "Order"), and generates order component 1480 (which corresponds to a processing granularity of "Service Bundle"). The third decomposition stage then determines that order lines 1416 and 1417 of order component 1415 are to be applied to order component 1450, order lines 1426 and 1427 of order component 1425 are to be applied to order component 1460, order lines 1436 and 1437 of order component 1435 are to be applied to order component 1470, and order lines 1446 and 1447 of order component 1445 are to be applied to order component 1480. The third decomposition stage then stores order lines 1416 and 1417 at order component 1450, stores order lines 1426 and 1427 at order component 1460, stores order lines 1436 and 1437 at order component 1470, and stores order lines 1446 and 1447 at order component 1480. Thus, each of order components 1450, 1460, 1470, and 1480, have order lines that correspond to order lines 1401 and 1402 of change order 1400.

Figure 18:
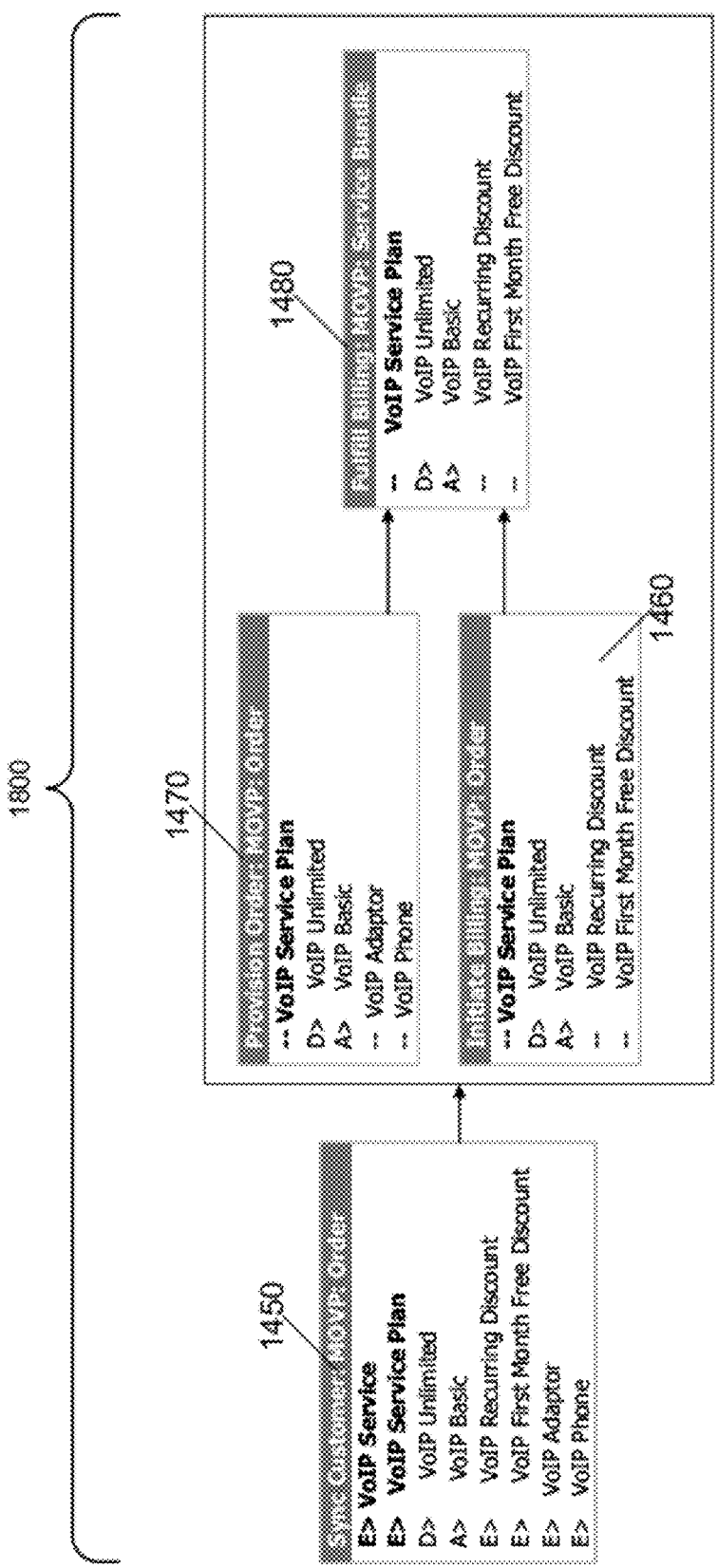
FIG. 18 illustrates an example of an orchestration plan for the change order, according to an embodiment of the invention.

FIG. 18 illustrates an example of an orchestration plan (i.e., orchestration plan 1800), for change order 1400, according to an embodiment of the invention. According to the embodiment, orchestration plan 1800 is generated by applying the dependencies of fulfillment flow 800 of FIG. 8, to order components 1450, 1460, 1470, and 1480 (generated by decomposition sequence 910 of FIG. 9, as illustrated in FIGS. 15-17).

According to the embodiment, order component 1450 is associated with the fulfillment function "Sync Customer," associated with the fulfillment provider "MOVP," and associated with a processing granularity of "Order." Order component 1460 is associated with the fulfillment function "Initiate Billing," associated with the fulfillment provider "MOVP," and associated with a processing granularity of "Order." Order component 1470 is associated with the fulfillment function "Provision Order," associated with the fulfillment provider "MOVP," and associated with a processing granularity of "Order." Order component 1480 is associated with the fulfillment function "Fulfill Billing," associated with the fulfillment provider "MOVP," and associated with a processing granularity of "Service Bundle."

Furthermore, according to the embodiment, the dependencies of fulfillment flow 800 are applied to order components 1450, 1460, 1470, and 1480 to generate orchestration plan 1800, so that orchestration plan 1800 includes the dependencies of fulfillment flow 800. Thus, in the illustrated embodiment of FIG. 18, an arrow between two or more order components represents a dependency between the two or more order components. For examples, the arrow between order component 1450 and order components 1460, 1470, and 1480 represents a dependency where order components 1460, 1470, and 1480 are dependent upon order component 1450 completing. Likewise, the arrow between order components 1460 and 1480, and the arrow between order components 1470 and 1480, together represent a dependency where order component 1480 is dependent upon both order components 1460 and 1470 completing. Thus, according to the embodiment, the order components of orchestration plan 1800 can be executed in an order based on the dependencies of orchestration plan 1800.

FIG. 19 illustrates an example of a revision order (i.e., revision order 1900) that revises a change order (i.e., change order 1400), according to an embodiment of the invention. According to an embodiment, as previously described, an order management system (such as order management system 10 of FIG. 1, and order management system 200 of FIG. 2) can receive and fulfill change order 1400, where change order 1400 is an example of a change order that represents a customer's request to modify a previously-fulfilled order. As also previously described, change order 1400 includes order line 1401, which indicates that the product "VoIP Unlimited" is to be deleted from the customer's original order, and includes order line 1402, which indicates that the product "VoIP Basic" is to be added to the customer's original order.

In accordance with the embodiment, while the order management system is fulfilling change order 1400, an order capture system (such as order capture system 210 of FIG. 2), can capture revision order 1900, where revision order 1900 represents a customer's request to revise the customer's previous request to modify a previously-fulfilled offer (i.e., a customer's request to revise an in-flight order based on change order 1400). According to the embodiment, revision order 1900 includes order line 1901, which indicates that the product "VoIP Unlimited" is to be added back to the customer's order. Revision order 1900 further includes order line 1902, which indicates that the product "VoIP Basic" is to be deleted from the customer's order, and that the product "VoIP Voicemail" is to be added to the customer's order in its place. One of ordinary skill in the art would readily appreciate that revision order 1900 illustrated in FIG. 19 is merely an example revision order, and that revision order 1900 can include any number of order lines, where each order line can identify any action, such as adding, updating, or deleting any product or customer asset.

According to an embodiment, once the order management system receives revision order 1900 and identifies revision order 1900 as a revision order that the order management system can fulfill, the order management system partitions the revision order into one or more components, as previously described in relation to FIGS. 15-17. Once the revision order is partitioned into one or more order components, the order management system manages a revision of the in-flight order that is being fulfilled by the order management system, as described below in greater detail in relation to FIGS. 20-21. In one embodiment, the management of the revision of the in-flight order includes a generation and execution of a revision order orchestration plan, as is also described below in greater detail.

Figure 20:
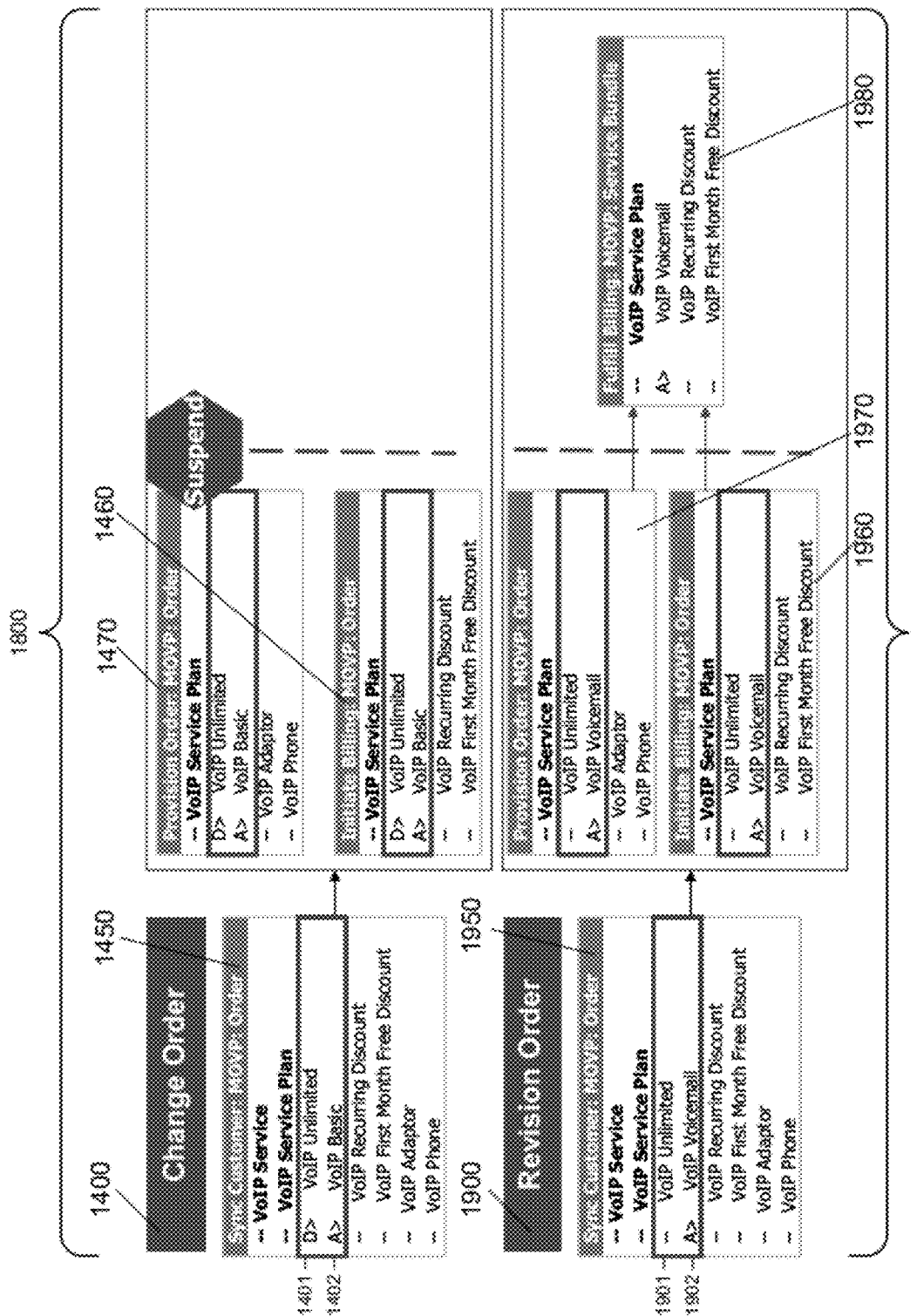
FIG. 20 illustrates an example of change management of the change order based on the revision order, according to an embodiment of the invention.

FIG. 20 illustrates an example of change management of the change order (i.e., change order 1400) based on the revision order (i.e., revision order 1900), according to an embodiment of the invention. According to an embodiment, it is determined whether revision order 1900 is a revision order of change order 1400. In one embodiment, it is determined whether revision order 1900 is a revision order of change order 1400, by determining if revision order 1900 includes an order number that is the same as an order number of change order 1400. In other embodiments, it is determined whether revision order 1900 is a revision order of change order 1400 by determining whether a key associated with revision order 1900 matches a key associated with change order 1400. According to these embodiments, a key can be one or more attributes associated with a revision order, or a change order, where the key is defined by metadata of the order management system. The key can then uniquely identify revision order, or a change order, across all revisions of the revision order, or change order. In certain embodiments, a revision identifier of revision order 1900 is compared with a revision identifier of change order 1400. A revision identifier is an attribute of an order that identifies a version of an order. If a value of the revision identifier of revision order 1900 is not greater than a value of the revision identifier of change order 1400, then change management is terminated. This is because revision order 1900 is "out-of-date" as compared to change order 1400 (i.e., change order 1400 originated after revision order 1900). If revision order 1900 is a revision order of change order 1400, it is determined whether there are any differences between change order 1400 and revision order 1900, in one embodiment. According to the embodiment, if there are differences between change order 1400 and revision order 1900, then change management of change order 1400 proceeds. Also according to the embodiment, if there are no differences between change order 1400 and revision order 1900, then change management ends. In alternate embodiments, a threshold can be defined that determines whether differences between change order 1400 and revision order 1900 are sufficient to warrant change management, where a threshold can be any number of differences between change order 1400 and revision order 1900. An example of a difference between change order 1400 and revision order 1900 is a changed attribute, where an attribute has a value for change order 1400, and has a different value for revision order 1900. As previously discussed in relation to FIG. 19, there are differences between change order 1400 and revision order 1900. Specifically, change order 1400 includes order line 1401, which indicates that the product "VoIP Unlimited" is to be deleted, and includes order line 1402, which indicates that the product "VoIP Basic" is to be added. Whereas, revision order 1900 includes order line 1901, which indicates that the product "VoIP Unlimited" is to stay as is (i.e., not be deleted or modified as an existing customer asset), and includes order line 1902, which indicates that the product "VoIP Voicemail" is to be added. The fact that revision order 1900 does not include an order line for the product "VoIP Basic" indicates that the product is not being added.

According to the embodiment, once it is determined that there are differences between change order 1400 and revision order 1900, orchestration plan 1800 (which is the orchestration plan that corresponds to change order 1400, and which is executing at the time) is suspended. In the illustrated embodiment, orchestration plan 1800 is suspended after the steps of order components 1450, 1460, and 1470 (shown in FIG. 20) have been executed, and before the steps of order component 1480 (not shown in FIG. 20) has been executed. However, this is merely an example, and in alternate embodiments, orchestration plan 1800 can be suspended at any point in time. In certain embodiments, once it is determined there are differences between change order 1400 and revision order 1900, and before orchestration plan 1800 is suspended, it is determined whether modification of orchestration plan 1800 is possible. For example, it can be determined how far one or more order lines of orchestration plan 1800 have proceeded, where the one or more order lines are affected by the modification of orchestration plan 1800. As an example, it can be determined whether any of the one or more order lines of orchestration plan 1800 that are affected by the modification of orchestration plan 1800 have passed a PONR. In the example, if any of the one or more order lines of orchestration plan 1800 that are affected by the modification of orchestration plan 1800 have passed a PONR, it can be determined that orchestration plan 1800 cannot be modified. Finally, in certain embodiments, once it is determined there are differences between change order 1400 and revision order 1900, and before orchestration plan 1800 is suspended, compensation of orchestration plan 1800 can optionally be delayed for a period of time (identified as a "grace period"), to allow activity within orchestration plan 1800 to complete. During the grace period, no new fulfillment functions within orchestration plan 1800 are initiated. Instead, fulfillment functions within orchestration plan 1800 that were previously started are given an opportunity to complete. In these embodiments, the compensation of orchestration plan 1800 begins either at the end of the grace period, or when all the previously started fulfillment functions within orchestration plan 1800 are completed.

According to the embodiment, after orchestration plan 1800 is suspended, revision order 1900 is partitioned by a decomposition sequence into order components 1950, 1960, 1970, and 1980, and orchestration plan 2000 is generated based on order components 1950, 1960, 1970, and 1980. It is important to note that orchestration plan 2000 is not a revision order orchestration plan, but instead, is an orchestration plan that corresponds to revision order 1900 as if revision order 1900 was a regular change order. It is also important to note that an order management system does not execute orchestration plan 2000 to fulfill revision order 1900, but instead, compares orchestration plan 2000 with orchestration plan 1800 to determine differences between the two orchestration plans. If differences between orchestration plan 1800 and orchestration plan 2000 are determined, the differences between the two orchestration plans are used, in part, to generate a revision order orchestration plan (illustrated in FIG. 21, and discussed in greater detail in relation to FIG. 21). According to the embodiment, the revision order orchestration plan is executed to fulfill revision order 1900, and to perform change management of change order 1400.

Figure 21:
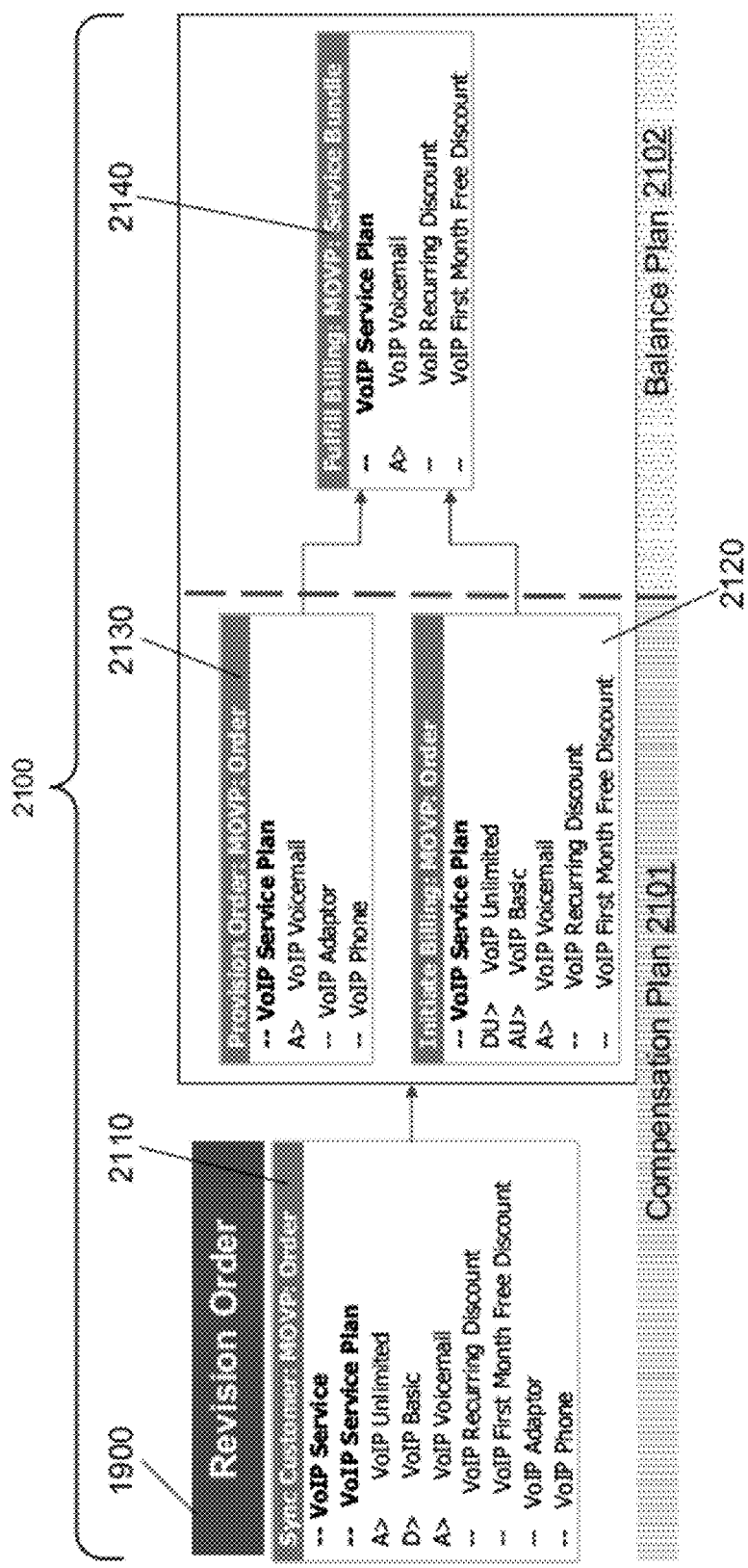
FIG. 21 illustrates an example of a revision order orchestration plan for the revision order, according to an embodiment of the invention.

FIG. 21 illustrates an example of a revision order orchestration plan (i.e. revision order orchestration plan 2100) for the revision order, according to an embodiment of the invention. According to the embodiment, revision order orchestration plan 2100 is generated, in part, based on the differences between orchestration plan 1800 and orchestration plan 2000. More specifically, in one embodiment, the order components of orchestration plan 1800 are compared with the order components of orchestration plan 2000 to determine differences between the two sets of order components. The differences between the two sets of order components are used, in part, to identify a compensation type corresponding to each difference. Each compensation type is subsequently used to generate an order component of revision order orchestration plan 2100.

In one embodiment, differences between the two sets of order components are determined, and compensation types are identified, based on the criteria specified in the following table:

| Original Order Component | Revised Order Component | Compensation Type |
| --- | --- | --- |
| Exists | No Matching Component | Undo |
| No Matching Component | Exists | Do (executed after compensation is completed) |

-continued

| Original Order Component | Revised Order Component | Compensation Type |
|---|---|---|
| Exists | Matching Component Exists; One or More Order Line Changes | Redo |
| Exists | Matching Component Exists; No Order Line Changes | No Compensation |

According to an embodiment, a compensation type of "Undo" can be used to create an order component for a revision order orchestration plan that undoes one or more actions of a corresponding order component of the original orchestration plan. In one embodiment, the order component of the revision order orchestration plan can undo one or more actions of a corresponding order component of the original orchestration plan by including one or more order lines, where the one or more order lines reverse the actions of the one or more order lines of the corresponding order component. For example, if an order component of an original orchestration plan includes an order line with an "Add" action for a first product, and an order line with a "Delete" action for a second product, an order component of a revision order orchestration plan can include an order line with a "Delete" action for the first product, and an order line with an "Add" action for the second product. In another embodiment, the order component of the revision order orchestration plan can undo one or more of the corresponding order component of the original orchestration plan by including one or more order lines, where the one or more order lines include "Undo" actions.

Furthermore, in accordance with the embodiment, a compensation type of "Do" can be used to create an order component that is executed as part of the revision order orchestration plan, and performs one or more new actions. In one embodiment, the order component is executed after compensation is completed.

Furthermore, in accordance with the embodiment, a compensation type of "Redo" can be used to create an order component for a revision order orchestration plan that redoes one or more actions of a corresponding order component of the original orchestration plan. In one embodiment, the order component of the revision order orchestration plan can redo one or more actions of a corresponding order component of the original orchestration plan by including one or more order lines, where the one or more order lines redo the actions of the one or more order lines of the corresponding order component. For example, if an order component of an original orchestration plan includes an order line with an "Add" action for a first product, and an order line with a "Delete" action for a second product, an order component of a revision order orchestration plan can include an order line with an "Add" action for the first product, and an order line with a "Delete" action for the second product. In another embodiment, the order component of the revision order orchestration plan can redo one or more actions of the corresponding order component of the original orchestration plan by including one or more order lines, where the one or more order lines include "Redo" actions.

According to an embodiment, a revision order orchestration plan is comprised of two sub-plans: a compensation plan and a balance plan. A compensation plan includes one or more order components that compensate for one or more order components of a corresponding orchestration plan that have already executed before the corresponding orchestration plan was suspended. A balance plan includes one or more order components that have not been executed by the corresponding orchestration plan. The one or more order components of the balance plan are identical to one or more order components from the orchestration plan that corresponds to the revision order.

In the illustrated embodiment of FIG. 21, revision order orchestration plan 2100 includes two sub-plans: compensation plan 2101, and balance plan 2102. According to the illustrated embodiment, compensation plan 2101 of revision order orchestration plan 2100 includes order components 2110, 2120, and 2130. In accordance with the embodiment, order components 2110, 2120, and 2130 are created based on the differences between order components 1450, 1460, and 1470 of orchestration plan 1800, and order components 1950, 1960, and 1970 of orchestration plan 2000. Also in accordance with the embodiment, order components 2110, 2120, and 2130 can compensate order components 1450, 1460, and 1470 of orchestration plan 1800.

Also according to the illustrated embodiment, balance plan 2102 of revision order orchestration plan 2100 includes order component 2140. In accordance with the embodiment, order component 2140 is identical to order component 1980 of orchestration plan 2000.

According to an embodiment, a revision order orchestration plan is executed by first executing the compensation plan of the revision order orchestration plan, and then executing the balance plan of the revision order orchestration plan. Also according to the embodiment, the execution of the compensation plan of the revision order orchestration plan includes two stages. The first stage is identified as a "reverse stage." In the reverse stage, only order components with order lines that include "Undo" actions are executed. Furthermore, order components with order lines that include "Undo" actions are executed in a reverse order of dependencies. For example, if order component A includes one or more order lines with "Undo" actions, order component B also includes one or more order lines with "Undo" actions, and order component B depends upon order component A, so that order component B only executes when order component A has completed, then all order lines of order component B with "Undo" actions are executed before any order lines of order component A with "Undo" actions are executed. Furthermore, the execution takes into account dependencies that exist in the original orchestration plan, rather than the revision order orchestration plan.

The second stage is identified as a "forward stage." In the forward stage, all order components with order lines that include actions other than "Undo" actions are executed. Furthermore, order components with order lines that include actions other than "Undo" actions are executed in a conventional order of dependencies. Furthermore, the execution takes into account dependencies that exist in the revision order orchestration plan, rather than the original orchestration plan.

In the illustrated embodiment of FIG. 21, revision order orchestration plan 2100 first executes compensation plan 2101. According to the illustrated embodiment, in executing compensation plan 2101, revision order orchestration plan 2100 first executes the reverse stage. In executing the reverse stage, revision order orchestration plan 2100 executes the "Delete-Undo" action of product "VoIP Unlimited" (indicated in FIG. 21 as "DU") and the "Add-Undo" action of product "VoIP Basic" (indicated in FIG. 21 as "AU") of order component 2120. Subsequently, in executing compensation plan 2101, revision order orchestration plan 2100 executes the forward stage. In executing the forward stage, revision order orchestration plan 2100 executes the "Add" action of product "VoIP Unlimited" (indicated in FIG. 21 as "A"), executes the "Delete" action of product "VoIP Basic" (indicated in FIG. 21 as "D"), and executes "Add action of product "VoIP Voicemail" (also indicated in FIG. 21 as "A"), of order component 2110. In executing the forward stage, revision order orchestration plan 2100 also executes the "Add" action of product "VoIP Voicemail" (also indicated in FIG. 21 as "A"), of order component 2120, and also executes the "Add" action of product "VoIP Voicemail" (also indicated in FIG. 21 as "A"), of order component 2130.

Subsequently, revision order orchestration plan 2100 executes balance plan 2102. In executing balance plan 2102, revision order orchestration plan 2100 executes the "Add" action of product "VoIP Voicemail" (also indicated in FIG. 21 as "A") of order component 2140. Thus, according to the embodiment, through the execution of revision order orchestration plan 2100, an order management system can fulfill revision order 1900.

Figure 22:
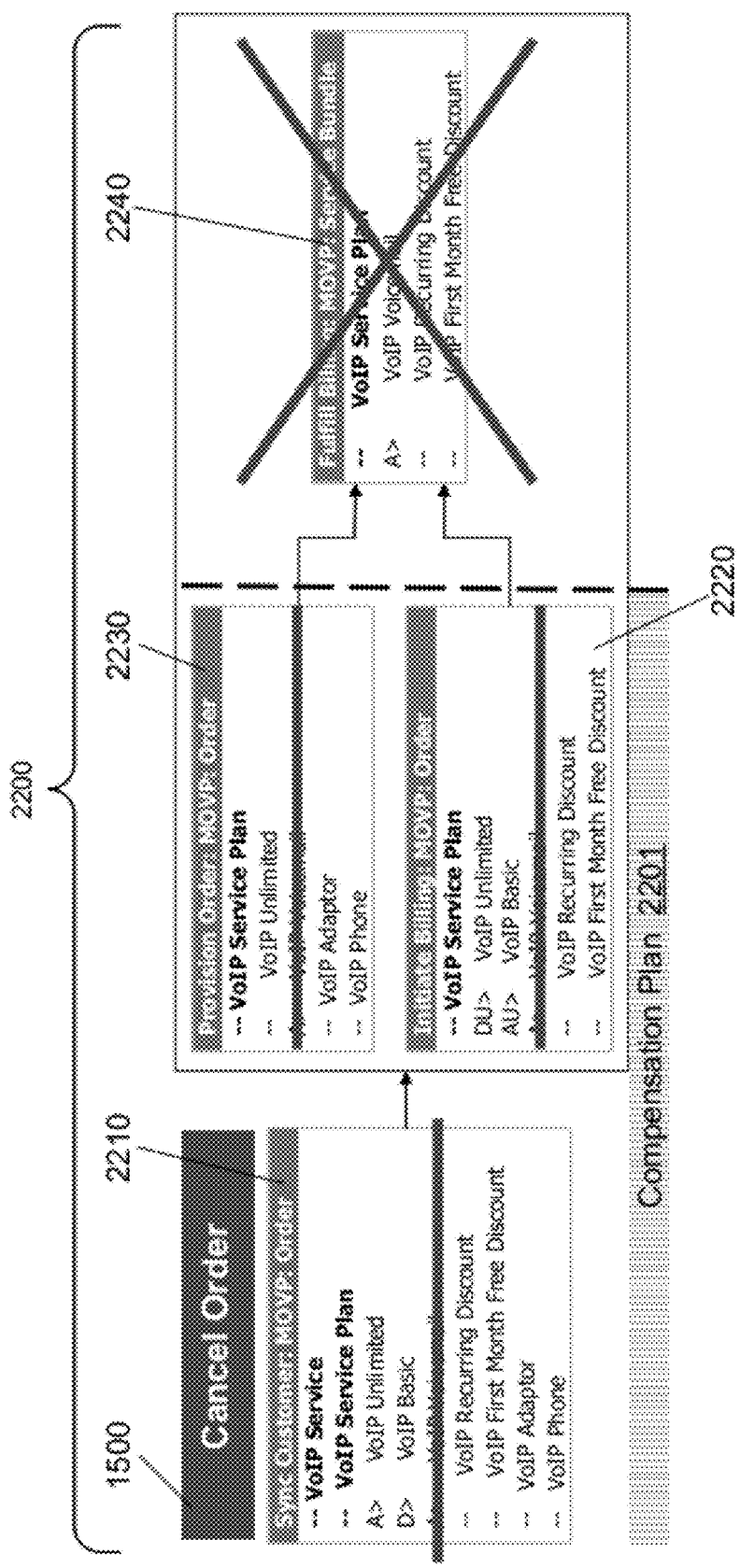
FIG. 22 illustrates an example of a cancel order orchestration plan for a cancel order, according to an embodiment of the invention.

FIG. 22 illustrates an example of a cancel order orchestration plan (i.e., cancel order orchestration plan 2200) for a cancel order, according to an embodiment of the invention. According to an embodiment, as previously described, an order management system (such as order management system 10 of FIG. 1, and order management system 200 of FIG. 2) can receive and fulfill change order 1400, where change order 1400 is an example of a change order that represents a customer's request to modify customer assets from a previously-fulfilled order. As also previously described, change order 1400 includes order line 1401, which indicates that the product "VoIP Unlimited" is to be deleted from the customer's assets, and includes order line 1402, which indicates that the product "VoIP Basic" is to be added to the customer's assets.

In accordance with the embodiment, while the order management system is fulfilling change order 1400, an order capture system (such as order capture system 210 of FIG. 2), can capture cancel order 1500, where cancel order 1500 represents a customer's request to cancel the customer's previous request to modify customer assets (i.e., a customer's request to cancel an in-flight order based on change order 1400).

According to an embodiment, once the order management system receives cancel order 1500 and identifies cancel order 1500 as a cancel order that the order management system can fulfill, the order management system manages a cancellation of the in-flight order that is being fulfilled by the order management system. The management of the cancellation of the in-flight order, is similar to a management of an empty revision of an in-flight order (i.e., a revision order with no order lines that have any actionable action on them), as described in relation to FIGS. 20-21, except that a cancel order orchestration plan is generated and executed, rather than a revision order orchestration plan. A cancel order orchestration plan is substantially similar to a revision order orchestration plan with the following exceptions. A cancel order orchestration plan only includes one sub-plan, a compensation plan, and does not include a balance plan. Furthermore, each order component of the compensation plan of a cancel order orchestration plan only include order lines that correspond to a compensation type of "Undo." Thus, the compensation of a cancel order orchestration plan only includes the undoing of actions that have been performed by an original orchestration plan.

In the illustrated embodiment of FIG. 22, cancel order orchestration plan 2200 only includes compensation plan 2201, and does not include a balance plan. Furthermore, cancel order orchestration plan 2200 only includes order components 2210, 2220, and 2230, and does not include order component 2240. In addition, order components 2210, 2220, and 2230 only include order lines with actions that correspond to a compensation type of "Undo," and do not include order lines with actions that correspond to other compensation types. Thus, according to the embodiment, cancel order orchestration plan 2200 only undoes the actions performed by orchestration plan 1800.

In certain embodiments, order perspectives can be used to determine which order items (including their associated data) are available to each order component when each order component is compensated as part of a compensation plan. Order perspectives are described below in greater detail in relation to FIG. 55.

According to an embodiment, fulfillment patterns (and thus, fulfillment flows which are based on one or more fulfillment patterns) are decoupled from a fulfillment topology. This means that a product specification, that is associated with a fulfillment pattern that can carry out the core capability described by the product specification, does not include any fulfillment topology information within its metadata. This also means that no fulfillment topology information is used by the product specification to create the fulfillment pattern, and that the product specification (and corresponding fulfillment pattern) can be applied to any fulfillment topology without configuring the product specification (and thus, without configuring the corresponding fulfillment pattern).

Furthermore, in accordance with an embodiment, an order management system can recognize an order received from an order capture system, and can recognize that there are one or more fulfillment systems, that are part of a fulfillment topology, that can fulfill the order, where each fulfillment system is capable of providing one or more fulfillment functions. As part of the fulfillment topology, each fulfillment system can have one or more fulfillment providers. However, the order management system can utilize an interface of a fulfillment system that is exposed to the order management system to interact with each fulfillment system, where the fulfillment provider information is hidden. In other words, the order management system can interact with the fulfillment system through the exposed interface of the fulfillment system, where the exposed interface provides a fulfillment function required by the fulfillment pattern, and where one or more fulfillment providers of a fulfillment system can conform to the exposed interface. Thus, the fulfillment provider information can be hidden from the order management system. This means that any product specification associated with a fulfillment pattern may not include any fulfillment topology information within its metadata. Instead, according to the embodiment, the product specification only needs to include fulfillment function information within its metadata.

According to an embodiment, one or more routing rules can be utilized to determine which fulfillment provider fulfills an order line of an order. A routing rule is a persistent program, or logic, that determines which order line of an order is applied to which fulfillment provider. In other words, one or more routing rules can indicate how to partition an order based on fulfillment provider. For example, a routing rule can indicate that if a customer class of an order is residential, then an order line is applied to a first fulfillment provider. As another example, a routing rule can indicate that if a service type is Digital Subscriber Line ("DSL"), then an order line is applied to a second specific fulfillment provider.

In one embodiment, one or more routing rules can be used with a decomposition sequence to partition the order, and apply each order line of an order to an order component associated with a fulfillment provider. For example, decomposition stage 930, illustrated in FIG. 9, can utilize one or more routing rules to apply one or more order lines of an order to one or more order components associated with one or more fulfillment providers. According to an embodiment, a routing rule can be utilized merely to apply an order line to an order component associated with a fulfillment provider, and other decomposition actions, such as applying an order line to an order component associated with a fulfillment system can be accomplished by other decomposition stages of the decomposition sequence.

In accordance with the embodiment, the one or more routing rules can be decoupled from a product specification, and corresponding fulfillment pattern. According to the embodiment, the product specification, and corresponding fulfillment pattern does not include any fulfillment topology information. Instead, the fulfillment topology information is included within the one or more routing rules. Thus, a decomposition sequence can be used to partition an order into one or more order components using, in part, fulfillment topology information contained within one or more routing rules. Subsequently, one or more dependencies of a fulfillment flow, that includes one or more fulfillment patterns, with each fulfillment pattern corresponding to a product specification, can be applied to the one or more order components to create an orchestration plan, as previously described. Thus, according to one embodiment, fulfillment flows are decoupled from a fulfillment topology.

Figure 23:
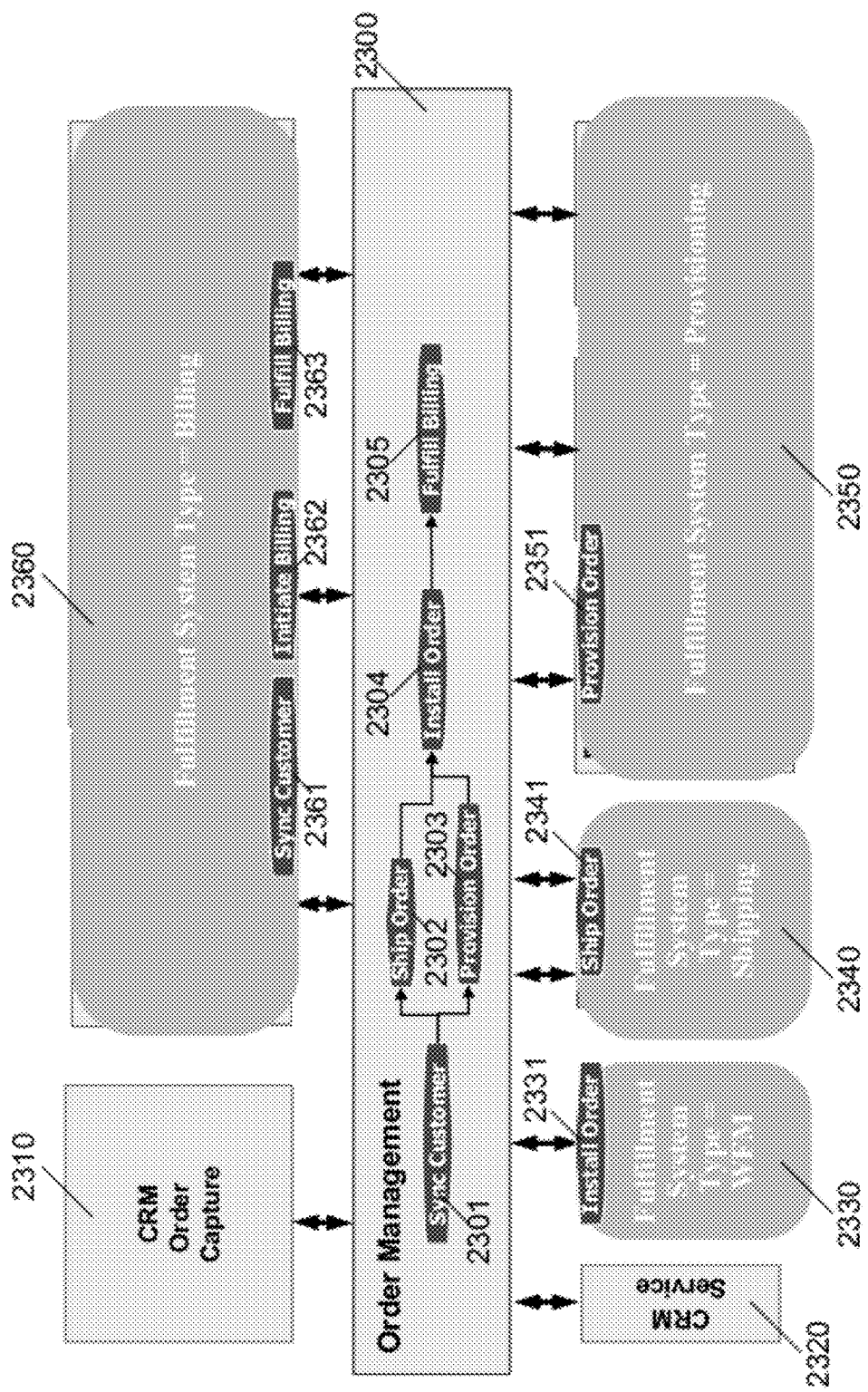
FIG. 23 illustrates an example of decoupling a fulfillment topology from a fulfillment flow, according to an embodiment of the invention.

FIG. 23 illustrates an example of decoupling a fulfillment topology from a fulfillment flow, according to an embodiment of the invention. According to the embodiment, a fulfillment topology is illustrated in FIG. 23 that includes order management system 2300, CRM order capture 2310, CRM service 2320, and fulfillment systems 2330, 2340, 2350, and 2360. Fulfillment system 2330 has a fulfillment system type of "WFM", fulfillment system 2340 has a fulfillment system type of "Shipping", fulfillment system 2350 has a fulfillment system type of "Provisioning", and fulfillment system 2360 has a fulfillment system type of "Billing."

According to the illustrated embodiment, order management system 2300 includes a sample fulfillment pattern, which includes fulfillment functions 2301, 2302, 2303, 2304, and 2305. Fulfillment function 2301 is a fulfillment function "Sync Customer," fulfillment function 2302 is a fulfillment function "Ship Order," fulfillment function 2303 is a fulfillment function "Provision Order," fulfillment function 2304 is a fulfillment function "Install Order," and fulfillment function 2305 is a fulfillment function "Fulfill Billing."

According to the embodiment, each of fulfillment systems 2330, 2340, 2350, and 2360 can provide one or more fulfillment functions that can be utilized by the fulfillment pattern of order management system 2300. According to the illustrated embodiment, fulfillment system 2330 provides fulfillment function 2331, which is a fulfillment function "Install Order." Fulfillment system 2340 provides fulfillment function 2341, which is a fulfillment function "Ship Order." Fulfillment system 2350 provides fulfillment function 2351, which is a fulfillment function "Provision Order." Fulfillment system 2360 provides fulfillment functions 2361, 2362, and 2363, which are fulfillment functions "Sync Customer," "Initiate Billing," and "Fulfill Billing," respectively.

In accordance with the embodiment, all fulfillment topology information, such as an identity of one or more fulfillment providers for each of fulfillment systems 2330, 2340, 2350, and 2360, is hidden from the fulfillment pattern of order management system 2300. Thus, the fulfillment pattern of order management system 2300 is decoupled from the fulfillment topology illustrated in FIG. 23. The fulfillment topology information that is hidden from the fulfillment pattern of order management system 2300 is described in greater detail below in relation to FIG. 24.

Figure 24:
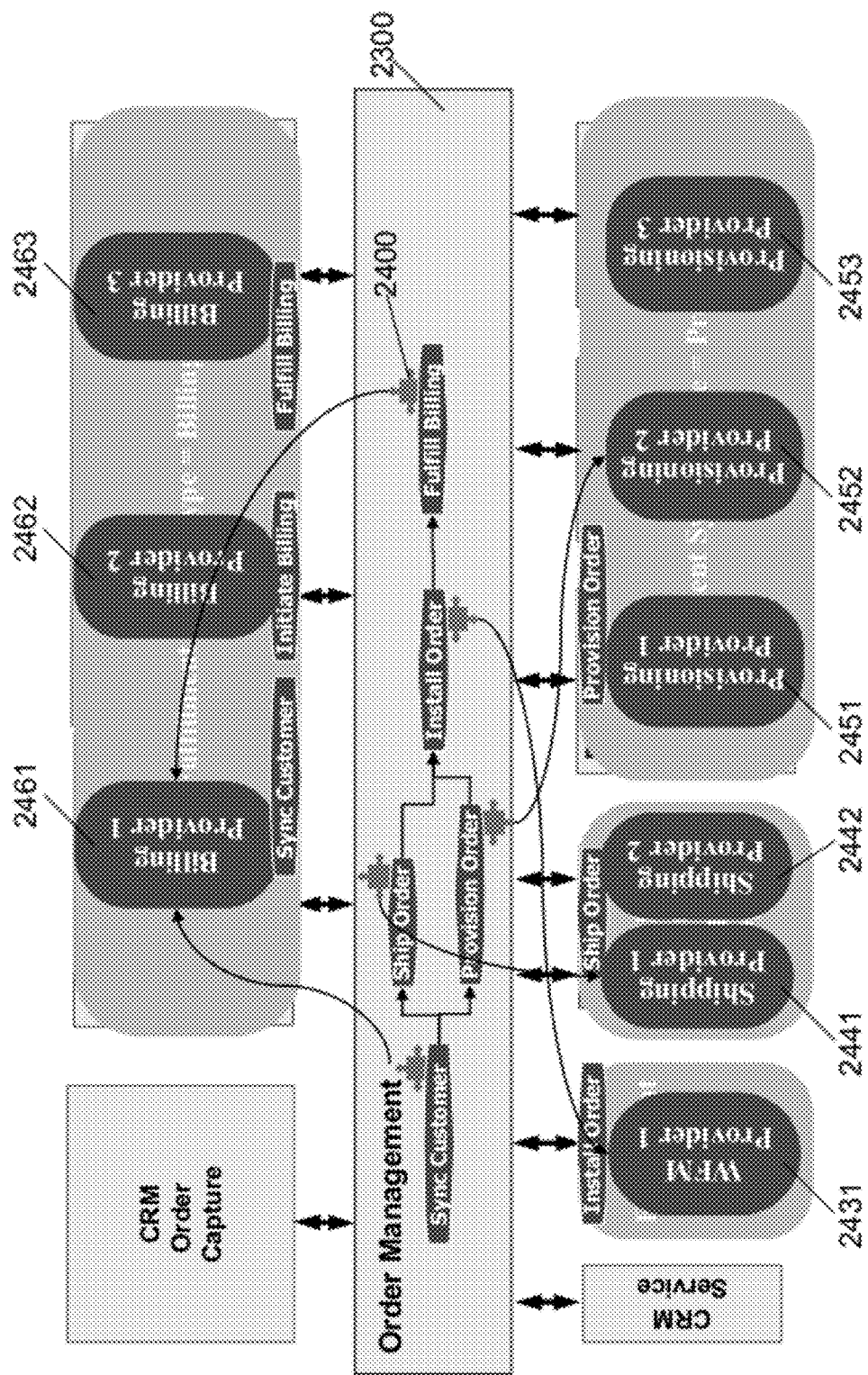
FIG. 24 illustrates an example of fulfillment topology data that is hidden from a fulfillment flow, according to an embodiment of the invention.

FIG. 24 illustrates an example of fulfillment topology information that is hidden from a fulfillment flow, according to an embodiment of the invention. According to the embodiment, the fulfillment topology illustrated in FIG. 24 is substantially identical to the fulfillment topology illustrated in FIG. 23, and identical components of the fulfillment topology are not referred to in describing FIG. 24. However, as can be seen in the illustrated embodiment of FIG. 24, the fulfillment provider information that is hidden from the fulfillment flow of order management system 2300 is visible in FIG. 24. More specifically, the fulfillment provider information includes fulfillment provider 2431 ("WFM Provider 1"), fulfillment providers 2441 and 2442 ("Shipping Provider 1" and "Shipping Provider 2", respectively), fulfillment providers 2451, 2452, and 2453 ("Provisioning Provider 1," "Provisioning Provider 2," and "Provisioning Provider 3", respectively), and billing providers 2461, 2462, and 2463 ("Billing Provider 1," "Billing Provider 2," and "Billing Provider 3," respectively).

According to the embodiment, the fulfillment pattern of order management system 2300 does not directly interface with any of the above mentioned fulfillment providers. Instead, the fulfillment pattern interfaces with one of interfaces 2400, and the corresponding interface 2400 interfaces with the appropriate fulfillment provider. This way, the fulfillment pattern is decoupled from the fulfillment topology. Thus, in one embodiment, if the fulfillment topology changes (for example, fulfillment providers 2461, 2462, and 2463 are consolidated into a single fulfillment provider that provides one or more billing fulfillment functions), the fulfillment pattern of order management system 2300 does not need to be changed.

To further illustrate certain embodiments of the invention, several use case scenarios of an order management system are described below in relation to FIGS. 25-41. However, one of ordinary skill in the art would readily appreciate that the illustrated use case scenarios are example scenarios according to certain embodiments of the invention, and that, in alternate embodiments, different use scenarios may be implemented by an order management system, and still be within a scope of the invention.

Figure 25:
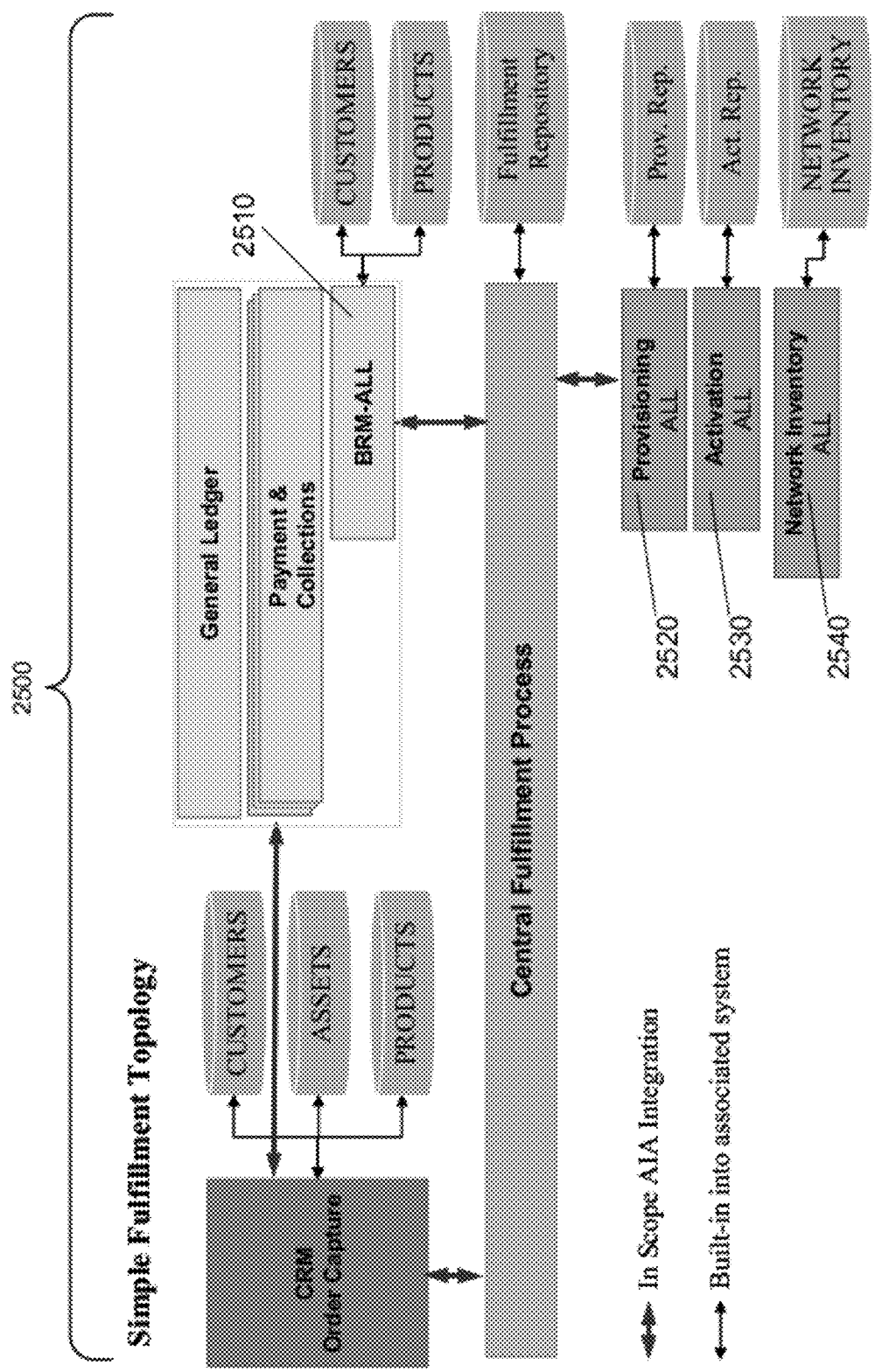
FIG. 25 illustrates an example fulfillment topology, according to an embodiment of the invention.

FIG. 25 illustrates an example fulfillment topology (i.e., fulfillment topology 2500), according to an embodiment of the invention. Fulfillment topology 2500 is an example of a fulfillment topology with one fulfillment provider for each fulfillment system type. More specifically, fulfillment topology 2500 includes fulfillment provider 2510, which has a fulfillment system type of "Billing" and provides one or more billing fulfillment functions. Fulfillment topology 2500 further includes fulfillment provider 2520, which has a fulfillment system type of "Provisioning" and provides one or more provisioning fulfillment functions. Fulfillment topology 2500 further includes fulfillment provider 2530, which has a fulfillment system type of "Activation" and provides one or more activation fulfillment functions. Fulfillment topology 2500 further includes fulfillment provider 2540, which has a fulfillment system type of "Network Inventory" and provides one or more network inventory fulfillment functions.

Figure 26:
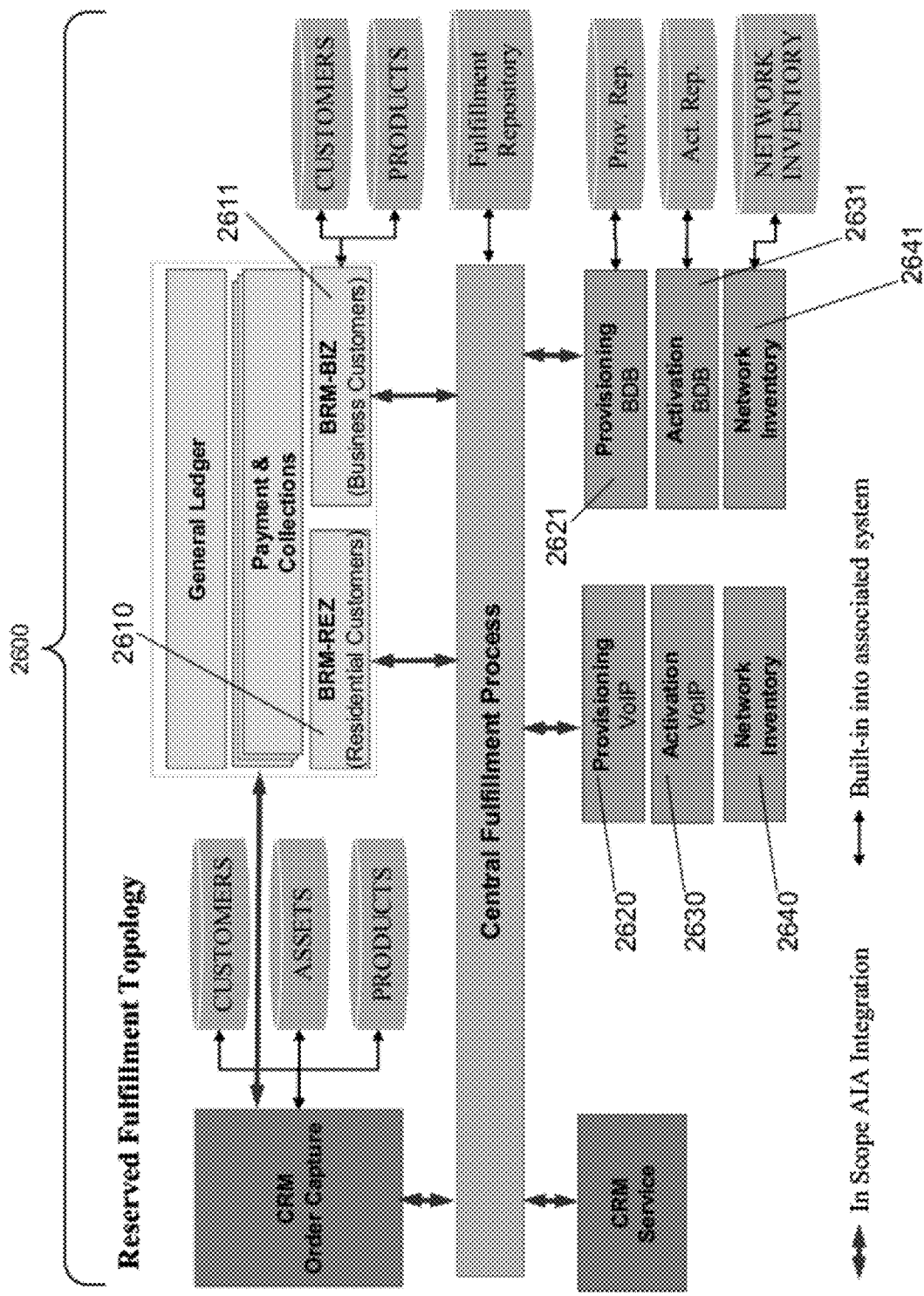
FIG. 26 illustrates another example fulfillment topology, according to an embodiment of the invention.

FIG. 26 illustrates another example fulfillment topology (i.e., fulfillment topology 2600), according to an embodiment of the invention. In contrast to fulfillment topology 2500, fulfillment topology 2600 is an example of a fulfillment topology with two fulfillment providers for each fulfillment system type. More specifically, fulfillment topology 2600 includes fulfillment providers 2610 and 2611, which each have a fulfillment system type of "Billing" and each provide one or more billing fulfillment functions. Fulfillment provider 2610 provides one or more billing fulfillment functions for residential customers, and fulfillment provider 2611 provides one or more billing fulfillment functions for business customers. Fulfillment topology 2600 further includes fulfillment providers 2620 and 2621, which each have a fulfillment system type of "Provisioning" and each provide one or more provisioning fulfillment functions. Fulfillment provider 2620 provides one or more provisioning fulfillment functions for VoIP customers, and fulfillment provider 2621 provides one or more provisioning fulfillment functions for BDB customers. Fulfillment topology 2600 further includes fulfillment providers 2630 and 2631, which each have a fulfillment system type of "Activation" and each provide one or more activation fulfillment functions. Fulfillment provider 2630 provides one or more activation fulfillment functions for VoIP customers, and fulfillment provider 2631 provides one or more activation fulfillment functions for BDB customers. Fulfillment topology 2600 further includes fulfillment providers 2640 and 2641, which each have a fulfillment system type of "Network Inventory" and each provide one or more network inventory fulfillment functions. Fulfillment provider 2640 provides one or more network inventory fulfillment functions for VoIP customers, and fulfillment provider 2641 provides one or more network inventory fulfillment functions for BDB customers.

Figure 27:
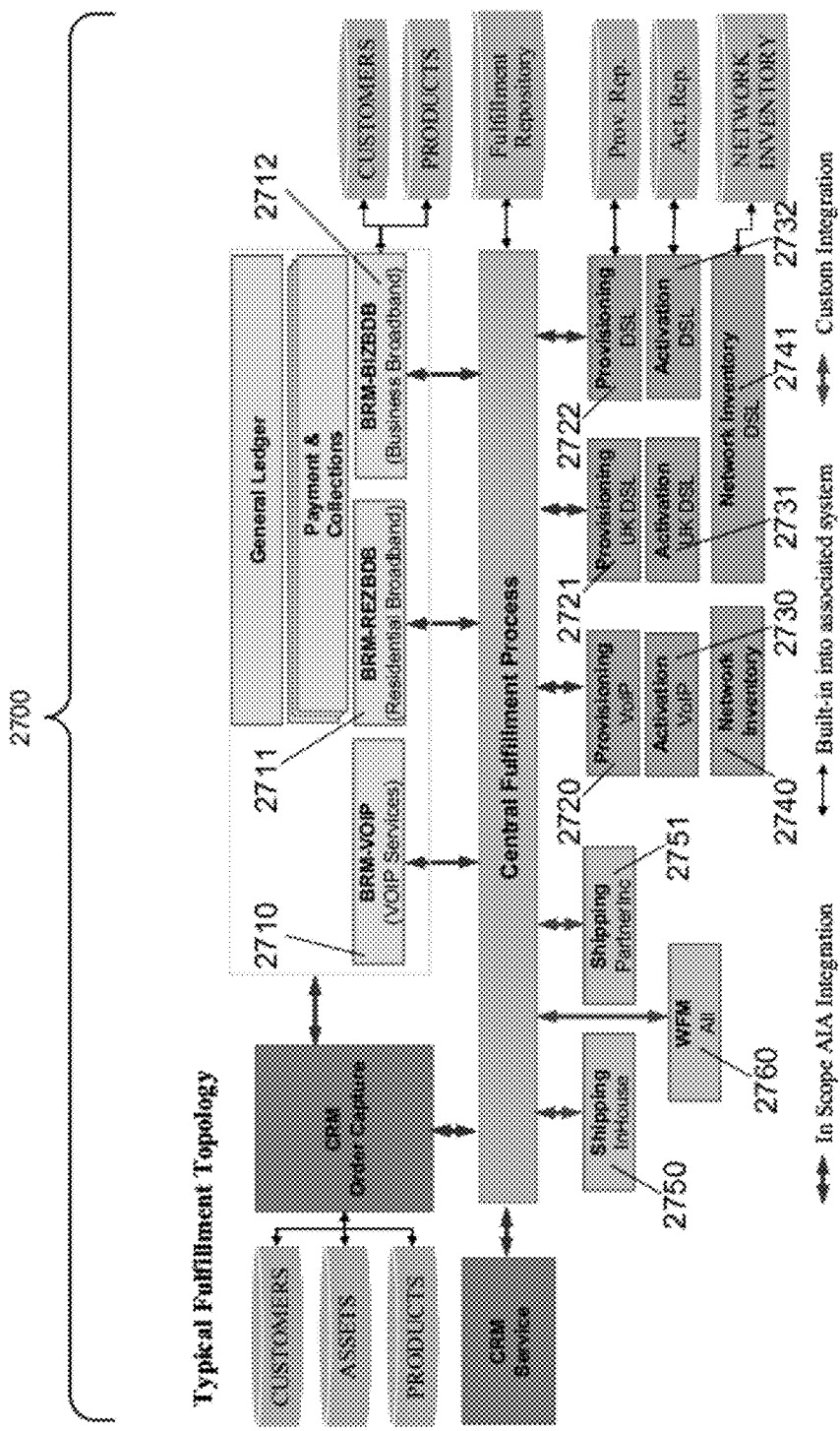
FIG. 27 illustrates another example fulfillment topology, according to an embodiment of the invention.

FIG. 27 illustrates another example fulfillment topology (i.e., fulfillment topology 2700), according to an embodiment of the invention. In contrast to both fulfillment topology 2500 and fulfillment topology 2600, fulfillment topology 2700 is an example of a fulfillment topology with three fulfillment providers for certain fulfillment system types, and includes specific fulfillment system types that are not present in either fulfillment topology 2500 or fulfillment topology 2600. More specifically, fulfillment topology 2700 includes fulfillment providers 2710, 2711, and 2712, which each have a fulfillment system type of "Billing" and each provide one or more billing fulfillment functions. Fulfillment provider 2710 provides one or more billing fulfillment functions for VOIP customers, fulfillment provider 2711 provides one or more billing fulfillment functions for residential broadband customers, and fulfillment provider 2712 provides one or more billing fulfillment functions for business broadband customers. Fulfillment topology 2700 further includes fulfillment providers 2720, 2721, and 2722 which each have a fulfillment system type of "Provisioning" and each provide one or more provisioning fulfillment functions. Fulfillment provider 2720 provides one or more provisioning fulfillment functions for VoIP customers, fulfillment provider 2721 provides one or more provisioning fulfillment functions for UK DSL customers, and fulfillment provider 2722 provides one or more provisioning fulfillment functions for other DSL customers. Fulfillment topology 2700 further includes fulfillment providers 2730, 2731, and 2732 which each have a fulfillment system type of "Activation" and each provide one or more activation fulfillment functions. Fulfillment provider 2730 provides one or more activation fulfillment functions for VoIP customers, fulfillment provider 2731 provides one or more activation fulfillment functions for UK DSL customers, and fulfillment provider 2732 provides one or more activation fulfillment functions for other DSL customers. Fulfillment topology 2700 further includes fulfillment providers 2740 and 2741, which each have a fulfillment system type of "Network Inventory" and each provide one or more network inventory fulfillment functions. Fulfillment provider 2740 provides one or more network inventory fulfillment functions for VoIP customers, and fulfillment provider 2741 provides one or more network inventory fulfillment functions for BDB customers.

In addition to the aforementioned fulfillment providers, fulfillment topology 2700 further includes fulfillment providers 2750 and 2751, which each have a fulfillment system type of "Shipping" and each provide one or more shipping fulfillment functions. Fulfillment provider 2750 provides one or more shipping fulfillment functions using a "InHouse" provider, and fulfillment provider 2751 provides one or more shipping fulfillment functions using a "PartnerInc" provider. Fulfillment topology 2700 further includes fulfillment provider 2760, which has a fulfillment system type of "WFM" and each provide one or more WFM fulfillment functions.

While FIGS. 25-27 each illustrate an example fulfillment topology that can be utilized by an order management system according to an embodiment of the invention, these are example fulfillment topologies, and, in alternate embodiments, other fulfillment topologies can be utilized by the order management system. According to the embodiment, one or more dependencies of a single fulfillment flow can be applied to any of the example fulfillment topologies illustrated in FIGS. 25-27, or any alternate fulfillment topologies, without modifying the fulfillment flow. Example fulfillment flows are now described in greater detail in relation to FIGS. 28-29.

Figure 28:
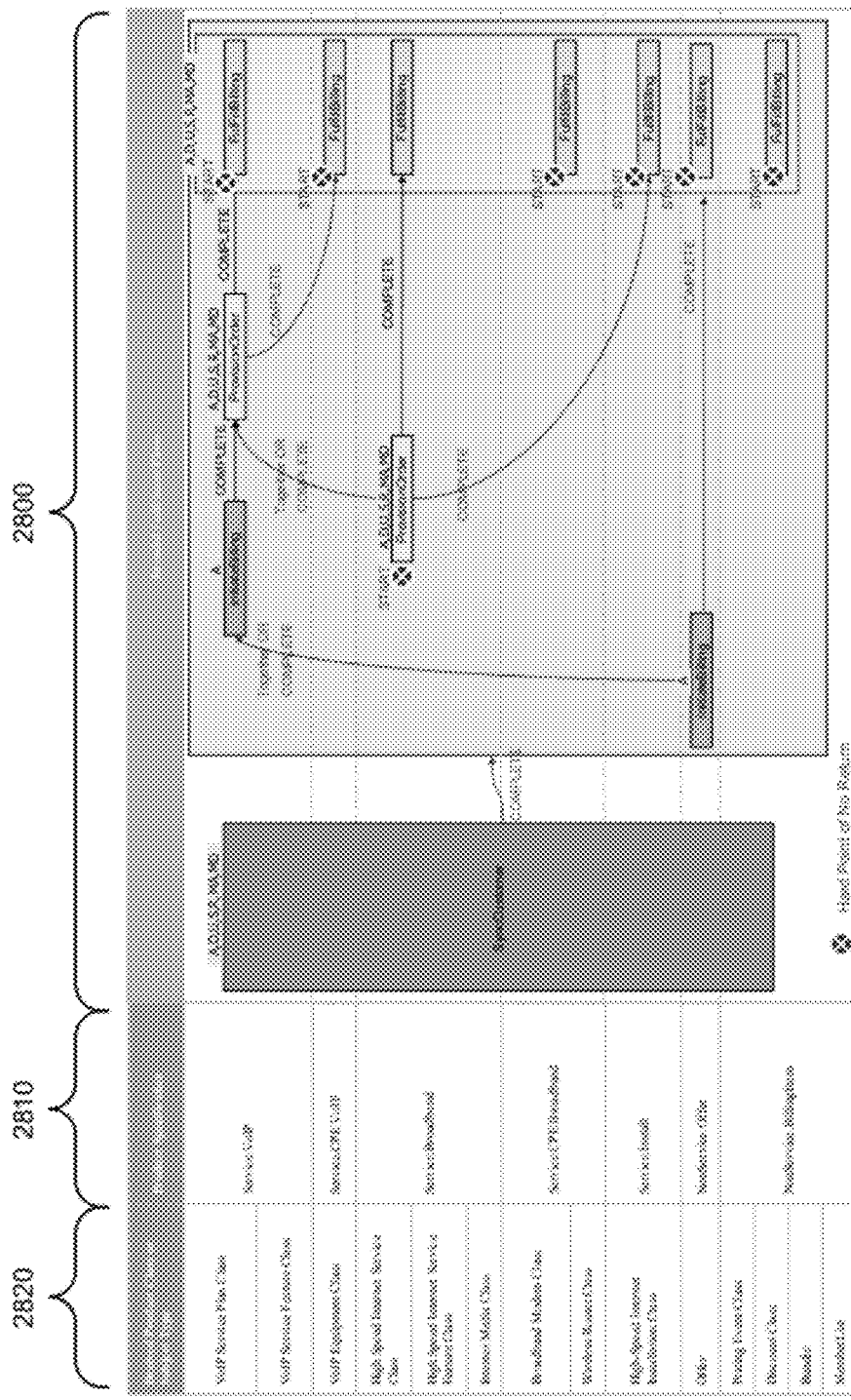
FIG. 28 illustrates an example fulfillment flow, according to an embodiment of the invention.

FIG. 28 illustrates an example fulfillment flow (i.e., fulfillment flow 2800), according to an embodiment of the invention. As previously described in relation to FIG. 8, fulfillment flow 2800 is a combination of one or more fulfillment patterns. As also previously described, in accordance with an embodiment of the invention, fulfillment flow 2800 does not contain any fulfillment topology information, and one or more dependencies of fulfillment flow 2800 can be applied to any fulfillment topology that includes fulfillment providers of corresponding fulfillment system types (i.e., fulfillment system types "Billing," "Provisioning," "Activation," and "Network Inventory"), such as fulfillment topology 2500 of FIG. 25, and fulfillment topology 2600 of FIG. 26.

According to the illustrated embodiment of FIG. 28, fulfillment flow 2800 includes one or more fulfillment patterns, where each fulfillment pattern corresponds to a product specification of product specifications 2810, and each product specification of product specifications 2810 corresponds to one or more product class or subject type of product classes/subject types 2820. According to the embodiment, product classes/subject types 2820 represent order lines of an order whose fulfillment can be managed by an order management system. Furthermore, in the illustrated embodiment, fulfillment flow 2800 includes several points of no return (identified in FIG. 28 by the icon corresponding to the phrase "Hard Point of No Return" in the legend of FIG. 28).

Figure 29:
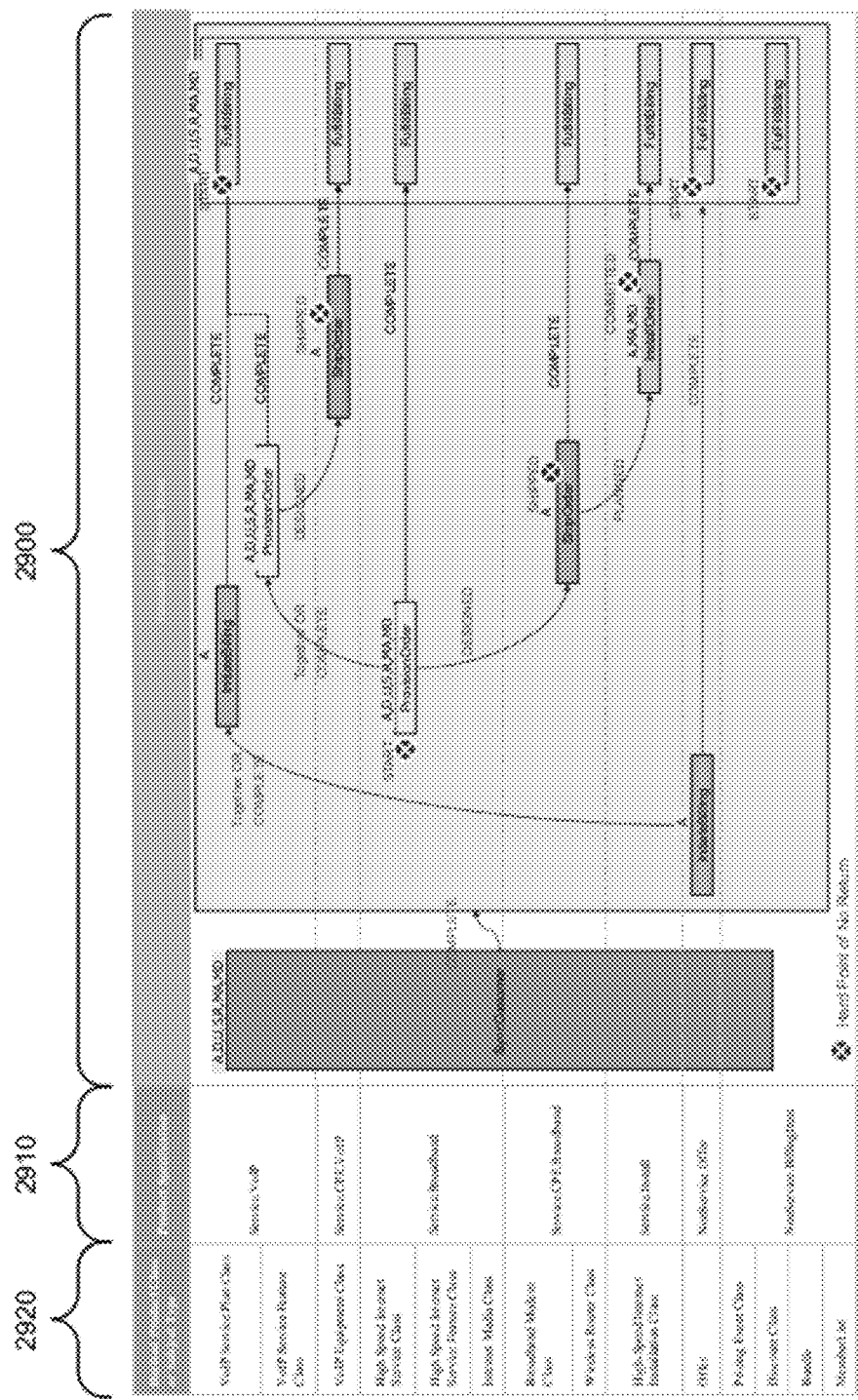
FIG. 29 illustrates another example fulfillment flow, according to an embodiment of the invention.

FIG. 29 illustrates another example fulfillment flow (i.e., fulfillment flow 2900), according to an embodiment of the invention. Similar to fulfillment flow 2800 of FIG. 28, fulfillment flow 2900 is a combination of one or more fulfillment patterns. Also similar to fulfillment flow 2800 of FIG. 28, in accordance with an embodiment of the invention, fulfillment flow 2900 does not contain any fulfillment topology information, and one or more dependencies of fulfillment flow 2900 can be applied to any fulfillment topology that includes fulfillment providers of corresponding fulfillment system types (i.e., fulfillment system types "Billing," "Provisioning," "Activation," "Network Inventory," "Shipping," and "WFM"), such as fulfillment topology 2700 of FIG. 27.

According to the illustrated embodiment of FIG. 29, fulfillment flow 2900 includes one or more fulfillment patterns, where each fulfillment pattern corresponds to a product specification of product specifications 2910, and each product specification of product specifications 2910 corresponds to one or more product class or subject type of product classes/subject types 2920. According to the embodiment, product classes/subject types 2920 represent order lines of an order whose fulfillment can be managed by an order management system. While fulfillment flow 2900 is similar to fulfillment flow 2800 of FIG. 28 in this regard, fulfillment flow 2900 differs from fulfillment flow 2800 in that fulfillment flow include fulfillment functions not found in fulfillment flow 2800 (i.e., "ShipOrder" and "InstallOrder"). Furthermore, in the illustrated embodiment, fulfillment flow 2900 includes several points of no return (identified in FIG. 29 by the icon corresponding to the phrase "Hard Point of No Return" in the legend of FIG. 29).

While FIGS. 28-29 each illustrate an example fulfillment flow that can be utilized by an order management system according to an embodiment of the invention, these are example fulfillment flows, and, in alternate embodiments, other fulfillment flows can be utilized by the order management system. According to the embodiment, an orchestration plan can be created based on any of the example fulfillment flows illustrated in FIGS. 29-29, or any alternate fulfillment flows, through partitioning an order into one or more order components using a decomposition stage, and applying one or more dependencies of the fulfillment flow to the one or more order components. Example orchestration plans are now described in greater detail in relation to FIGS. 30-35.

Figure 30:
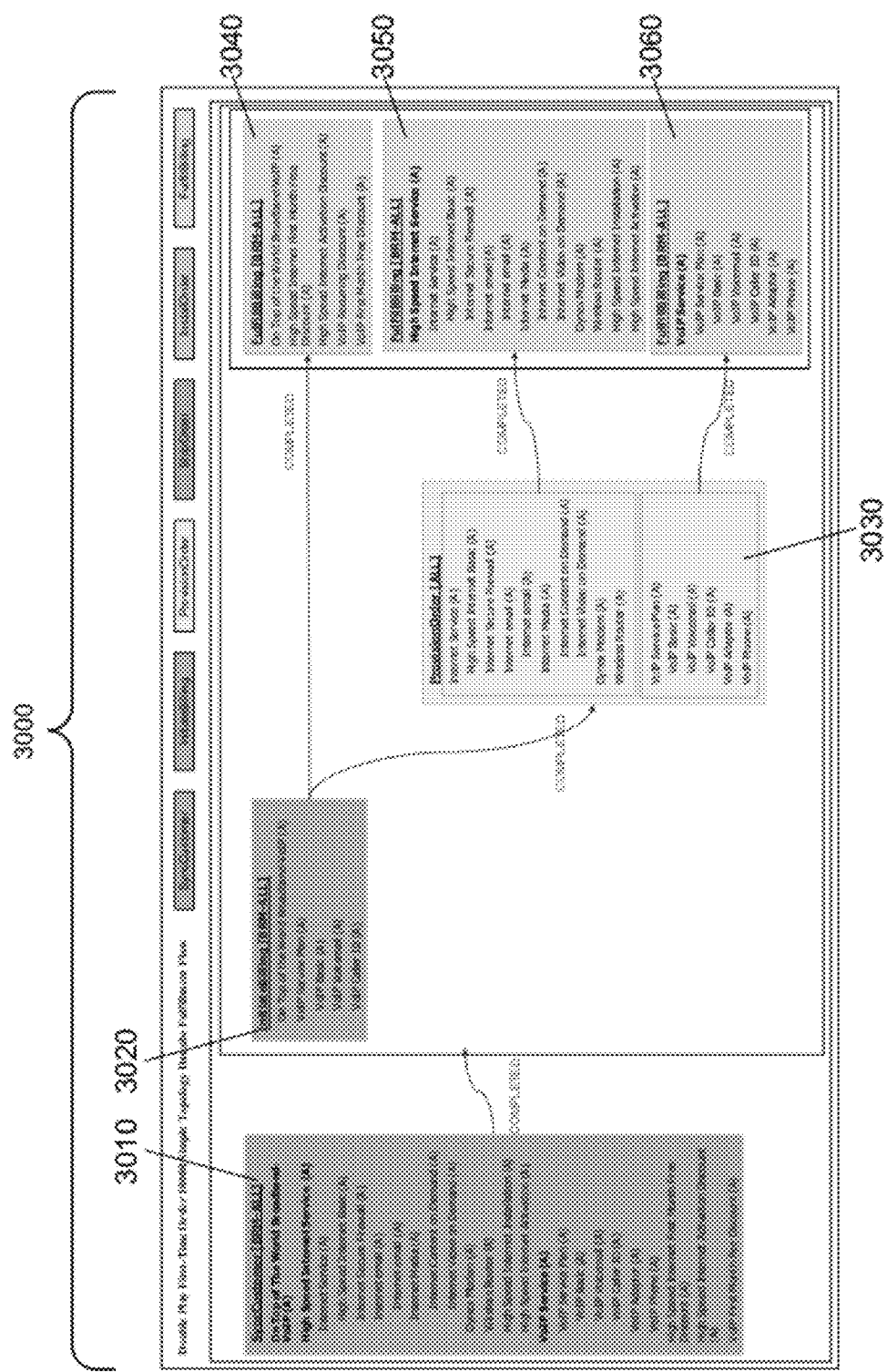
FIG. 30 illustrates an example orchestration plan, according to an embodiment of the invention.

FIG. 30 illustrates an example orchestration plan (i.e., orchestration plan 3000), according to an embodiment of the invention. Orchestration plan 3000 is an orchestration plan for managing a fulfillment of an order for broadband services and VoIP services, according to the embodiment. In this embodiment, an order management system that can execute orchestration plan 3000 is part of fulfillment topology 2500 of FIG. 25. Furthermore, in the embodiment, the order management system includes fulfillment flow 2800 of FIG. 28. According to the embodiment, the order management system can execute a decomposition sequence utilizing information from fulfillment topology 2500 and fulfillment flow 2800 to partition the order for broadband services and VoIP services into order components 3010, 3020, 3030, 3040, 3050, and 3060. The order management system can subsequently apply the dependencies of fulfillment flow 2800 to order components 3010, 3020, 3030, 3040, 3050, and 3060 to create orchestration plan 3000, as illustrated in FIG. 30.

Figure 31:
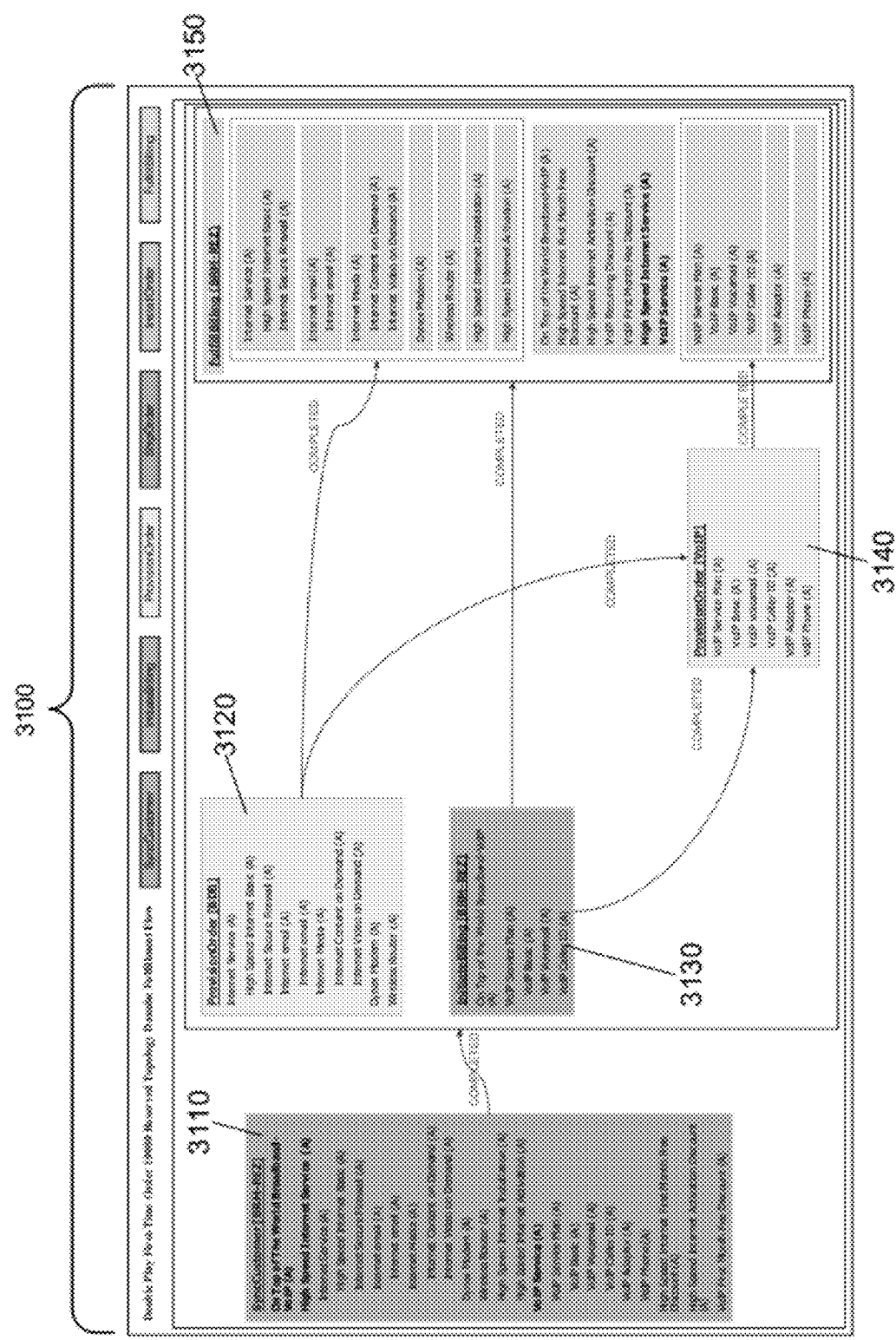
FIG. 31 illustrates another example orchestration plan, according to an embodiment of the invention.

FIG. 31 illustrates another example orchestration plan (i.e., orchestration plan 3100), according to an embodiment of the invention. Similar to orchestration plan 3000, orchestration plan 3100 is an orchestration plan for managing a fulfillment of an order for broadband services and VoIP services, according to the embodiment. However, in this embodiment, in contrast to the illustrated embodiment of FIG. 30, an order management system that can execute orchestration plan 3100 is part of fulfillment topology 2600 of FIG. 26. Furthermore, in the embodiment, similar to the illustrated embodiment of FIG. 30, the order management system includes fulfillment flow 2800 of FIG. 28. According to the embodiment, the order management system can execute a decomposition sequence utilizing information from fulfillment topology 2600 and fulfillment flow 2800 to partition the order for broadband services and VoIP services into order components 3110, 3120, 3130, 3140, and 3150. The order management system can subsequently apply the dependencies of fulfillment flow 2800 to order components 3110, 3120, 3130, 3140, and 3150 to create orchestration plan 3100, as illustrated in FIG. 31.

Figure 32:
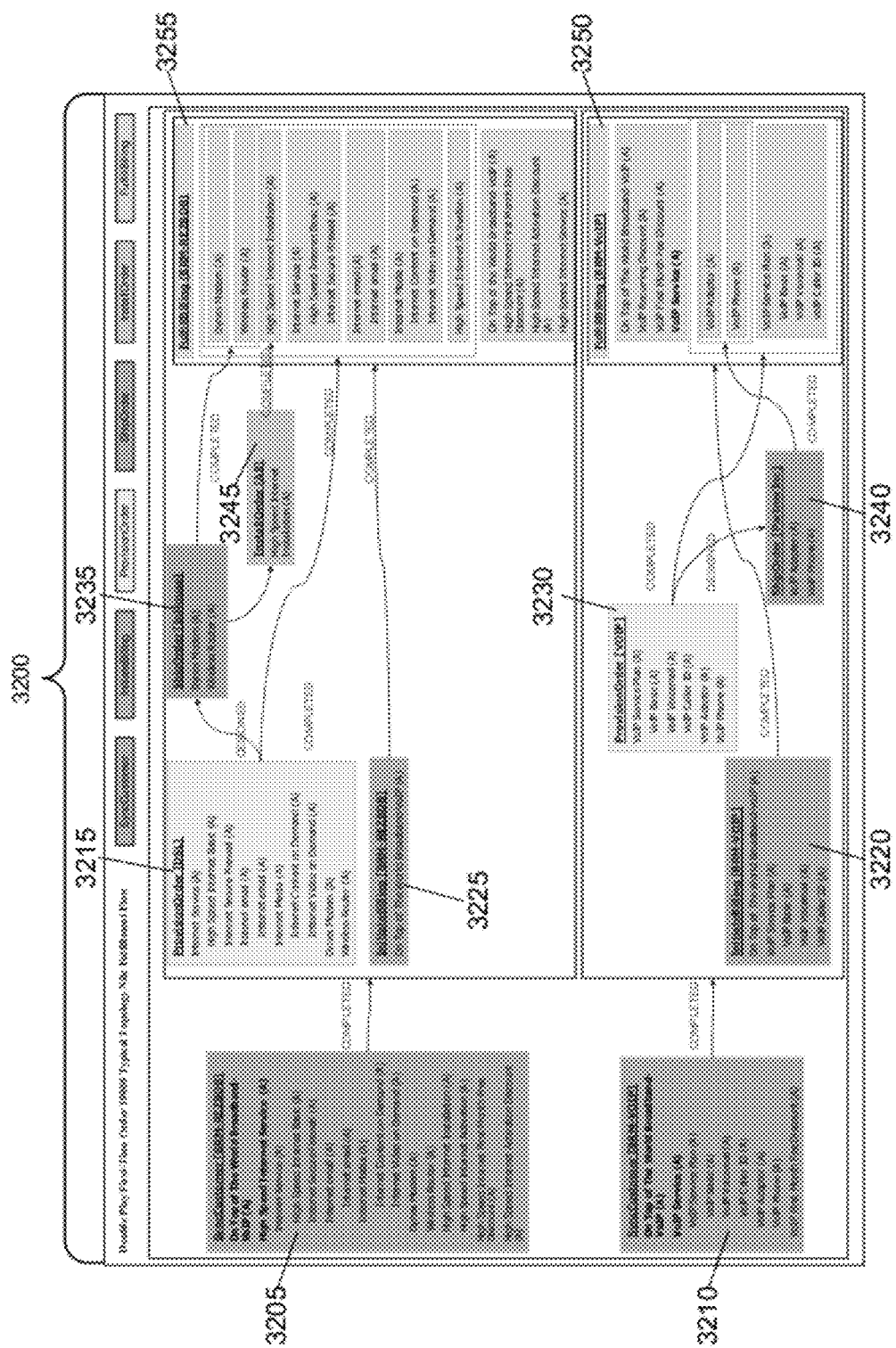
FIG. 32 illustrates another example orchestration plan, according to an embodiment of the invention.

FIG. 32 illustrates another example orchestration plan (i.e., orchestration plan 3200), according to an embodiment of the invention. Similar to orchestration plans 3000 and 3100, orchestration plan 3200 is an orchestration plan for managing a fulfillment of an order for broadband services and VoIP services, according to the embodiment. However, in this embodiment, in contrast to the illustrated embodiments of FIGS. 30 and 31, an order management system that can execute orchestration plan 3200 is part of fulfillment topology 2700 of FIG. 27. Furthermore, in the embodiment, in contrast to the illustrated embodiments of FIGS. 30 and 31, the order management system includes fulfillment flow 2900 of FIG. 29. According to the embodiment, the order management system can execute a decomposition sequence utilizing information from fulfillment topology 2700 and fulfillment flow 2900 to partition the order for broadband services and VoIP services into order components 3205, 3210, 3215, 3220, 3225, 3230, 3235, 3240, 3245, 3250, and 3255. The order management system can subsequently apply the dependencies of fulfillment flow 2900 to order components 3205, 3210, 3215, 3220, 3225, 3230, 3235, 3240, 3245, 3250, and 3255 to create orchestration plan 3200, as illustrated in FIG. 32.

Figure 33:
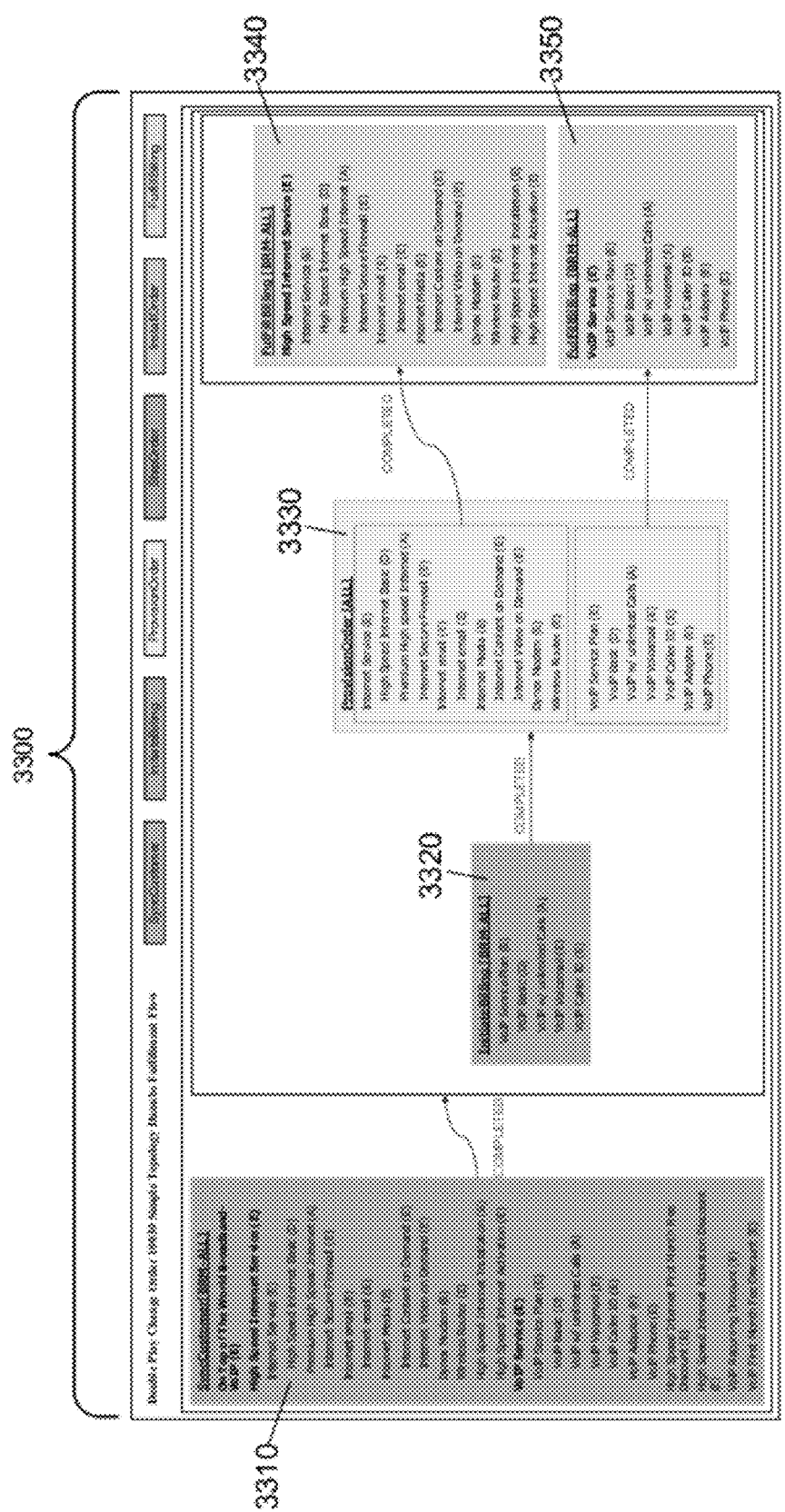
FIG. 33 illustrates another example orchestration plan, according to an embodiment of the invention.

FIG. 33 illustrates another example orchestration plan (i.e., orchestration plan 3300), according to an embodiment of the invention. Orchestration plan 3300 is an orchestration plan for managing a fulfillment of a change order that modifies a previously fulfilled order for broadband services and VoIP services, according to the embodiment. In this embodiment, an order management system that can execute orchestration plan 3300 is part of fulfillment topology 2500 of FIG. 25. Furthermore, in the embodiment, the order management system includes fulfillment flow 2800 of FIG. 28. According to the embodiment, the order management system can execute a decomposition sequence utilizing information from fulfillment topology 2500 and fulfillment flow 2800 to partition the change order into order components 3310, 3320, 3330, 3340, and 3350. The order management system can subsequently apply the dependencies of fulfillment flow 2800 to order components 3310, 3320, 3330, 3340, and 3350 to create orchestration plan 3300, as illustrated in FIG. 33.

Figure 34:
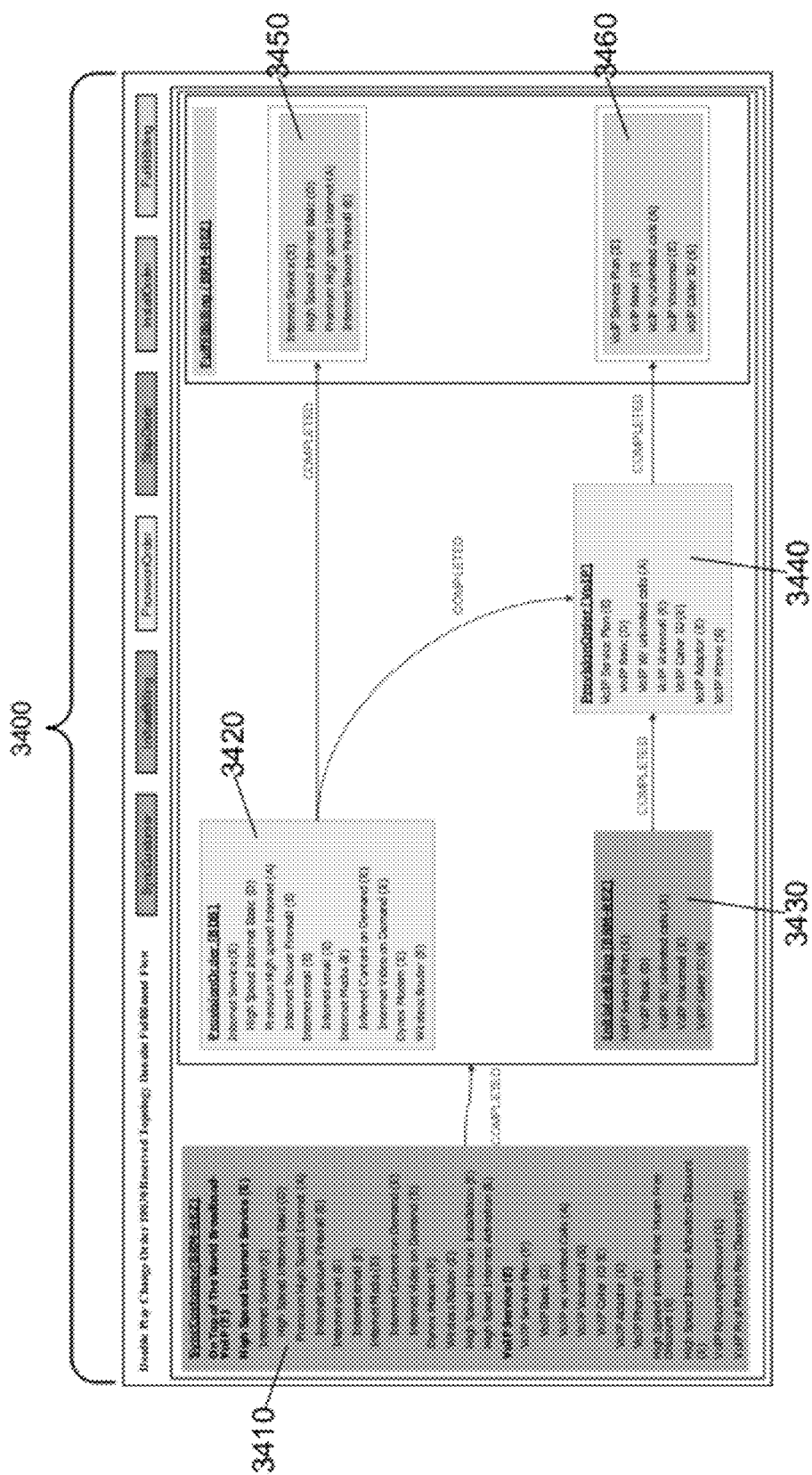
FIG. 34 illustrates another example orchestration plan, according to an embodiment of the invention.

FIG. 34 illustrates another example orchestration plan (i.e., orchestration plan 3400), according to an embodiment of the invention. Similar to orchestration plan 3300, orchestration plan 3400 is an orchestration plan for managing a fulfillment of a change order that modifies a previously fulfilled order for broadband services and VoIP services, according to the embodiment. However, in this embodiment, in contrast to the illustrated embodiment of FIG. 33, an order management system that can execute orchestration plan 3400 is part of fulfillment topology 2600 of FIG. 26. Furthermore, in the embodiment, similar to the illustrated embodiment of FIG. 30, the order management system includes fulfillment flow 2800 of FIG. 28. According to the embodiment, the order management system can execute a decomposition sequence utilizing information from fulfillment topology 2600, and partition the change order into order components 3410, 3420, 3430, 3440, 3450, and 3460. The order management system can subsequently apply the dependencies of fulfillment flow 2800 to order components 3410, 3420, 3430, 3440, 3450, and 3460 to create orchestration plan 3400, as illustrated in FIG. 34.

Figure 35:
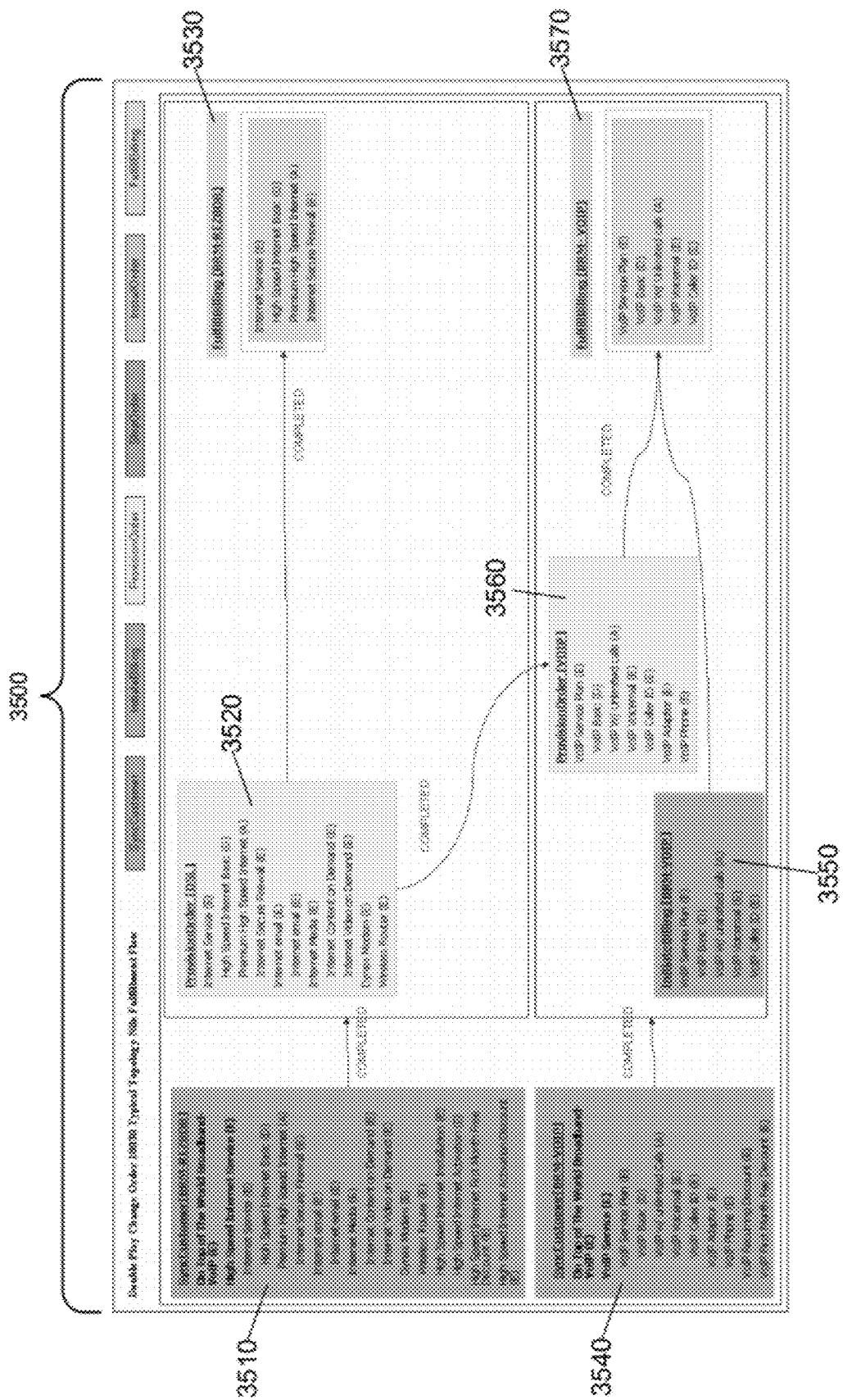
FIG. 35 illustrates another example orchestration plan, according to an embodiment of the invention.

FIG. 35 illustrates another example orchestration plan (i.e., orchestration plan 3500), according to an embodiment of the invention. Similar to orchestration plans 3300 and 3400, orchestration plan 3500 is an orchestration plan for managing a fulfillment of a change order that modifies a previously fulfilled order for broadband services and VoIP services, according to the embodiment. However, in this embodiment, in contrast to the illustrated embodiments of FIGS. 33 and 34, an order management system that can execute orchestration plan 3500 is part of fulfillment topology 2700 of FIG. 27. Furthermore, in the embodiment, in contrast to the illustrated embodiments of FIGS. 33 and 34, the order management system includes fulfillment flow 2900 of FIG. 29. According to the embodiment, the order management system can execute a decomposition sequence utilizing information from fulfillment topology 2700, and partition the change order into order components 3510, 3520, 3530, 3540, 3550, 3560, and 3570. The order management system can subsequently apply the dependencies of fulfillment flow 2900 to order components 3510, 3520, 3530, 3540, 3550, 3560, and 3570 to create orchestration plan 3500, as illustrated in FIG. 35.

While FIGS. 30-35 each illustrate an example orchestration plan that can be created by an order management system according to an embodiment of the invention, these are example orchestration plans, and, in alternate embodiments, other orchestrations plans can be created by the order management system. According to an embodiment, while an order management system executes an orchestration plan to manage a fulfillment of an in-flight order, the order management system can perform change management of the in-flight order based on a received revision order, where the received revision order requests that the in-flight order be modified. Examples of change management of an in-flight order are now described in greater detail in relation to FIGS. 36-41.

Figure 36:
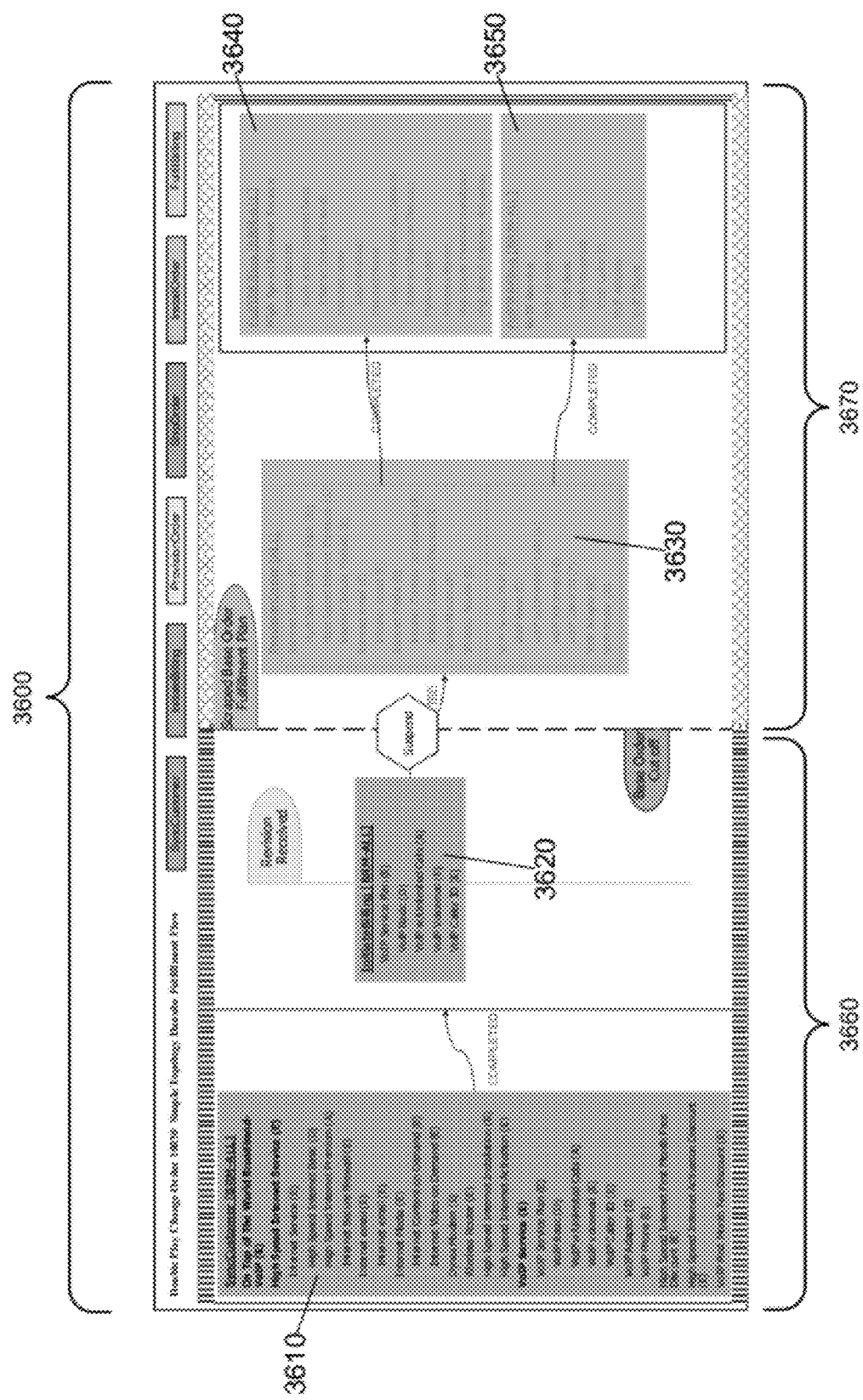
FIG. 36 illustrates an example of change management of an orchestration plan, according to an embodiment of the invention.

FIG. 36 illustrates an example of change management of an orchestration plan (i.e., orchestration plan 3600), according to an embodiment of the invention. Orchestration plan 3600 is an orchestration plan for managing a fulfillment of a change order that modifies a previously fulfilled order for broadband services and VoIP services, according to the embodiment. In this embodiment, an order management system that can execute orchestration plan 3600 is part of fulfillment topology 2500 of FIG. 25. Furthermore, in the embodiment, the order management system includes fulfillment flow 2800 of FIG. 28.

Orchestration plan 3600 is comprised of order components 3610, 3620, 3630, 3640, and 3650. According to the embodiment, while orchestration plan 3600 is executing order component 3620, a cancel order (not shown in FIG. 36) is received, where the cancel order represents a customer's request to cancel the customer's previous request to modify broadband services and VoIP services customer assets (i.e., a customer's request to cancel an in-flight order based on orchestration plan 3600). According to the embodiment, after orchestration plan 3600 completes an execution of order component 3620, orchestration plan 3600 is suspended. Thus, after orchestration plan 3600 has been suspended, orchestration plan 3600 has executed order components 3610 and 3620 (i.e., orchestration plan component 3660), and has not executed order components 3630, 3640, and 3650 (i.e., orchestration plan component 3670). Subsequently, a cancel order orchestration plan is generated and executed to manage a cancellation of the in-flight order based on orchestration plan 3600, which is now described in greater detail in relation to FIG. 37.

Figure 37:
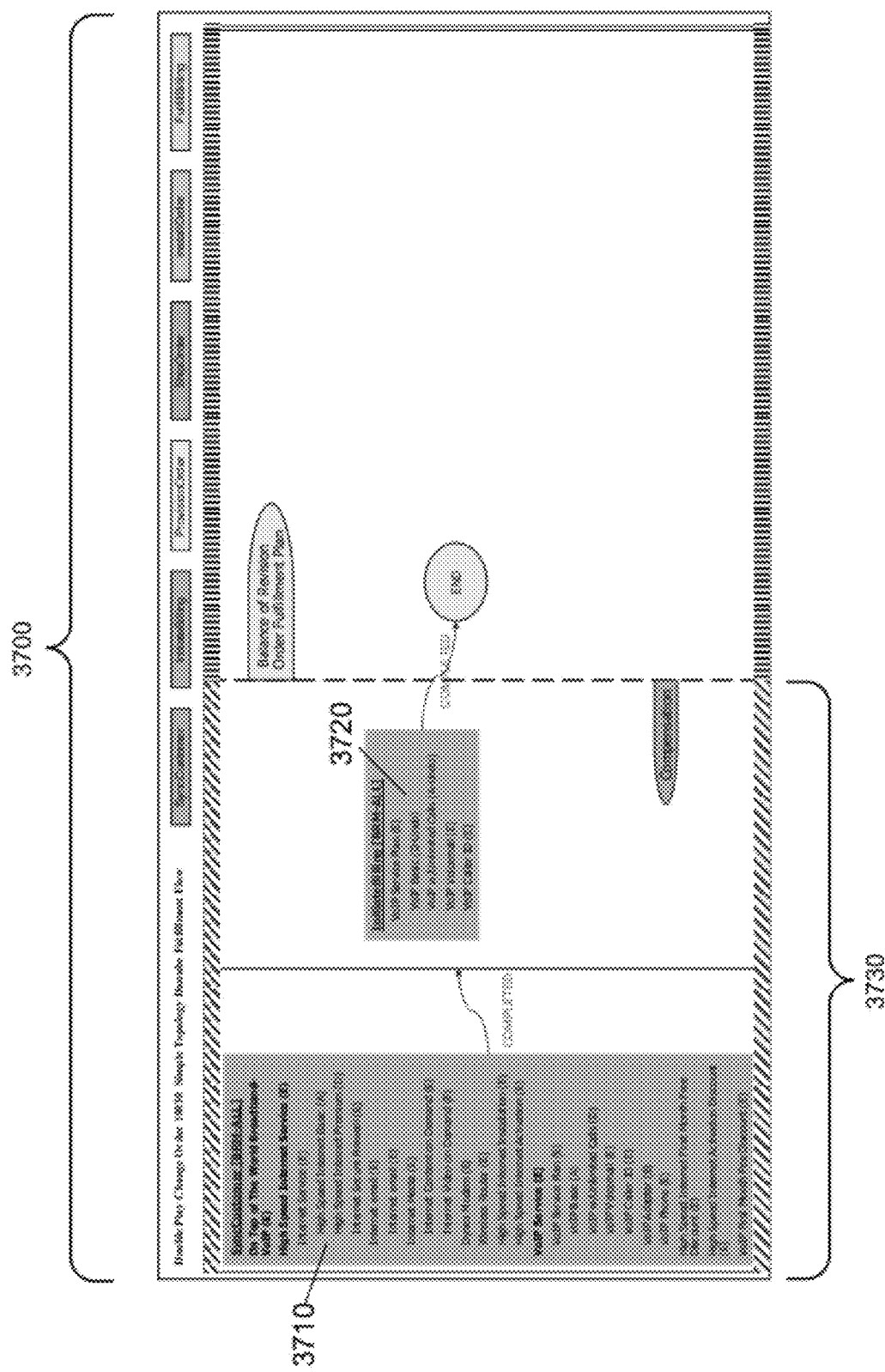
FIG. 37 illustrates an example of a cancel order orchestration plan, according to an embodiment of the invention.

FIG. 37 illustrates an example of a cancel order orchestration plan (i.e., cancel order orchestration plan 3700), according to an embodiment of the invention. According to the embodiment, cancel order orchestration plan 3700 can manage a cancellation of an in-flight order based on orchestration plan 3600 of FIG. 36. As previously described in relation to FIG. 22, cancel order orchestration plan 3700 is created, where cancel order orchestration plan 3700 does not include any order lines that have any actionable action on them. Instead, cancel order orchestration plan 3700 includes order components 3710 and 3720 (i.e., compensation plan 3730). Additionally, as also described in relation to FIG. 22, cancel order orchestration plan 3700 only includes compensation plan 3730, and does not include a balance plan, as the compensation of cancel order orchestration plan 3700 only includes the undoing of actions that have been performed by orchestration plan 3600 of FIG. 36. According to the embodiment, cancel order orchestration plan 3700 is executed and manages a cancellation of the in-flight order based on orchestration plan 3600 of FIG. 36.

Figure 38:
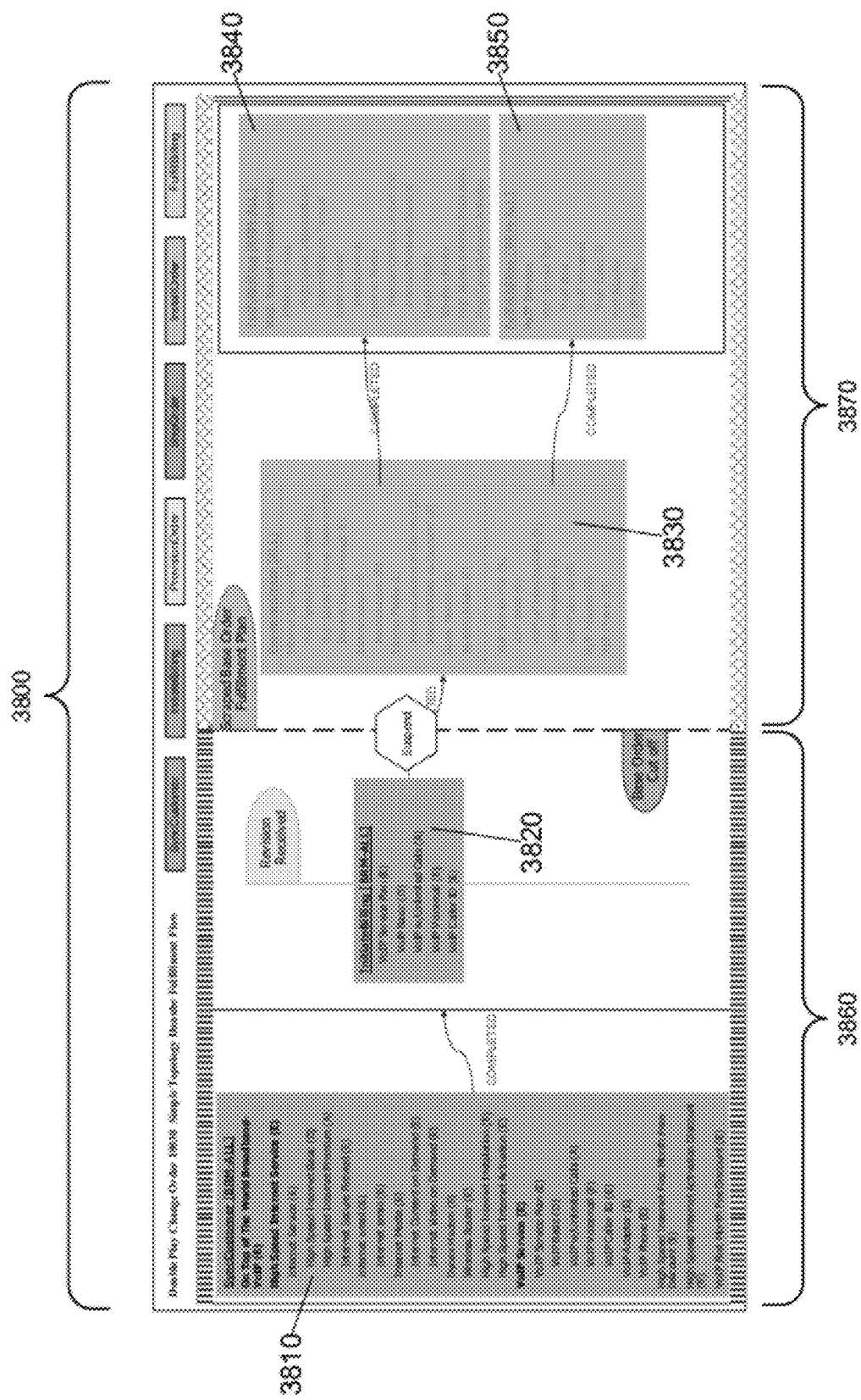
FIG. 38 illustrates another example of change management of an orchestration plan, according to an embodiment of the invention.

FIG. 38 illustrates another example of change management of an orchestration plan (i.e., orchestration plan 3800), according to an embodiment of the invention. Similar to orchestration plan 3600 of FIG. 36, orchestration plan 3800 is an orchestration plan for managing a fulfillment of a change order that modifies existing customer assets for broadband services and VoIP services, according to the embodiment. In this embodiment, an order management system that can execute orchestration plan 3800 is part of fulfillment topology 2500 of FIG. 25. Furthermore, in the embodiment, the order management system includes fulfillment flow 2800 of FIG. 28.

Orchestration plan 3800 is comprised of order components 3810, 3820, 3830, 3840, and 3850. According to the embodiment, while orchestration plan 3800 is executing order component 3820, a revision order (not shown in FIG. 38) is received, where the revision order represents a customer's request to revise the customer's previous request to modify customer assets for broadband services and VoIP services (i.e., a customer's request to revise an in-flight order based on orchestration plan 3800). More specifically, according to the embodiment, the revision order represents a customer's request, in addition to the customer's previous request to modify the previously fulfilled order, to modify a bundled product that the customer previously requested to add to the previously fulfilled order. According to the embodiment, after orchestration plan 3800 completes an execution of order component 3820, orchestration plan 3800 is suspended. Thus, after orchestration plan 3800 has been suspended, orchestration plan 3800 has executed order components 3810 and 3820 (i.e., orchestration plan component 3860), and has not executed order components 3830, 3840, and 3850 (i.e., orchestration plan component 3870). Subsequently, a revision order orchestration plan is generated and executed to manage a revision of the in-flight order based on orchestration plan 3800, which is now described in greater detail in relation to FIG. 39.

Figure 39:
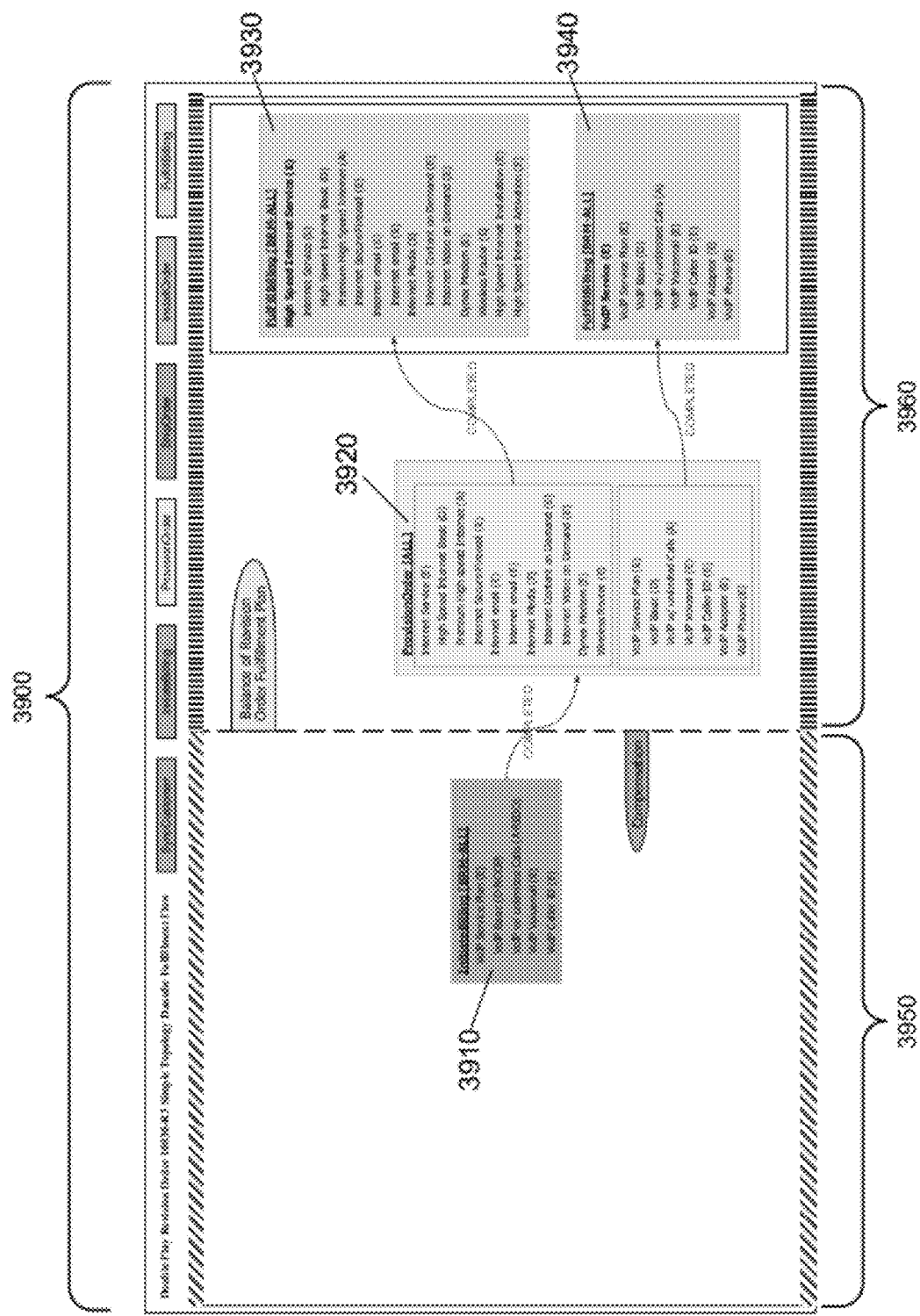
FIG. 39 illustrates another example of a revision order orchestration plan, according to an embodiment of the invention.

FIG. 39 illustrates another example of a revision order orchestration plan (i.e., revision order orchestration plan 3900), according to an embodiment of the invention. According to the embodiment, revision order orchestration plan 3900 can manage a revision of an in-flight order based on orchestration plan 3800 of FIG. 38. As previously described in relation to FIGS. 20-21, an orchestration plan (not shown in FIG. 39) that corresponds to the revision order (not shown in FIG. 39) is generated and compared with orchestration plan 3800 of FIG. 38 to determine differences between the two orchestration plans. As also previously described in relation to FIGS. 20-21, the differences are used to create order component 3910 (i.e., compensation plan 3950) of revision order orchestration plan 3900. Additionally, as also described in relation to FIGS. 20-21, one or more order components of the orchestration plan that corresponds to the revision order (not shown in FIG. 39) are used to create order components 3920, 3930, and 3940 (i.e., balance plan 3960) of revision order orchestration plan 3900. According to the embodiment, revision order orchestration plan 3900 is executed and manages a revision of the in-flight order based on orchestration plan 3800 of FIG. 38.

Figure 40:
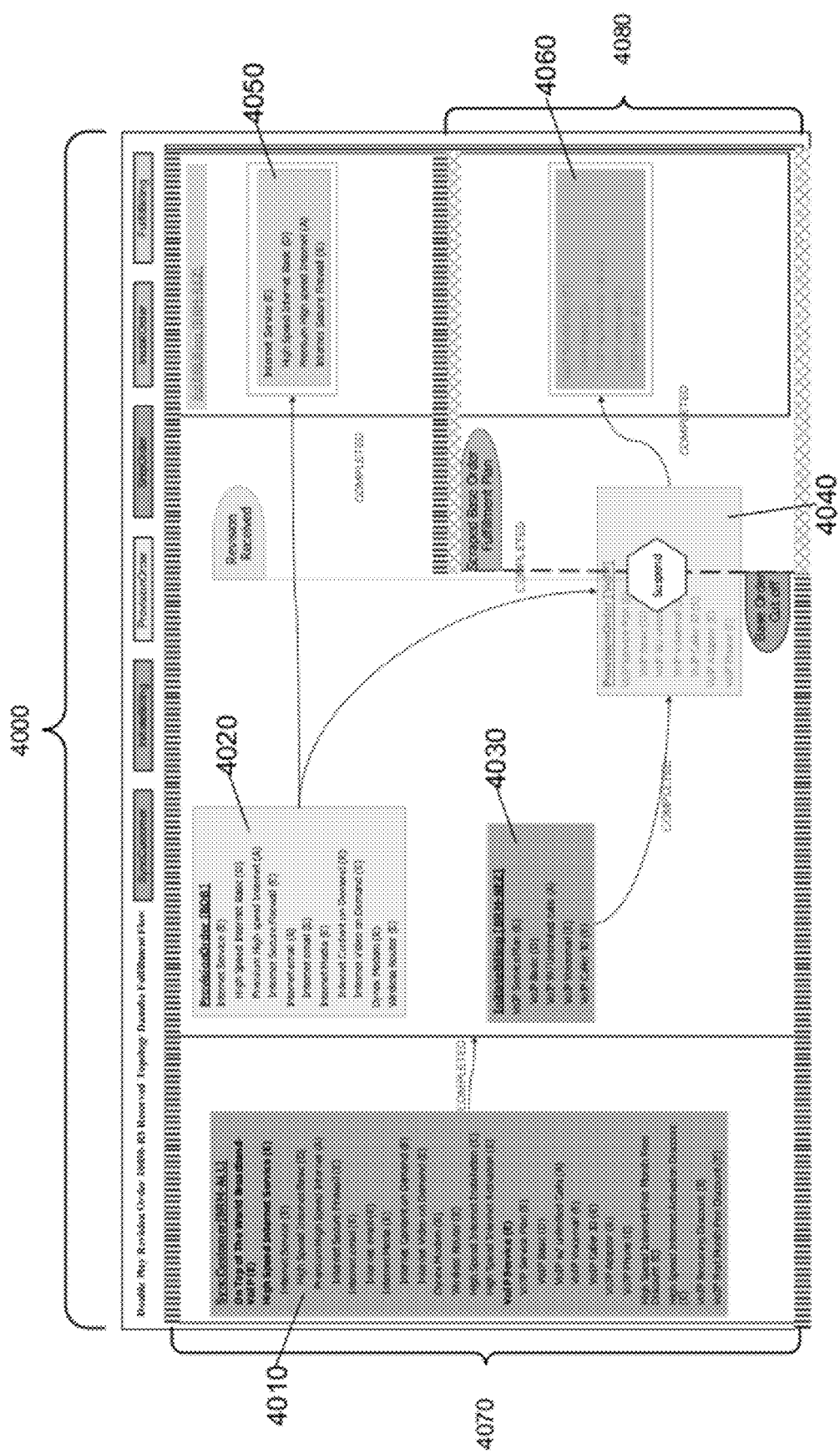
FIG. 40 illustrates another example of change management of an orchestration plan, according to an embodiment of the invention.

FIG. 40 illustrates another example of change management of an orchestration plan (i.e., orchestration plan 4000), according to an embodiment of the invention. Similar to orchestration plan 3600 of FIG. 36, and orchestration plan 3800 of FIG. 38, orchestration plan 4000 is an orchestration plan for managing a fulfillment of a change order that modifies existing customer assets for broadband services and VoIP services, according to the embodiment. In this embodiment, an order management system that can execute orchestration plan 4000 is part of fulfillment topology 2600 of FIG. 26. Furthermore, in the embodiment, the order management system includes fulfillment flow 2800 of FIG. 28.

Orchestration plan 4000 is comprised of order components 4010, 4020, 4030, 4040, 4050, and 4060. According to the embodiment, while orchestration plan 4000 is executing order component 4040, a revision order (not shown in FIG. 40) is received, where the revision order represents a customer's request to revise the customer's previous request to modify customer assets for broadband services and VoIP services (i.e., a customer's request to revise an in-flight order based on orchestration plan 4000). More specifically, according to the embodiment, the revision order represents a customer's request, in addition to the customer's previous request to modify the previously fulfilled order, to add an additional bundled product to the previously fulfilled order. According to the embodiment, after orchestration plan 4000 completes an execution of order component 4040, orchestration plan 4000 is suspended. Thus, after orchestration plan 4000 has been suspended, orchestration plan 4000 has executed order components 4010, 4020, 4030, 4040, and 4050 (i.e., orchestration plan component 4060), and has not executed order components 4060 (i.e., orchestration plan component 4070). Subsequently, a revision order orchestration plan is generated and executed to manage a revision of the in-flight order based on orchestration plan 4000, which is now described in greater detail in relation to FIG. 41.

Figure 41:
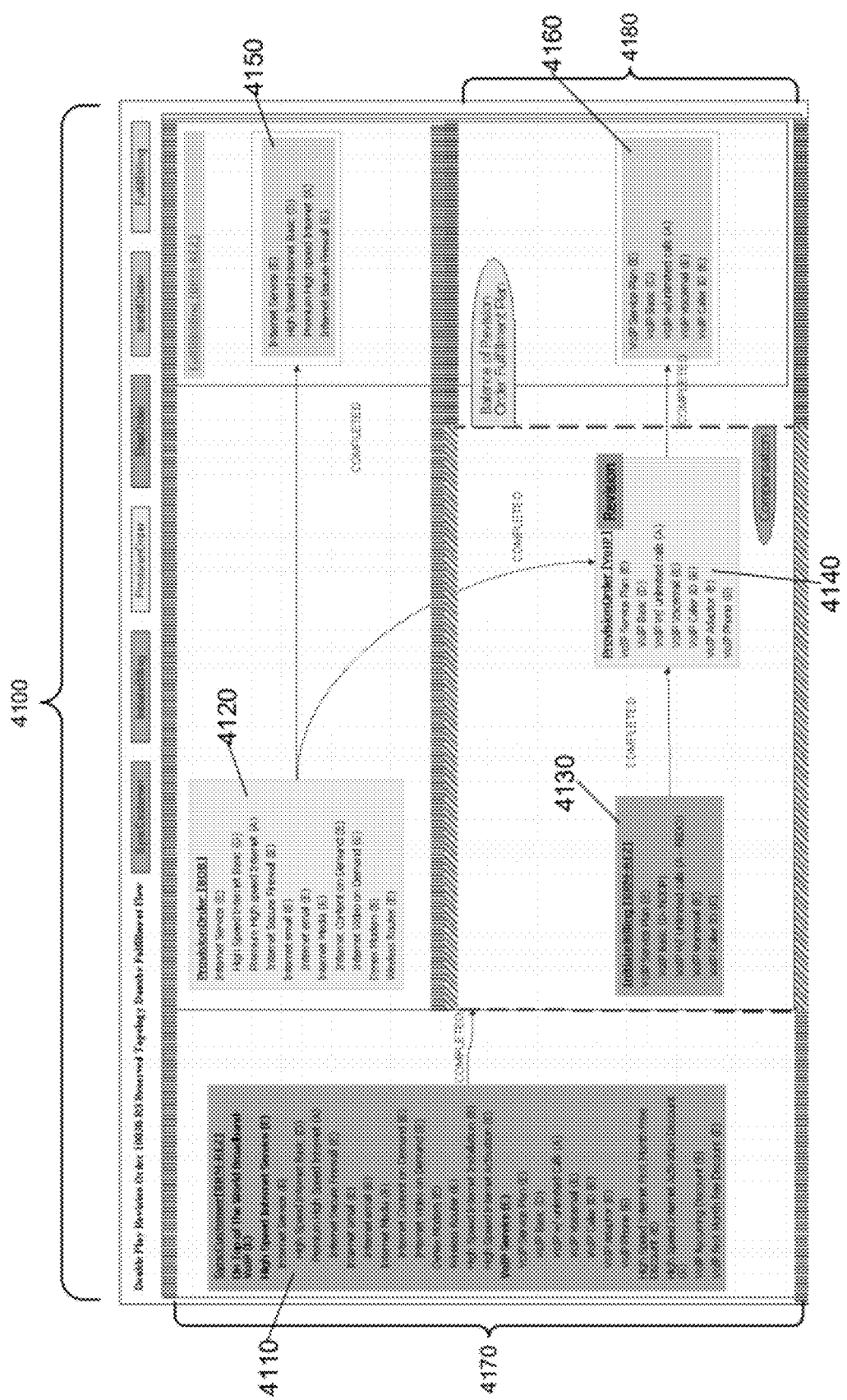
FIG. 41 illustrates another example of a revision order orchestration plan, according to an embodiment of the invention.

FIG. 41 illustrates another example of a revision order orchestration plan (i.e., revision order orchestration plan 4100), according to an embodiment of the invention. According to the embodiment, revision order orchestration plan 4100 can manage a revision of an in-flight order based on orchestration plan 4000 of FIG. 40. As previously described in relation to FIGS. 20-21, an orchestration plan (not shown in FIG. 41) that corresponds to the revision order (not shown in FIG. 41) is generated and compared with orchestration plan 4000 of FIG. 40 to determine differences between the two orchestration plans. As also previously described in relation to FIGS. 20-21, the differences are used to create order components 4110, 4120, 4130, 4140, and 4150 (i.e., compensation plan 4170) of revision order orchestration plan 4100. Additionally, as also described in relation to FIGS. 21-22, one or more order components of the orchestration plan that corresponds to the revision order (not shown in FIG. 42) are used to create order component 4160 (i.e., balance plan 4180) of revision order orchestration plan 4100. According to the embodiment, revision order orchestration plan 4100 is executed and manages a revision of the in-flight order based on orchestration plan 4000 of FIG. 40.

Figure 42:
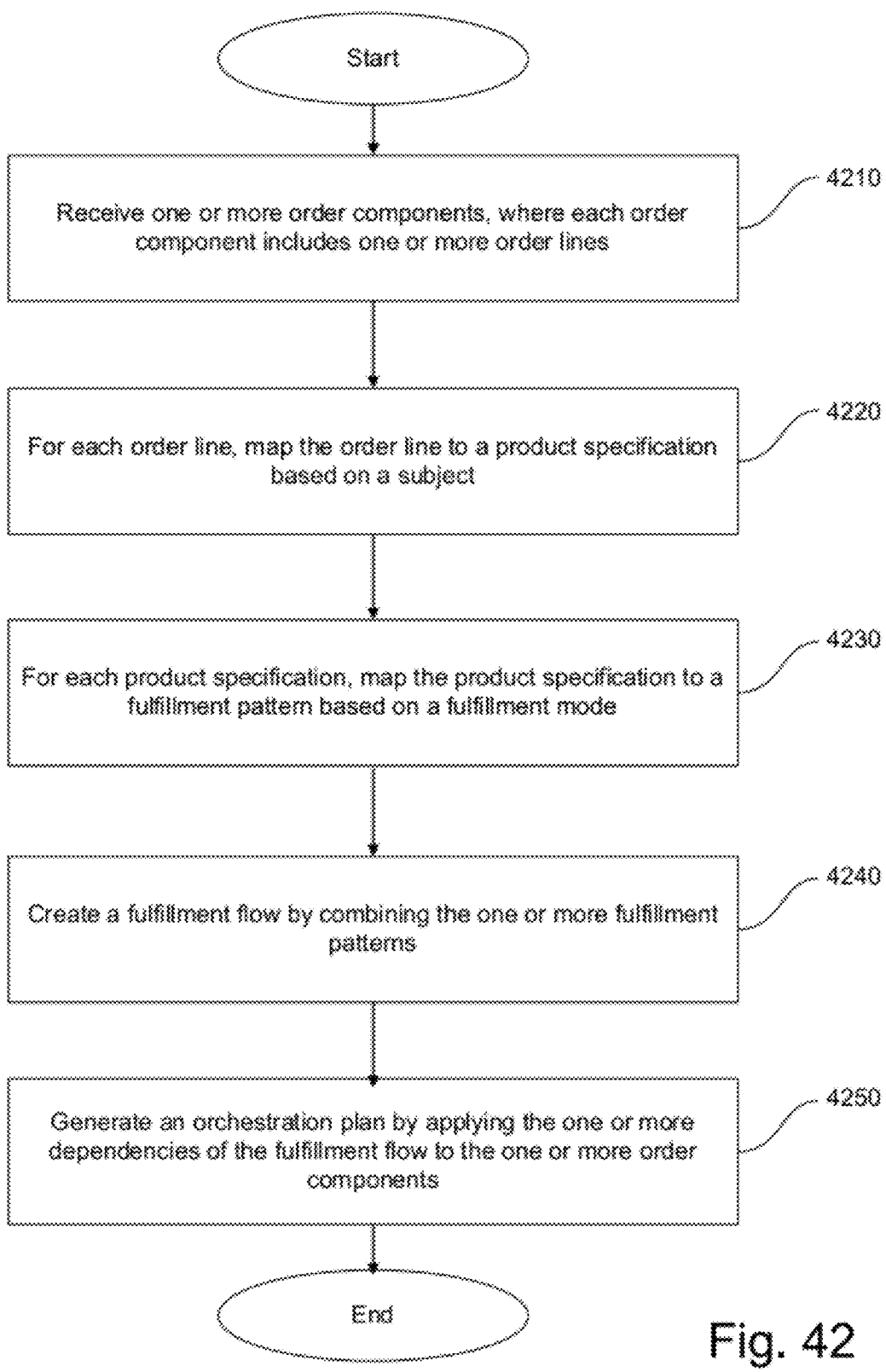
FIG. 42 illustrates a flow diagram of the functionality of an order management module, according to an embodiment of the invention.

FIG. 42 illustrates a flow diagram for the functionality of an order management module, according to an embodiment of the invention. In one embodiment, the functionality of the flow diagram of FIG. 42, and the functionality of the flow diagrams of FIGS. 43, 44, 45, and 54, are implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 4210, one or more order components are received, where the one or more order components represent an order received by an order management system. In one embodiment, each order component includes one or more order lines of the order. In one embodiment, each order line includes an action and a subject. According to one embodiment, each subject includes a fulfillment item code, a product type code, and a billing type, and each action include an instruction to add or delete a product, service, bundle, or offer. In certain embodiments, the one or more order components are created using a decomposition sequence, as previously described. In one example embodiment, the one or more order components are created according to a flow illustrated in FIG. 43, as further described below.

At 4220, for each order line of the one or more order lines of the order, the order line is mapped to a product specification based on the subject of the order line. In one embodiment, a product specification is an entity that contains data which describes a core capability that can be provided by a fulfillment provider.

At 4230, for each product specification of the one or more product specifications that correspond to the one or more order lines, the product specification is mapped to a fulfillment pattern based on a fulfillment mode of the order. According to an embodiment, each fulfillment pattern of the one or more fulfillment patterns comprises one or more fulfillment functions and one or more dependencies between the one or more fulfillment functions. In one embodiment, a product specification is associated with a fulfillment pattern that carries out the core capability described by the product specification. According to the embodiment, the product specification can contain metadata that can be used to create the fulfillment pattern that carries out the core capability.

At 4240, a fulfillment flow is created by combining the one or more fulfillment patterns. According to an embodiment, when the one or more fulfillment patterns are combined into the fulfillment flow, the one or more fulfillment functions and the one or more dependencies of each of the fulfillment patterns are also combined. Thus, according to the embodiment, the fulfillment flow includes the one or more fulfillment functions and the one or more dependencies of all of the fulfillment patterns.

At 4250, an orchestration plan is generated by applying the one or more dependencies of the fulfillment flow to the one or more order components. The one or more dependencies of the fulfillment flow are translated into one or more order line dependencies between the one or more order lines of the one or more order components. In certain embodiments, an order line dependency is at a completion of a fulfillment function of the order line. In other embodiments, an order line dependency expresses a condition where an order line on a fulfillment function has not completed, but has reached a milestone which is sufficient to satisfy the dependency, and to allow processing of a dependent order line to commence. In other embodiments, an order line dependency includes a calculated time component. As one example, the time component can be a duration (e.g., one hour). As another example, the time component can be an absolute date and/or time (e.g., Oct. 14, 2010 13:03:03-GMT-1:00). According to these embodiments, the dependency is resolved only after the time component has elapsed (where the time component is a duration), or after the time component has occurred (where the time component is an absolute date and/or time). Thus, processing of a dependent order line only commences after the time component has elapsed/occurred. In one embodiment, a dependency between two or more fulfillment functions within the fulfillment flow is applied to all order components of the orchestration plan that correspond to the two or more fulfillment functions.

Furthermore, in one embodiment, the orchestration plan is executed by an order management system to manage a fulfillment of the order by one or more fulfillment systems of a fulfillment topology. According to the embodiment, each fulfillment system of the one or more fulfillment systems includes one or more fulfillment providers, and the orchestration plan invokes one or more fulfillment functions provided by the one or more fulfillment providers when the orchestration plan is executed. In accordance with the embodiment, the order management system executes the orchestration plan by executing the one or more fulfillment functions of the fulfillment flow of the orchestration plan.

Figure 43:
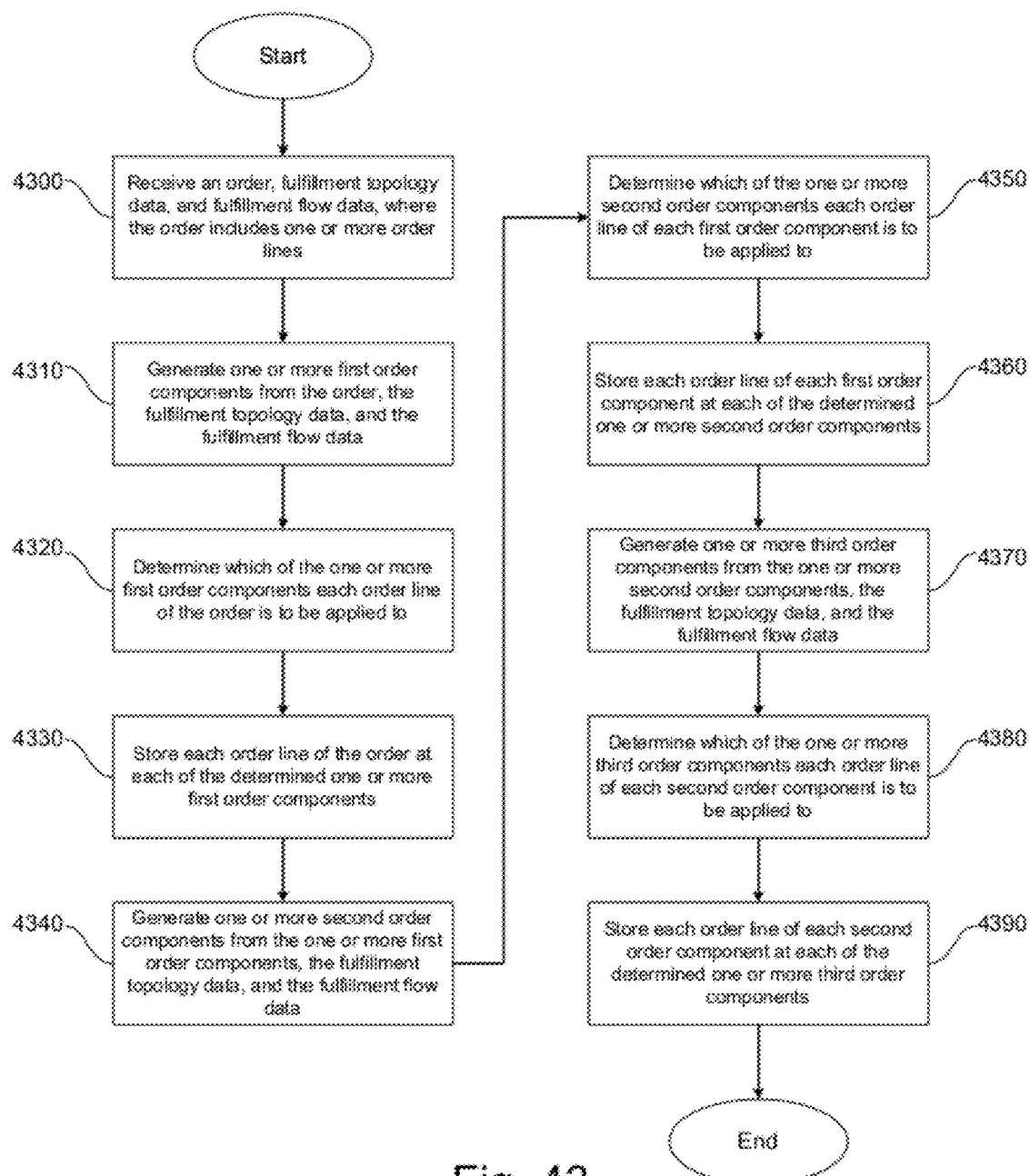
FIG. 43 illustrates another flow diagram of the functionality of an order management module, according to an embodiment of the invention.

FIG. 43 illustrates another flow diagram of the functionality of an order management module, according to an embodiment of the invention. At 4300, an order, fulfillment topology data, and fulfillment flow data is received, where the order represents an order received by an order management system. In one embodiment, the order includes one or more order lines. According to the embodiment, fulfillment topology data is data that defines a fulfillment topology associated with the order management system, where the fulfillment topology is a set of one or more fulfillment providers that can participate in the fulfillment of an order. Furthermore, according to the embodiment, fulfillment flow data is data that defines a fulfillment flow associated with the order management system, where the fulfillment flow is an entity that includes a set of fulfillment patterns.

At 4310, one or more first order components are generated from the order. According to an embodiment, the one or more first order components are generated from the order based on a first criteria, where the first criteria is based on a first stage of a decomposition sequence, where a decomposition sequence includes one or more stages. As previously described, a decomposition sequence is a process that drives a decomposition of an order into one or more order components. A decomposition sequence can comprise any number of decomposition stages. In one embodiment, the first criteria is a fulfillment function. According to the embodiment, the fulfillment function is determined based on the fulfillment flow data. In certain embodiments, the one or more first order components can be generated by partitioning the order into a plurality of order components. In other embodiments, a single first order component is generated from the order. In other alternate embodiments, the one or more first order components can be generated from a plurality of orders, where an order component can be generated from each order, or two or more orders from the plurality of orders can be combined into a single order component. Thus, any number of first order components can be created from any number of orders.

At 4320, it is determined which of the one or more first order components each order line of the order is applied to. According to the embodiment, the determination is based on the first criteria. For example, in an embodiment whether the first criteria is a fulfillment function, it is determined whether a fulfillment function associated with the order line matches the fulfillment function of the first order component. If the fulfillment function associated with the order line matches the fulfillment function of the first order component, then it is determined that the order line is to be applied to the first order component. According to the embodiment, this determination is made for each order line of the order. According to the embodiment, the fulfillment function is determined based on the fulfillment flow data.

At 4330, each order line of the order is stored at each of the determined one or more first order components. According to the embodiment, for each order line, if it is determined that the order line is to be applied to the first order component, the order line is stored at the first order component. This is done for each order line of the order and for each first order component of the one or more first order components.

At 4340, one or more second order components are generated from the one or more first order components. According to an embodiment, the one or more second order components are generated from the one or more first order components based on a second criteria, where the second criteria is based on a second stage of a decomposition sequence. In one embodiment, the second criteria is a fulfillment provider. According to the embodiment, the fulfillment provider is determined based on the fulfillment topology data. In certain embodiments, the one or more second order components can be generated by partitioning one or more first order components into a plurality of second order components. In other alternate embodiments, the one or more second order components can be generated by generating a second order component for each first order component, or combining two or more first order components into a single second order component. Thus, any number of second order components can be created from any number of first order components.

At 4350, it is determined which of the one or more second order components each order line of each first order component is applied to. According to the embodiment, the determination is based on the second criteria. For example, in an embodiment whether the second criteria is a fulfillment provider, it is determined whether a fulfillment provider associated with the order line matches the fulfillment provider of the second order component. If the fulfillment provider associated with the order line matches the fulfillment provider of the second order component, then it is determined that the order line is to be applied to the second order component. According to the embodiment, this determination is made for each order line of each first order component. According to the embodiment, the fulfillment provider is determined based on the fulfillment topology data.

At 4360, each order line of each first order component is stored at each of the determined one or more second order components. According to the embodiment, for each order line, if it is determined that the order line is to be applied to the second order component, the order line is stored at the second order component. This is done for each order line of each first order component and for each second order component of the one or more second order components.

At 4370, one or more third order components are generated from one or more second order components. According to an embodiment, the one or more third order components are generated from the one or more second order components based on a third criteria, where the third criteria is based on a third stage of a decomposition sequence. In one embodiment, the third criteria is a processing granularity. According to the embodiment, the processing granularity is determined based on the fulfillment flow data. In certain embodiments, the one or more third order components can be generated by partitioning one or more second order components into a plurality of third order components. In other alternate embodiments, the one or more third order components can be generated by generating a third order component for each second order component, or combining two or more second order components into a single third order component. Thus, any number of third order components can be created from any number of second order components.

At 4380, it is determined which of the one or more third order components each order line of each second order component is applied to. According to the embodiment, the determination is based on the third criteria. For example, in an embodiment whether the third criteria is a processing granularity, it is determined whether a processing granularity associated with the order line matches the processing granularity of the third order component. If the processing granularity associated with the order line matches the processing granularity of the third order component, then it is determined that the order line is to be applied to the third order component. According to the embodiment, this determination is made for each order line of each second order component. According to the embodiment, the process granularity is determined based on the fulfillment flow data.

At 4390, each order line of each second order component is stored at each of the determined one or more third order components. According to the embodiment, for each order line, if it is determined that the order line is to be applied to the third order component, the order line is stored at the third order component. This is done for each order line of each second order component and for each third order component of the one or more third order components. As one of ordinary skill in the art would appreciate, the illustrated embodiment of FIG. 43 is merely an example embodiment, and does not limit a number of decomposition stages that a decomposition sequence can comprise. As previously described, a decomposition sequence can comprise any number of decomposition stages.

Figure 44:
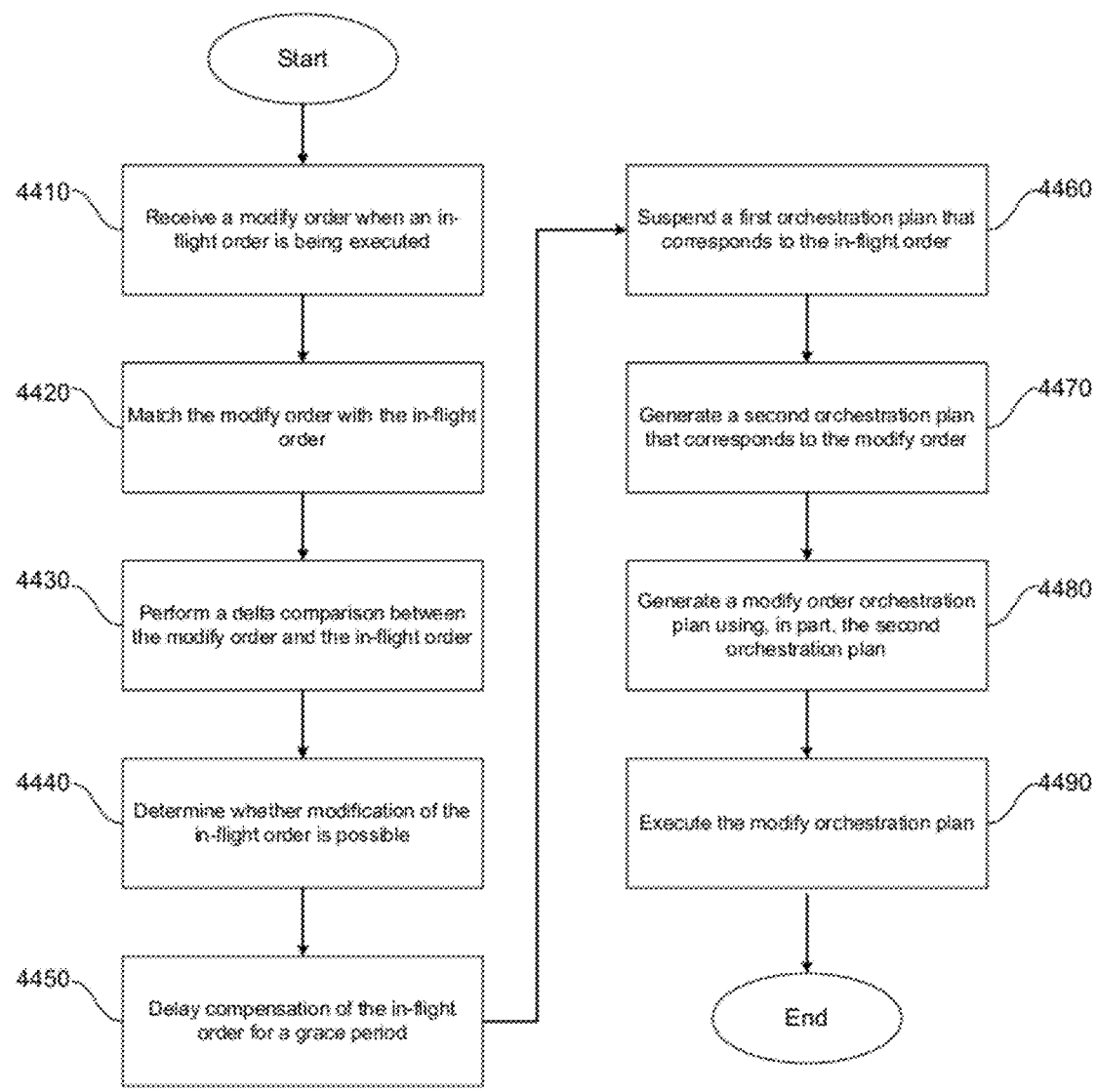
FIG. 44 illustrates another flow diagram of the functionality of an order management module, according to an embodiment of the invention.

FIG. 44 illustrates another flow diagram of the functionality of an order management module, according to an embodiment of the invention. At 4410, a modify order is received when an in-flight order is being executed, where the modify order represents a request to modify an in-flight order that is being executed by an order management system. In one embodiment, a modify order is a revision order, where the revision order represents a request to revise the in-flight order. In another embodiment, a modify order is a cancel order, where the cancel order represents a request to cancel the in-flight order. At 4420, the modify order is matched with the in-flight order using a key comparison, where a key of the modify order is compared with a key of the in-flight order. The key can be any pre-defined key as defined by a user. Subsequently, a revision identifier of the modify order is compared with a revision identifier of the in-flight order. A revision identifier is an attribute of an order that identifies a version of an order. If a value of the revision identifier of the modify order is not greater than a value of the revision identifier of the in-flight order, then processing of the flow terminates. This is because the modify order is "out-of-date" as compared to the in-flight order (i.e., the in-flight order originated after the modify order).

At 4430, a delta comparison is performed between the modify order and the in-flight order. The delta comparison comprises comparing one or more attributes of the modify order with one or more attributes of the in-flight order. Thus, the delta comparison can determine if the changes to the attributes within the modify order are sufficiently significant to warrant compensation. A threshold can be defined that determines whether the changes to the attributes are sufficiently significant to warrant compensation, where the threshold can be defined as any number of changed attributes.

At 4440, it is determined whether modification of the in-flight order is possible. For example, it can be determined how far the in-flight order has proceeded throughout its lifecycle. As an example, it can be determined whether the in-flight order has passed a PONR. In the example, if the in-flight order has passed a PONR, it can be determined that the in-flight order cannot be modified.

At 4450, compensation of the in-flight order can optionally be delayed for a period of time (identified as a "grace period"), to allow activity within the in-flight order to terminate. During the grace period, no new tasks within the in-flight order are initiated. Instead, tasks within the in-flight order that were previously started are given an opportunity to complete. In these embodiments, the compensation of the in-flight order can begin either at the end of the grace period, or when all the previously started tasks within the in-flight order are completed or have returned to their initial state.

At 4460, a first orchestration plan that corresponds to the in-flight order is suspended. In one embodiment, the order management system that executes the first orchestration plan dynamically suspends the first orchestration plan.

At 4470, a second orchestration plan that corresponds to the modify order is generated. In one embodiment, the second orchestration plan can be generated as previously discussed in relation to FIG. 42.

At 4480, a modify order orchestration plan is generated using, in part, the second orchestration plan. In an embodiment where the modify order is a revision order, the modify order orchestration plan can be a revision order orchestration plan, where the revision order orchestration plan includes a compensation plan and a balance plan. In an embodiment where the modify order orchestration plan is a revision order orchestration plan, the first orchestration plan is compared with the second orchestration plan to determine differences between the first orchestration plan and the second orchestration plan. In one embodiment, the differences can include at least one of, an order component present in the first orchestration plan that is not present in the second orchestration plan, an order component not present in the first orchestration plan that is present in the second orchestration plan, or an order component that is present in both the first orchestration plan and the second orchestration plan but includes different order lines in each orchestration plan. In one embodiment, the differences can include an order component that is present in both the first orchestration plan and the second orchestration plan but includes different content in each orchestration plan. In one embodiment, the comparing of the first orchestration plan with the second orchestration plan includes matching at least one order component from the first orchestration plan with at least one order component from the second orchestration plan. In one embodiment, the matching can include matching a key of at least one order component from the first orchestration plan with a key of at least one order component from the second orchestration plan. According to the embodiment, the differences between the first orchestration plan and the second orchestration plan are used to create the revision order orchestration plan. In one embodiment, the revision order orchestration plan is created by identifying a compensation type corresponding to each difference between the first orchestration plan and the second orchestration plan, and using each compensation type to generate an order component of the revision order orchestration plan. According to the embodiment, the order component can be one of three types of order components: (1) an order component that undoes one or more actions of a corresponding order component of the first orchestration plan; (2) an order component that redoes one or more actions of a corresponding order component of the first orchestration plan; or (3) an order component that performs one or more new actions in relation to the first orchestration plan.

In an embodiment where the modify order is a cancel order, the modify order orchestration plan can be a cancel order orchestration plan, where the cancel order orchestration plan only includes a compensation plan. According to the embodiment, the second orchestration plan is an empty revision order orchestration plan with no order lines that include any actions.

At 4490, the modify order orchestration plan is executed. In one embodiment, the modify order orchestration plan is executed by the order management system and fulfills the request to modify the in-flight order that was previously being executed by the order management system. In certain embodiments, one or more of steps 4420, 4430, 4440, and 4450 may be omitted from the flow.

Figure 45:
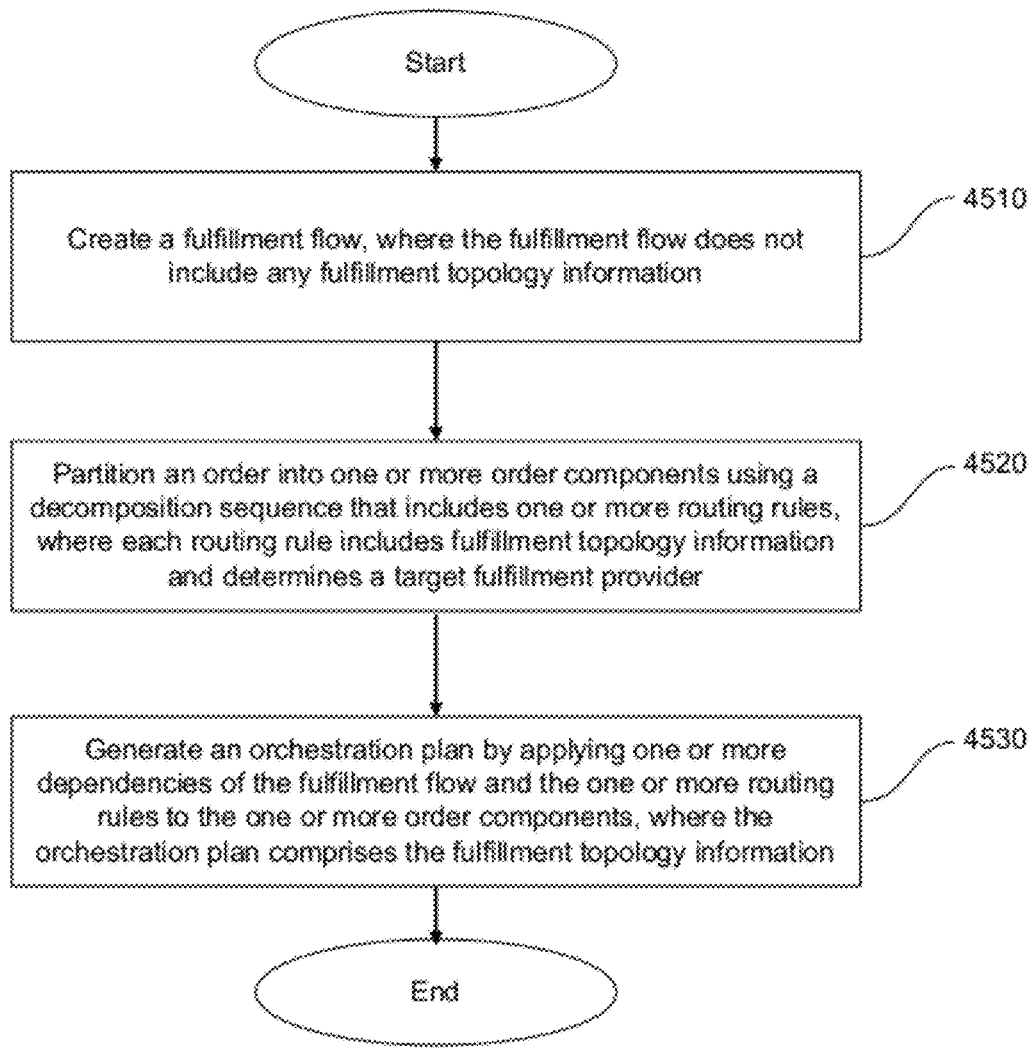
FIG. 45 illustrates another flow diagram of the functionality of an order management module, according to an embodiment of the invention.

FIG. 45 illustrates another flow diagram of the functionality of an order management module, according to an embodiment of the invention. At 4510, a fulfillment flow is created, where the fulfillment flow does not include any fulfillment topology information. In one embodiment, the fulfillment flow is created by an order management system. In accordance with the embodiment, the fulfillment flow includes one or more fulfillment patterns, where each fulfillment pattern does not include fulfillment topology information. Each fulfillment flow corresponds to a product specification, according to the embodiment, and each product specification also does not include topology information.

At 4520, an order is partitioned into one or more order components using a decomposition sequence, where the decomposition sequence includes one or more routing rules, where each routing rule includes fulfillment topology information, and where each routing rule determines a target fulfillment provider. In one embodiment, each routing rule includes persistent logic that determines which order line of the order is applied to which fulfillment provider. In accordance with an embodiment, the partitioning the order into one or more order components can include using the one or more routing rules to apply each order line of the order to an order component associated with a fulfillment provider.

At 4530, an orchestration plan is generated for the order by applying one or more dependencies of the fulfillment flow and the one or more routing rules to the one or more order components, where the orchestration plan comprises the fulfillment topology information. In one embodiment, the fulfillment flow of the orchestration plan interacts with a fulfillment system of the fulfillment topology through an exposed interface of the fulfillment system. According to the embodiment, the exposed interface provides a fulfillment function required by the fulfillment flow. One or more fulfillment providers of the fulfillment system can conform to the exposed interface.

Furthermore, in an embodiment of the invention, an order management system can define a consistent entity that exposes a service as a process, where the entity, and thus, the service, is not coupled to a technical implementation. This way, the order management system can modify a technical implementation for the entity, without modifying the entity. Thus, as types of technology change, and new technologies become available for providing services, an entity can remain relative unchanged, due to the entity being decoupled from the technical implementation details.

Figure 46:
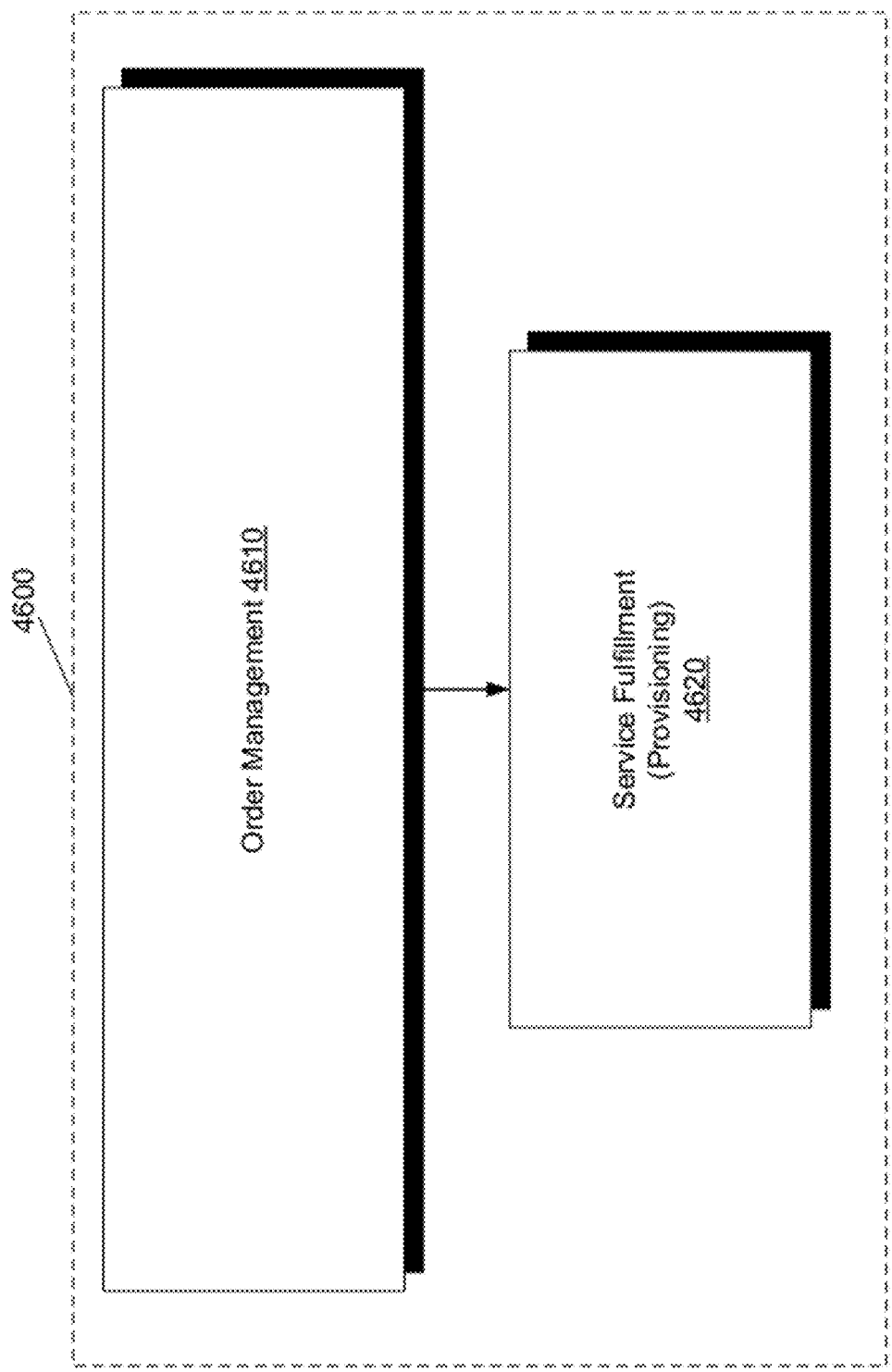
FIG. 46 illustrates an order management layer, and a service fulfillment (i.e., provisioning) layer of an order management system, according to an embodiment of the invention.

FIG. 46 illustrates an order management layer 4610, and a service fulfillment (i.e., provisioning) layer 4620 of an order management system 4600, according to an embodiment of the invention. In certain embodiments, order management system 4600 is similar to order management system 10 of FIG. 1, and order management system 200 of FIG. 2. According to certain embodiments, an order management system, such as order management system 4600 can include more than one layer. In the illustrated embodiment of FIG. 46, order management system 4600 includes two layers, order management layer 4610 and service fulfillment layer 4620. Order management layer 4610 can manage a fulfillment of an order as previously described. More specifically, order management layer 4610 can partition an order into one or more order components using a decomposition sequence, and can generate an orchestration plan, as also previously described. According to the embodiment, one order component can be a "Provision Order" order component. A "Provision Order" order component can represent one or more order lines that are provisionable (i.e., represent actions that provision a product or service to a customer), and thus, form a provisioning order, which is an order to provision one or more products or services. As an example, the one or more provisionable order lines can include actions on a product or service defined by a product specification. According to the embodiment, the provisioning order (i.e., the one or more provisionable order lines), are transmitted to service fulfillment layer 4620. Service fulfillment layer 4620 can fulfill the provisioning order by fulfilling the one or more order lines of the provisioning order. According to an embodiment, service fulfillment layer 4620 can fulfill the provisioning order utilizing a technical decoupling where a provisioned product or service is decoupled from a technical implementation that is utilized to provision the product or service. A technical decoupling is now described in greater detail.

Figure 47:
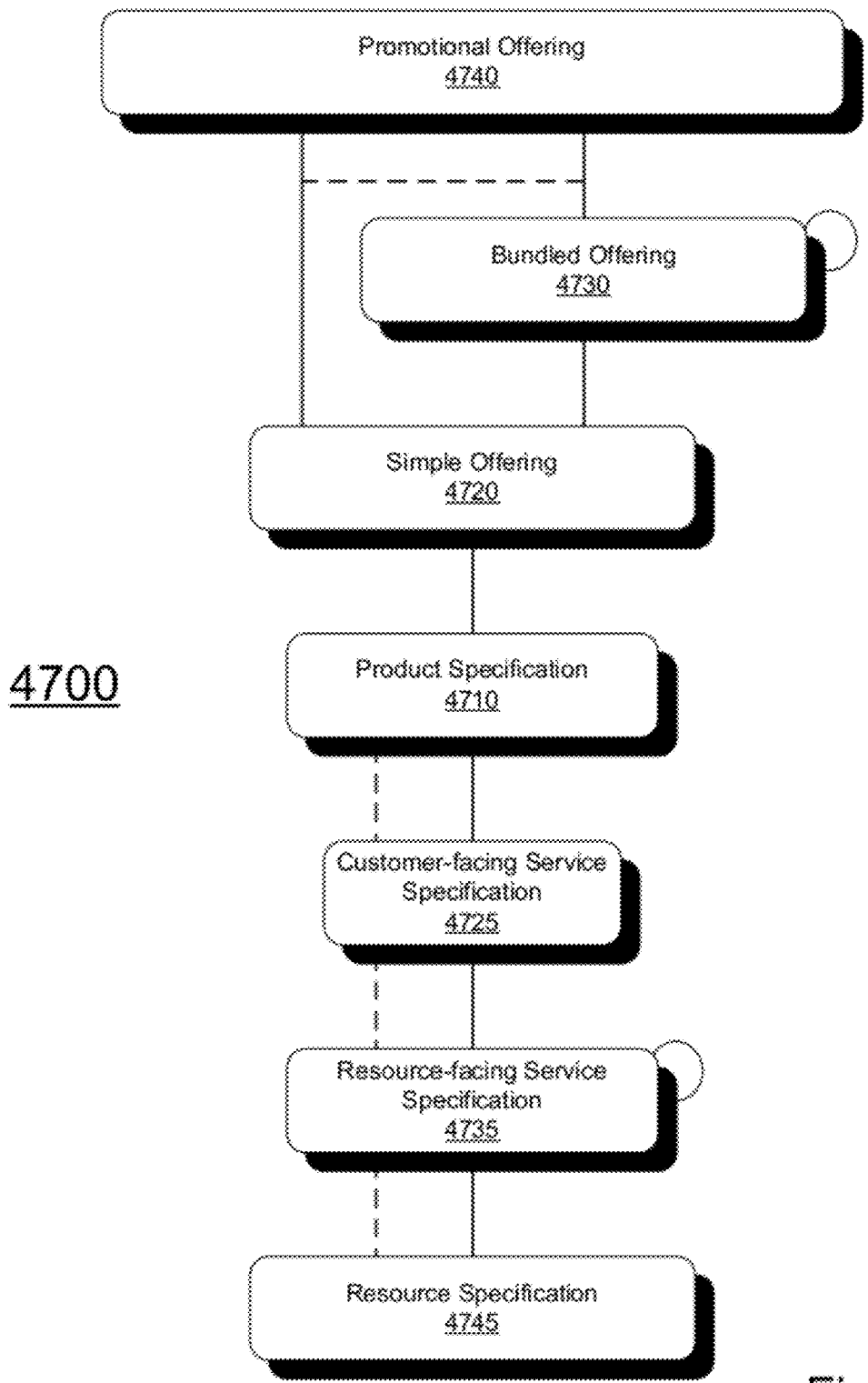
FIG. 47 illustrates a block diagram of an entity hierarchy, according to an embodiment of the invention.

FIG. 47 illustrates a block diagram of an entity hierarchy 4700, according to an embodiment of the invention. Entity hierarchy 4700 can be utilized to effectuate a technical decoupling, as entity hierarchy 4700 creates separate layers of data, where the data that relates to technical implementations is decoupled from data that relates the service or product that is provisioned to a customer. According to an embodiment, a plurality of entities can be defined within entity hierarchy 4700, where each entity includes a distinct subset of data, and where one entity can be mapped to another entity.

In the illustrated embodiment of FIG. 47, entity hierarchy 4700 includes a product specification 4710. Product specification 4710, as previously described, is a type of entity that contains data which describes a core capability that can be provided by a fulfillment provider. In certain embodiments, the core capability is a product. Product specification 4710 can be used to create a product offering, where the product offering can be realized as a physical good or service. Product specification 4710 is a type of product offering. A specification helps define a universal set of characteristics including characteristic value sets applicable to all product offerings that belong to a same type. A specification can be used to avoid repeating identical mapping/fulfillment logic for a number of product offerings.

The entity hierarchy also includes a simple offering (also identified as simple product offering) 4720. Simple offering 4720 is a type of entity that includes a product specification and data indicating an associated price and other commercial terms. According to an embodiment, one or more simple offerings can be created based on a product specification.

The entity hierarchy also includes a bundled offering (also identified as bundled product offering) 4730. Bundled offering 4730 is a type of entity that includes a plurality of simple offerings bundled together as a single offering. According to an embodiment, one or more bundled offerings can be created based on a simple offering. The circle displayed next to bundled offering 4730 within FIG. 47 indicates that a bundled offering can include other bundled offerings in addition to, or instead of, simple offerings.

The entity hierarchy also includes a promotional offering (also identified as promotional product offering) 4740. Promotional offering 4740 is a type of entity that includes one or more bundled offerings and/or one or more simple offerings. The entity also includes data indicating one or more associated commercial conditions. The conditions can include, for example, contractual terms, customer segments, time periods, and penalties associated with discontinuing the promotional offering. According to an embodiment, one or more promotional offerings can be created based on one or more simple offerings, one or more bundled offerings, or a combination therein.

The entity hierarchy also includes a customer-facing service specification 4725. Customer-facing service specification 4725 is a type of entity that contains data which describes a service, where the service can provide one or more core capabilities that are not technology-specific, and that are tied to the same lifecycle. More specifically, a customer-facing service is a technology-agnostic abstraction of a holistic capability from a perspective of a service provider (as opposed to an end user) that facilitates service commercialization, fulfillment, and management. A customer-facing service is not specific to a particular technology, nor does the customer-facing service embody any commercial concerns. For example, a single customer-facing service can be utilized for broadband service, whether the customer-facing service is realized through DSL technologies ("xDSL"), cable technologies, or general packet radio service ("GPRS") technologies. Similarly, a single customer-facing service can be utilized regardless of a number of product offerings (either simple or bundled) that the customer-facing service can be sold through.

As described below in more detail, a customer-facing service is realized through one or more "technical solutions," where each technical solution is comprised of one or more resources, one or more resource-facing services, or a combination therein. A customer-facing service defines a full set of features of commercial value that could be made available to a market through one or more product offerings. Furthermore, a customer-facing service can include other attributes that facilitate product to service mappings and a selection of a technical solution used to realize the capability promised by the customer-facing service.

Customer-facing service specification 4725 is a type of customer-facing service. A specification helps define a universal set of characteristics including characteristic value sets applicable to all customer-facing services that belong to a same type. A specification can be used to avoid repeating identical mapping/fulfillment logic for a number of customer-facing services.

A customer-facing service specification is different from a product specification due to the granularity at which each is defined. A customer-facing service specification is defined to include all the capabilities that a provider considers a single service from an infrastructure and lifecycle perspective. A product specification is defined at a granularity equal or finer than a customer-facing service specification to correspond to a capability that has commercial value by itself or with dependency on another capability. For example, a telephony customer-facing service specification has the option to give customer call forwarding, call waiting, and international roaming. The telephony customer-facing service specification is still considered, from an infrastructure and lifecycle perspective, as one customer-facing service specification. A provider may choose to a sell a basic telephony service without call forwarding, call waiting, and international roaming features, and sell the individual features as options. In one embodiment, two product specifications would be created: a Basic Telephony product specification and a Telephony Feature product specification. The Telephony Feature product specification could be used to create three simple offering, one for each feature, and could only be sold to customers who have, or are subscribing at the same to, an offering of the Basic Telephony product specification.

A customer-facing service specification does not include data that describes a technical implementation that is utilized to provision the service. Instead, a customer-facing service specification can be mapped to one or more resource-facing service specifications, one or more resource specifications, or a combination therein. In one embodiment, the mapped one or more resource-facing service specifications, one or more resource specifications, or combination therein, can be defined as a "technical solution." In one embodiment, a customer-facing service specification can be mapped to one or more technical solutions, and business logic, such as one or more business rules, can determine which technical solution is used to realize the customer-facing service. For example, a customer-facing service specification can select a technical solution that results in the lowest cost for a customer. As another example, a customer-facing service specification can select a solution based on a customer's technology preference. Thus, a service described within a customer-facing service specification is completely decoupled from the technical implementations of the service described within one or more resource-facing service specifications and/or resource specifications.

Furthermore, according to an embodiment, one or more product specifications can be created based on a single customer-facing service specification. More specifically, a customer-facing service specification represents a capability that is customer-viable (i.e., that is of value to a provider's customers), and that includes many permutations. In contrast, a product specification is a specific permutation of a customer-facing service specification or a resource (as indicated by the dotted line between product specification 4710 and resource specification 4745 in FIG. 47). Thus, a product specification is more finely-grained than a customer-facing service specification, and is more oriented to how an offering (e.g., simple offering, bundled offering, or promotion offering) is assembled. A product specification defines one or more values for a portion of the data defined in the corresponding customer-facing service specification based on boundaries that have commercial value from the perspective of a service provider. As an example, a customer-facing service specification may define data that relates to mobile services, where an attribute of the data is defined as a call forwarding attribute. A service provider can offer call forwarding as a separate product from a mobile service, and create a first product specification based on the customer-facing service specification that relates to a mobile service, and a second product specification also based on the customer-facing service specification that relates to call forwarding. The product specification that relates to call forwarding can be included in certain offerings, and not included in other offerings.

The entity hierarchy also includes a resource-facing service specification 4735. Resource-facing service specification 4735 is a type of entity that contains data which describes a technical implementation that is utilized to provision a product or service and that is technology-specific. More specifically, a resource-facing service specification is a technology-specific, vendor-agnostic, abstraction of a capability from the perspective of a service provider that captures the capability of an infrastructure component to facilitate service management and fulfillment. A resource-facing service is realized through one or more resources, one or more resource-facing services, or a combination therein.

Resource-facing service specification 4735 is a type of resource-facing service. A specification helps define a universal set of characteristics including characteristic value sets applicable to all resource-facing services that belong to a same type. A specification can be used to avoid repeating identical mapping/fulfillment logic for a number of resource-facing services.

A resource-facing service specification can be mapped to one or more resource specifications. The circle displayed next to resource-facing service specification 4735 within FIG. 47 indicates that a resource-facing service specification can be mapped to other resource-facing service specifications in addition to, or instead of, resource specifications.

The entity hierarchy also includes a resource specification 4745. Resource specification 4745 is a type of entity that contains data which describes a technical resource that is utilized by a technical implementation to provision a product or service. More specifically, a resource is a part of an enterprise's/supplier's infrastructure, or a Customer Premise Equipment/Device utilized directly or indirectly by a service. Resource specification 4745 is a type of resource. A specification helps define a universal set of characteristics including characteristic value sets applicable to all resources that belong to a same type. A specification can be used to avoid repeating identical mapping/fulfillment logic for a number of resources.

The decoupling of the customer-facing service specification from the resource-facing service specification and the resource specification can provide advantages for defining fulfillment flows. More specifically, in the entity hierarchy, the number of customer-facing service specifications is generally the fewest out of all the entities in the hierarchy. Thus, significantly fewer fulfillment flows are required due to the reduced number of customer-facing service specifications. In addition, a customer-facing service specification generally has the most complex design processing. Thus, a significantly fewer number of customer-facing service specifications can result in significant savings in design and processing time. The technical decoupling realized by an entity hierarchy allows for the generation of service orders without requiring knowledge of the technical implementations necessary to fulfill the service orders. Thus, in one embodiment, an order transformation is utilized to translate a service order into a technical order. Such a transformation is described in greater detail in relation to FIGS. 48. Furthermore, the technical decoupling enables providers to upgrade their infrastructure to take advantage of newer technologies with a very localized impact to a small portion of their implementation.

Figure 48:
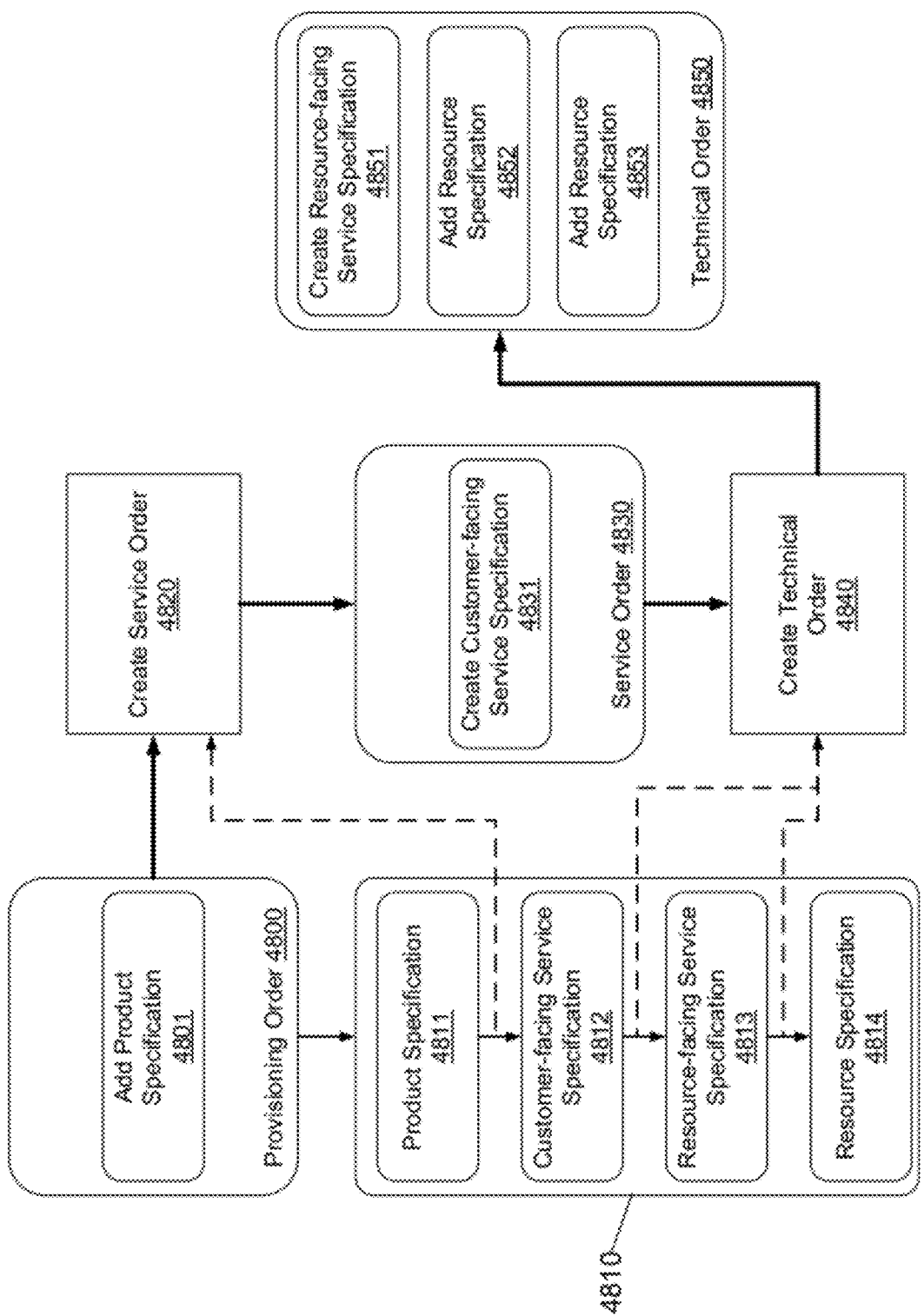
FIG. 48 illustrates a flow diagram of a transformation of a provisioning order to a service order, and a transformation of a service order to a technical order, according to an embodiment of the invention.

FIG. 48 illustrates a transformation of a provisioning order 4800 to a service order 4830, and a transformation of service order 4830 to a technical order 4850, according to an embodiment of the invention. Provisioning order 4800 is an example of a provisioning order. A provisioning order, as previously described, is an order to provision one or more products or services. A provisioning order, as also previously described, includes one or more order lines of an order that are sent to a service fulfillment layer of an order management system, after an order management layer manages a fulfillment of an order by partitioning the order into one or more order components and generating an orchestration plan. As also previously described, each order line of a provisioning order can include an action on a product or service defined by a product specification. In the illustrated embodiment of FIG. 48, provisioning order 4800 includes order line 4801. However, this is only an example embodiment, and one of ordinary skill in the art would readily appreciate that provisioning order 4800 can include any number of order lines and still be within the scope of the invention. Order line 4801 includes an action (in this example an add action) on a product offering. According to an embodiment, order line 4801 references a product specification defined in catalog 4810 (i.e., product specification 4811), described below in greater detail. In an embodiment where provisioning order 4800 includes a plurality of order lines, one or more order lines of the plurality of order lines can each reference a product specification defined in catalog 4810.

Figure 49:
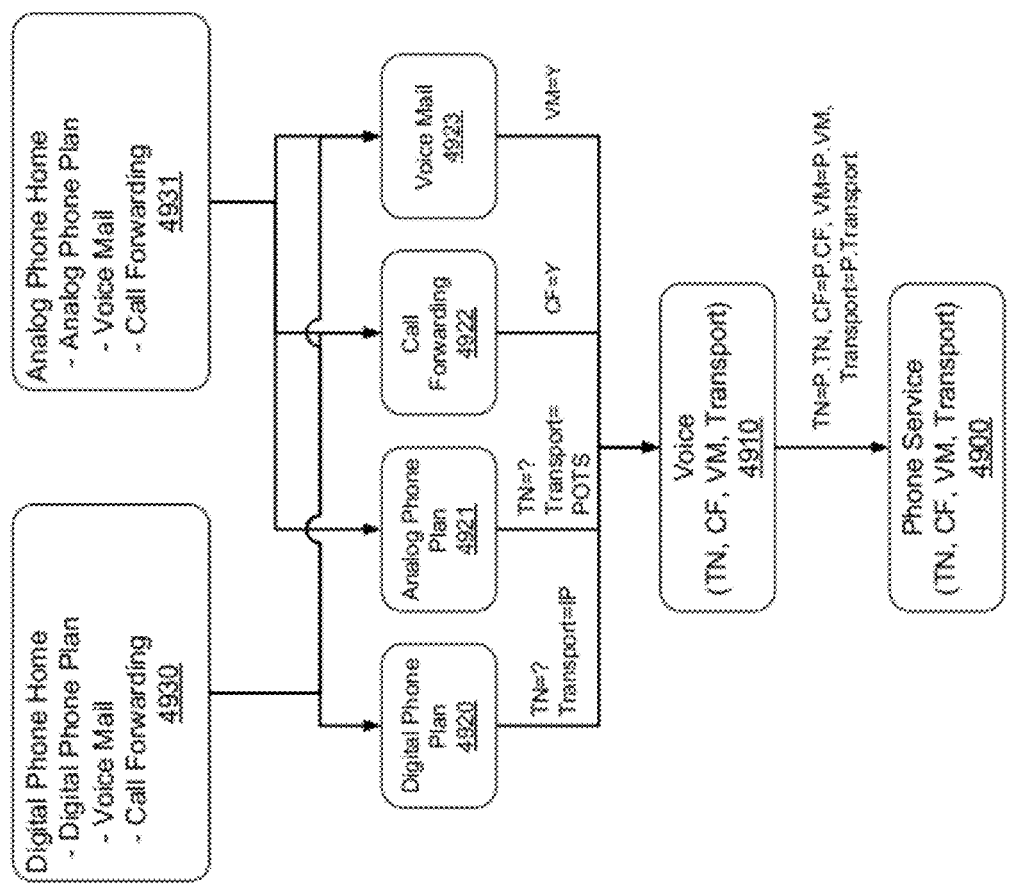
FIG. 49 illustrates an example of an entity model of a commercial catalog, according to an embodiment of the invention.
Figure 50:
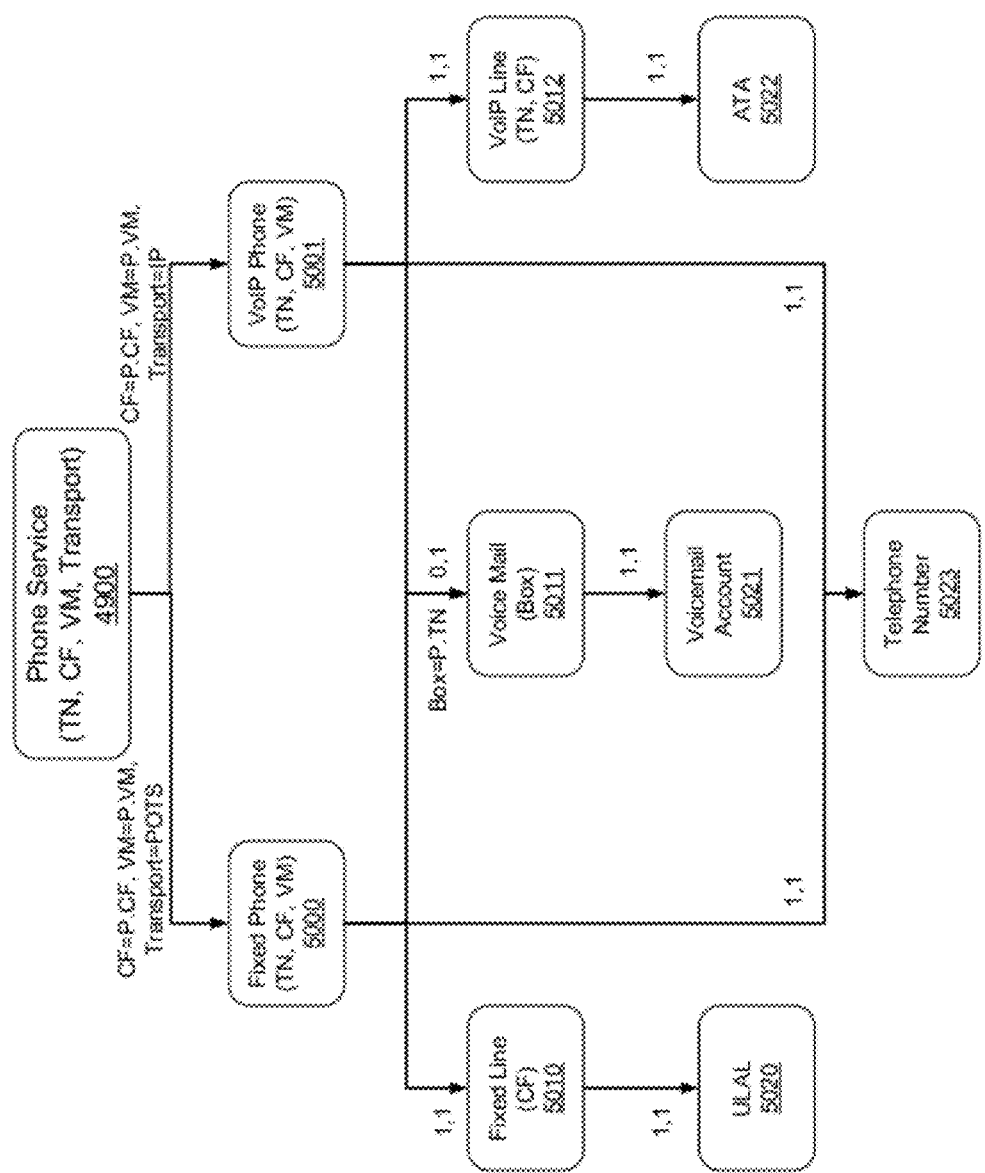
FIG. 50 illustrates an example of an entity model of a technical catalog, according to an embodiment of the invention.

Catalog 4810 is an example of a product-service-resource catalog. A product-service-resource catalog is a data store that contains metadata that defines one or more entities used by a service fulfillment layer of an order management system to fulfill a provisioning order. Additional examples of a product-service-resource catalog are illustrated in FIGS. 49 and 50, and described in greater detail in relation to those figures.

Catalog 4810 includes metadata that defines a product specification (identified as product specification 4811 in FIG. 48), a customer-facing service specification (identified as customer-facing service specification 4812 in FIG. 48), a resource-facing specification (identified as resource-facing specification 4813 in FIG. 48), and a resource specification (identified as resource specification 4814 in FIG. 48). While in FIG. 48, catalog 4810 includes metadata that defines only one of each entity type (i.e., product specification, customer-facing service specification, resource-facing service specification, and resource specification), one of ordinary skill in the art would readily appreciate that this is only an example embodiment, and that in alternate embodiments, catalog 4810 can include metadata that defines any number of entities for each entity type. In other words, catalog 4810 can include metadata that defines one or more product specifications, one or more customer-facing service specifications, one or more resource-facing specifications, and one or more resource specifications.

According to the embodiment, catalog 4810 also includes metadata that defines an entity hierarchy. The entity hierarchy defines a mapping between product specification 4811, customer-facing service specification 4812, resource-facing service specification 4813, and resource specification 4814. According to an embodiment, product specification 4811 can map to customer-facing service specification 4812 (represented by a line between product specification 4811 and customer-facing service specification 4812 in FIG. 48), customer-facing service specification 4812 can map to resource-facing service specification 4813 (represented by a line between customer-facing service specification 4812 and resource-facing service specification 4813 in FIG. 48), and resource-facing service specification 4813 can map to resource specification 4814 (represented by a line between resource-facing service specification 4813 and resource specification 4814 in FIG. 48). Although not illustrated in FIG. 48, as previously described, a customer-facing service specification can also map to a resource specification. In one embodiment, the entity hierarchy defined for catalog 4810 is identical to entity hierarchy 4700 illustrated in FIG. 47, and includes all of the entity types illustrated in FIG. 47.

FIG. 48 also includes process 4820 (identified as "Create Service Order" in FIG. 48). According to the embodiment, process 4820 is an executable process that can transform a provisioning order into a service order. More specifically, process 4820 can transform a provisioning order that includes one or more order lines, where each order line includes an action on a product specification, into a service order that includes one or more order lines, where each order line includes an action on a customer-facing service specification. According to the embodiment, process 4820 uses metadata that maps a product specification to a customer-facing service specification. In one embodiment, the metadata that maps a product specification to a customer-facing service specification is stored within catalog 4810. In one embodiment, process 4820 also uses metadata to map each order component of a provisioning order to an order component of a service order. Thus, the service order does not reference any data relating to technical implementations, and is technology-agnostic.

Figure 51:
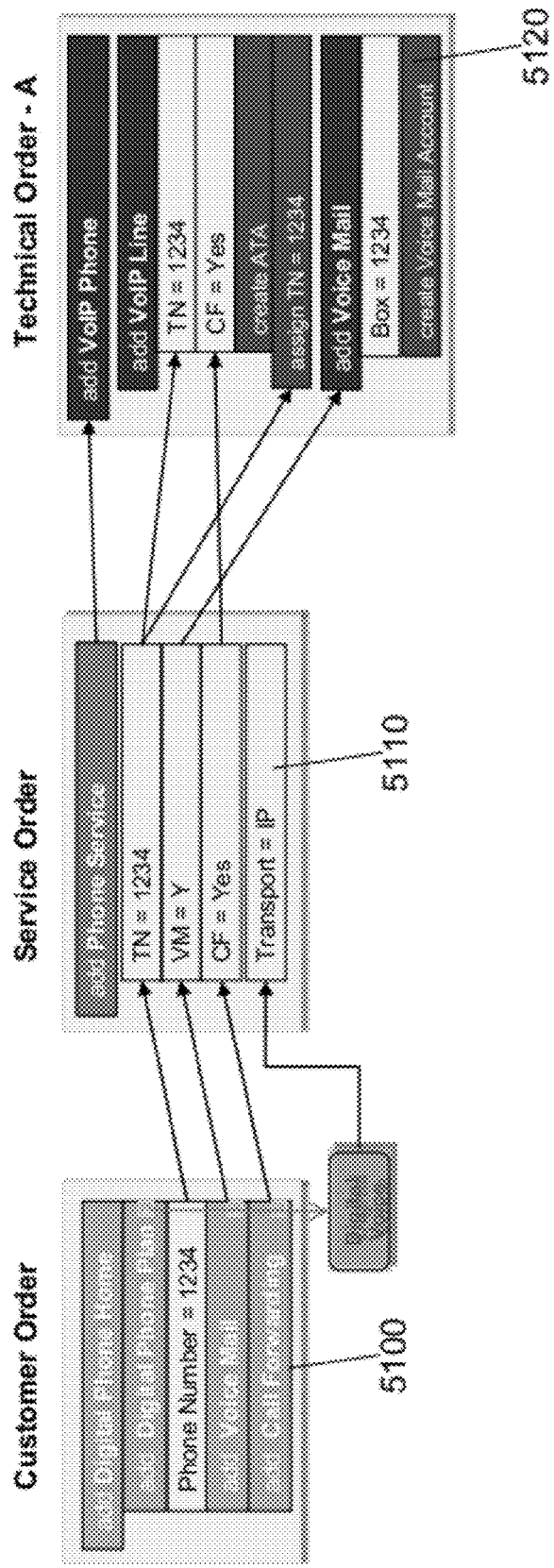
FIG. 51 illustrates an example of a transformation of a customer order to a service order and a transformation of a service order to a technical order, according to an embodiment of the invention.
Figure 52:
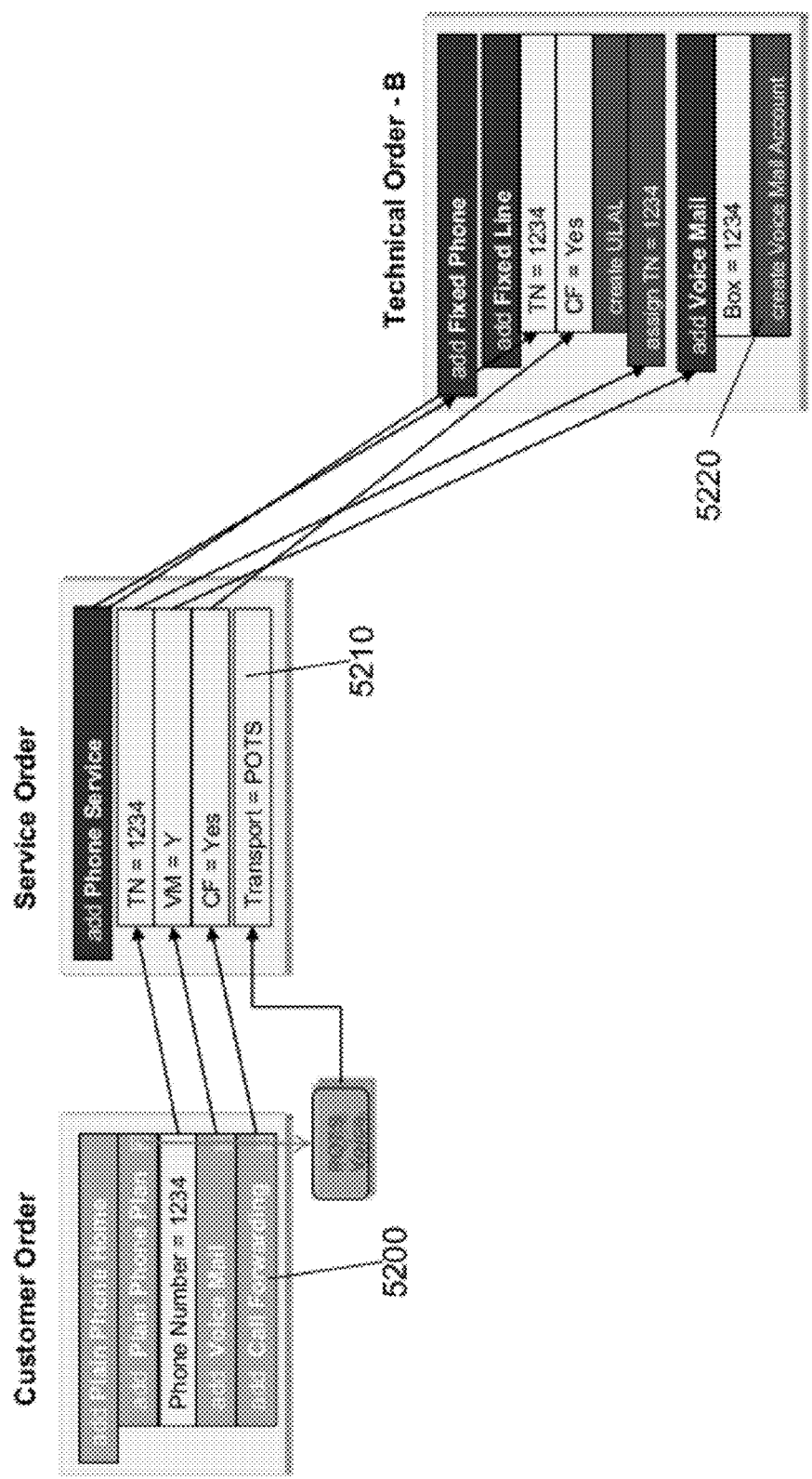
FIG. 52 illustrates another example of a transformation of a customer order to a service order and a transformation of a service order to a technical order, according to an embodiment of the invention.

According to the illustrated embodiment of FIG. 48, process 4820 receives provisioning order 4800. Process 4820 identifies that provisioning order 4800 includes order line 4801, where order line 4801 includes an add action on a product offering. Process 4820 then utilizes metadata stored in catalog 4810 to identify that product specification 4811 maps to customer-facing service specification 4812. Based on the metadata, process 4820 transforms provisioning order 4800 into service order 4830, which is an example of a service order. A service order is an order to provision one or more customer-facing services. A service order includes one or more order lines, where each order line includes an action on a customer-facing service. Also based on the metadata, process 4820 transforms order line 4801 to order line 4831. Order line 4831 includes an action (in this example a create action) on a customer-facing service. According to an embodiment, order line 4831 references a customer-facing service specification defined in catalog 4810. While, in the illustrated embodiment of FIG. 48, service order 4830 includes order line 4831, this is only an example embodiment, and one of ordinary skill in the art would readily appreciate that service order 4830 can include any number of order lines and still be within the scope of the invention. In an embodiment where service order 4830 includes a plurality of order lines, one or more order lines of the plurality of order lines can each reference a customer-facing service specification defined in catalog 4810. In one embodiment, process 4820 can transform provisioning order 4800 into service order 4830 by partitioning provisioning order 4800 into one or more provisioning order components using a decomposition sequence, and generating an orchestration plan, as previously described. Additional examples of transforming a provisioning order into a service order are illustrated in FIGS. 51 and 52, and described in greater detail in relation to those figures.

FIG. 48 also includes process 4840 (identified as "Create Technical Order" in FIG. 48). According to the embodiment, process 4840 is an executable process that can transform a service order into a technical order. More specifically, process 4840 can transform a service order that includes one or more order lines, where each order line includes an action on a customer-facing service, into a technical order that includes one or more order lines, where each order line includes an action on either a resource-facing service or a resource. According to the embodiment, process 4840 uses metadata that maps a customer-facing service specification to one or more resource-facing service specifications, one or more resource specifications, or a combination therein. In one embodiment, the metadata that maps a customer-facing service specification to one or more resource-facing service specifications, one or more resource specifications, or a combination therein, is stored within catalog 4810. In one embodiment, process 4840 also uses metadata to map each order component of a service order to an order component of a technical order. Thus, the technical order does reference data relating to technical implementations, and is technology-specific.

According to the illustrated embodiment of FIG. 48, process 4840 receives service order 4830. Process 4840 identifies that service order 4830 includes order line 4831, where order line 4831 includes a create action on a customer-facing service. Process 4850 then utilizes metadata stored in catalog 4810 to identify that customer-facing service specification 4812 maps to resource-facing service specification 4813 and resource specification 4814. More specifically, process 4850 identifies that customer-facing service specification 4812 maps to one or more resource-facing specifications (represented by resource-facing service specification 4813 in FIG. 48), one or more resource specifications (represented by resource specification 4814 in FIG. 48), or a combination therein. In one embodiment, the mapped one or more resource-facing service specifications, one or more resource specifications, or combination therein, can be defined as a "technical solution," and customer-facing service specification 4812 can be mapped to one or more technical solutions. According to this embodiment, process 4850 can then utilize business logic stored in catalog 4810 to select a technical solution for customer-facing service specification 4812. In the illustrated embodiment of FIG. 48, customer-facing service specification 4812 maps to one technical solution made up of one resource-facing service specification (represented by resource-facing service specification 4813 in FIG. 48), and one resource specification (represented by resource specification 4814 in FIG. 48). However, this is only an example embodiment, and in other embodiments, customer-facing service 4812 can map to any number of technical solutions, where each technical solution can map to any number of resource-facing service specifications, any number of resource specifications, or any combination therein.

Based on the metadata (and in certain embodiments, the business logic), process 4840 transforms service order 4830 into technical order 4850, which is an example of a technical order. A technical order is an order to create one or more resource-facing services and/or one or more resources. A technical order includes one or more order lines, where each order line includes an action on either a resource-facing service or a resource. Also based on the metadata (and in certain embodiments, the business logic), process 4850 transforms order line 4831 into order lines 4851, 4852 and 4853. Order line 4851 includes an action (in this example, a create action) on a resource-facing service. According to an embodiment, order line 4851 references a resource-facing service defined in catalog 4810. Order line 4852 includes an action (in this example, an add action) on a first resource. According to an embodiment, order line 4852 references a resource specification defined in catalog 4810. Order line 4853 includes an action (in this example, an add action) on a second resource. According to an embodiment, order line 4853 also references a resource specification defined in catalog. While, in the illustrated embodiment of FIG. 48, technical order 4850 includes order lines 4851, 4852, 4853, where order line 4851 references a resource-facing service specification, and order lines 4852 and 4853 each reference a resource specification, this is only an example embodiment, and one of ordinary skill in the art would readily appreciate that technical order 4850 can include any number of order lines and still be within the scope of the invention. In an embodiment where technical order 4850 includes a plurality of order lines, one or more order lines of the plurality of order lines can each reference either a resource-facing service specification defined in catalog 4810 or a resource specification also defined in catalog 4810. In one embodiment, process 4840 can transform service order 4830 into technical order 4850. In another embodiment, process 4840 can transform a service order into one or more technical orders. Additional examples of transforming a service order into a technical order are illustrated in FIGS. 51 and 52, and described in greater detail in relation to those figures.

At the end of the process described above, and illustrated in FIG. 48, a technical order is produced that references one or more executable sub-processes. In an alternate embodiment, a technical order can be fulfilled using a dynamically generated orchestration plan, as previously described. According to an embodiment, the executable sub-processes are defined flows that are specific to a technology and contain technical implementation data. In one embodiment, the one or more executable sub-processes are static executable sub-processes. An executable process (not shown) can execute each of the executable sub-processes to fulfill the technical order and provision the one or more products or services.

FIG. 49 illustrates an example of an entity model of a commercial catalog, according to an embodiment of the invention. The commercial catalog includes customer-facing service specification 4900. As previously described, a customer-facing service specification is a type of entity that contains data which describes a service, where the service can provide one or more core capabilities that are not technology-specific, and that are tied to the same lifecycle. More specifically, a customer-facing service is a technology-agnostic abstraction of a holistic capability from a perspective of a service provider (as opposed to an end user) that facilitates service commercialization, fulfillment, and management. A customer-facing service is not specific to a particular technology, nor does the customer-facing service embody any commercial concerns A customer-facing service specification can be realized through one or more technical solutions, where a technical solution comprises one or more resources and resource-facing services. According to the illustrated embodiment of FIG. 49, customer-facing service specification 4900 is an example of a technology-agnostic customer-facing service that is parameterized to allow implementation using different transports, telephone number ("TN") selection, call forwarding ("CF") features, and voice mail ("VM") features.

The commercial catalog also includes product specification 4910. As previously described, a product specification is a type of entity that contains data which describes a core capability that can be provided by a fulfillment provider. In certain embodiments, the core capability is a product. According to an embodiment, one or more product specifications can be created based on a single customer-facing service specification. In the illustrated embodiment of FIG. 49, product specification 4910 is an example product specification that represents one of many product specifications that can be created to expose part or all of the capabilities of customer-facing service specification 4900.

The commercial catalog also includes simple product offerings 4920, 4921, 4922, and 4923. As previously described, a simple product offering is a type of entity that includes a product specification and data indicating an associated price and other commercial terms. According to an embodiment, one or more simple offerings can be created based on a product specification. In the illustrated embodiment of FIG. 49, simple product offerings 4920, 4921, 4922, and 4923 are created based on product specification 4910. Simple product offerings 4920, 4921, 4922, and 4923 can each have a price associated with them. Thus, simple product offerings 4920, 4921, 4922, and 4923 can represent offerings that a customer can purchase.

The commercial catalog also includes bundled product offerings 4930 and 4931. As previously described, a bundled product offering is a type of entity that includes a plurality of simple product offerings bundled together as a single offering. According to an embodiment, one or more bundled product offerings can be created based on a simple product offering. In certain embodiments, a bundled product offering can include other bundled product offerings in addition to, or instead of, simple product offerings. In the illustrated embodiment of FIG. 49, simple product offerings 4920, 4921, 4922, and 4923 are sold through bundled product offerings 4930 and 4931. However, this is merely an example embodiment, and any type of bundled product offering can be created based on any combination of simple product offerings 4920, 4921, 4922, and 4923.

According to the embodiment, the customer-facing service represented by customer-facing service specification 4900 is decoupled from a commercial packaging by product specification 4910. Thus, one or more fulfillment flows that act on the customer-facing service represented by customer-facing service specification 4900 are not affected by commercial changes, such as changes to bundled product offerings 4930 and 4931 or simple product offerings 4920, 4921, 4922, and 4923.

One of ordinary skill in the art would readily appreciate that this is merely an example configuration of a commercial catalog, according to an embodiment of the invention. Thus, in alternate embodiments, the commercial catalog may have alternate configurations, and still be within the scope of the invention.

FIG. 50 illustrates an example of an entity model of a technical catalog, according to an embodiment of the invention. The technical catalog includes customer-facing service specification 4900. Customer-facing service specification 4900 is identical to customer-facing service specification 4900 as illustrated in FIG. 49, and is previously described in relation to FIG. 49, and is not further described here.

The technical catalog also includes resource-facing service specifications 5000, 5001, 5010, 5011, and 5012. A resource-facing service specification is a type of entity that contains data which describes a technical implementation that is utilized to provision a product or service and that is technology-specific. More specifically, a resource-facing service specification is a technology-specific, vendor-agnostic, abstraction of a capability from the perspective of a service provider that captures the capability of an infrastructure component to facilitate service management and fulfillment. A resource-facing service is realized through one or more resources, one or more resource-facing services, or a combination therein. A resource-facing service specification can be mapped to one or more resource specifications. A resource-facing service specification can also be mapped to other resource-facing service specifications in addition to, or instead of, resource specifications. In the illustrated embodiment of FIG. 50, customer-facing service specification 4900 has two alternate technical embodiments depending on a transport attribute: resource-facing service specification 5000 and resource-facing service specification 5001. Resource-facing service specifications 5000 and 5001 are top-level resource-facing service specifications that each comprise a technology-specific hierarchy of other resource-facing service specifications and other resources. Specifically, the hierarchy of resource-facing service specification 5000 is comprised of resource-facing service specifications 5010 and 5011, and resource specifications 5020, 5021, and 5023. The hierarchy of resource-facing service specification 5001 is comprised of resource-facing service specifications 5011 and 5012, and resource specifications 5021, 5022, and 5023. As previously described, each hierarchy is also identified as a technical solution. The alternate technical solutions illustrated in FIG. 50 can be alternatives within a same time period, or they can represent a service provider's conversion of a phone service from a fixed-line implementation to a VoIP implementation. Both scenarios are facilitated with a localized impact through a decoupling value of a customer-facing service.

The technical catalog also includes resource specifications 5020, 5021, 5022, and 5023. As previously described, a resource specification is a type of entity that contains data which describes a technical resource that is utilized by a technical implementation to provision a product or service. In the illustrated embodiment of FIG. 50, resource specification 5020 describes a technical resource that is utilized by the technical hierarchy of resource-facing service specification 5000. Likewise, resource specification 5022 describes a technical resource that is utilized by the technical hierarchy of resource-facing service specification 5001. Furthermore, resource specifications 5021 and 5023 each describe a technical resource that is utilized by the technical hierarchy of resource-facing service specification 5000, and by the technical hierarchy of resource-facing service specification 5001.

One of ordinary skill in the art would readily appreciate that this is merely an example configuration of a technical catalog, according to an embodiment of the invention. Thus, in alternate embodiments, the technical catalog may have alternate configurations, and still be within the scope of the invention.

FIG. 51 illustrates an example of a transformation of a customer order 5100 to a service order 5110 and a transformation of service order 5110 to a technical order 5120, according to an embodiment of the invention. Customer order 5100 represents a first time purchase of a "Digital Phone Home" bundled product, and includes Voice Mail and Call Forwarding product features, along with a base Digital Phone Plan product. Customer order 5100 also includes a phone number attribute, where a value of the phone number attribute can be captured during order capture of the order represented by customer order 5100. As illustrated in FIG. 51, customer order 5100 includes four customer order lines with add actions (i.e., add Digital Phone Home, add Digital Phone Plan, add Voice Mail, and add Call Forwarding).

According to the illustrated embodiment of FIG. 51, customer order 5100 is transformed into service order 5110. Service order 5110 includes a TN attribute with a value of "1234," a VM attribute with a value of "Y," a CF attribute with a value of "Yes," and a transport attribute with a value of "IP." As part of the transformation, three customer order lines of customer order 5100 (i.e., add Digital Phone Plan, add Voice Mail, and add Call Forwarding) are mapped to one service order line of service order 5110 (i.e., add Phone Service). The service order line of service order 5110 is a service order line with an add action against a "Phone Service" customer-facing service. Each of the three customer order lines (i.e., add Digital Phone Plan, add Voice Mail, and add Call Forwarding) that are mapped to the "Phone Service" customer-facing service contribute a part of a definition of service order 5110 as indicated by the arrows in FIG. 51.

According to the illustrated embodiment of FIG. 51, service order 5110 is transformed into technical order 5120 (i.e., Technical Order—A). As part of the transformation, the service order line of service order 5110 (i.e., add Phone Service) is mapped to a technical order line of technical order 5120 (i.e., add VoIP Phone and add Voice Mail). The technical order line is an add action against a resource-facing service (i.e., VoIP Phone 5001). The technical order line includes two technical order sub-lines (i.e., add VoIP Line and add Voice Mail). The two technical order sub-lines are also add actions against a resource-facing service (i.e., VoIP Line 5012, and Voice Mail 5011, respectively).

Thus, according to the illustrated embodiment of FIG. 51, customer order 5100 corresponds to bundled product offering 4930 of FIG. 49, which includes simple product offerings 4920, 4922, and 4923 of FIG. 49, and product specification 4910. Furthermore, service order 5110 corresponds to customer-facing service specification 4900 of FIGS. 49 and 50. Even further, technical order 5120 corresponds to resource-facing service specification 5001 of FIG. 50, and the technical solution associated with resource-facing service specification 5001 of FIG. 50 (i.e., resource-facing service specifications 5011 and 5012, and resource specifications 5021, 5022, and 5023).

FIG. 52 illustrates another example of a transformation of a customer order 5200 to a service order 5210 and a transformation of service order 5210 to a technical order 5220, according to an embodiment of the invention. Customer order 5200 represents a first time purchase of a "Plain Phone Home" bundled product, and includes Voice Mail and Call Forwarding product features, along with a base Plain Phone Plan product. Customer order 5200 also includes a phone number attribute, where a value of the phone number attribute can be captured during order capture of the order represented by customer order 5200. As illustrated in FIG. 52, customer order 5200 includes four customer order lines with add actions (i.e., add Plain Phone Home, add Plain Phone Plan, add Voice Mail, and add Call Forwarding).

According to the illustrated embodiment of FIG. 52, customer order 5200 is transformed into service order 5210. Service order 5120 includes a TN attribute with a value of "1234," a VM attribute with a value of "Y," a CF attribute with a value of "Yes," and a transport attribute with a value of "POTS." As part of the transformation, three customer order lines of customer order 5200 (i.e., add Plain Phone Plan, add Voice Mail, and add Call Forwarding) are mapped to one service order line of service order 5210 (i.e., add Phone Service). The service order line of service order 5210 is a service order line with an add action against a "Phone Service" customer-facing service. Each of the three customer order lines (i.e., add Plain Phone Plan, add Voice Mail, and add Call Forwarding) that are mapped to the "Phone Service" customer-facing service contribute a part of a definition of service order 5210 as indicated by the arrows in FIG. 52.

According to the illustrated embodiment of FIG. 52, service order 5210 is transformed into technical order 5220 (i.e., Technical Order—B). As part of the transformation, the service order line of service order 5210 (i.e., add Phone Service) is mapped to a technical order line of technical order 5220 (i.e., add Fixed Phone). The technical order line is an add action against a resource-facing service (i.e., Fixed Phone 5000). The technical order line includes two technical order sub-lines (i.e., add Fixed Line and add Voice Mail). The two technical order sub-lines are also add actions against a resource-facing service (i.e., Fixed Line 5010 and Voice Mail 5011, respectively).

Thus, according to the illustrated embodiment of FIG. 52, customer order 5200 corresponds to bundled product offering 4931 of FIG. 49, which includes simple product offerings 4921, 4922, and 4923 of FIG. 49, and product specification 4910. Furthermore, service order 5210 corresponds to customer-facing service specification 4900 of FIGS. 49 and 50. Even further, technical order 5220 corresponds to resource-facing service specification 5000 of FIG. 50, and the technical solution associated with resource-facing service specification 5000 of FIG. 50 (i.e., resource-facing service specifications 5010 and 5011, and resource specifications 5020, 5021, and 5023).

Therefore, according to the embodiment, customer order 5200, which represents a customer order for a set of products that is different from a set of products associated with customer order 5100, also results in a service order for a Phone Service (i.e., service order 5110), but in this embodiment, service order 5110 includes a transport attribute with a value of "POTS," as compared to service order 5010, which includes a transport attribute with a value of "IP." Based on this transport attribute, technical order 5220 creates a Fixed Phone resource-facing service (i.e., resource-facing service specification 5000 of FIG. 50). Thus, technical order 5120 and technical order 5220 each represent alternate technical solutions to a single customer-facing service. The choice among the two alternative technical solutions is driven by the transport attribute value of the customer-facing service. The transport attribute value is further driven by the selected product offering (i.e., either the Digital Phone Plan product offering or the Fixed Phone Plan product offering).

Figure 53:
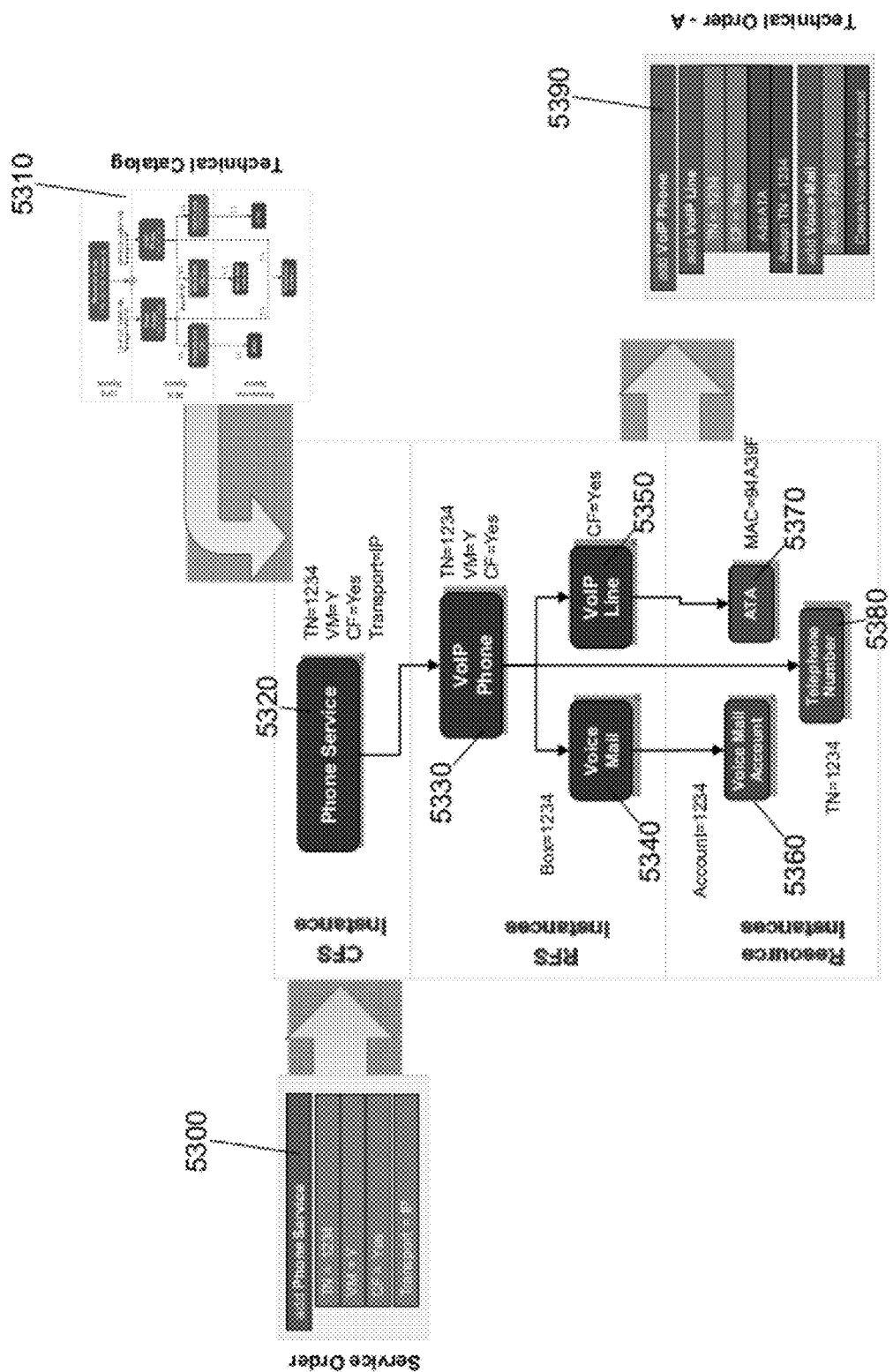
FIG. 53 illustrates a flow diagram of processing a service order and generating a technical order, according to an embodiment of the invention.

FIG. 53 illustrates a flow diagram of processing a service order 5300 and generating a technical order 5310, according to an embodiment of the invention. According to the embodiment, processing of service order 5300, guided by technical catalog 5310, creates an instance of a customer-facing service (i.e., customer-facing service 5320) in an inventory, where customer-facing service 5320 is associated with a particular customer. By processing service order 5300, technical order 5310 is generated. Furthermore, the processing of service order 5300 creates instances of appropriate resources-facing services (i.e., resource-facing services 5330, 5340, and 5350), which are descendants of customer-facing service 5320. Resources assigned to resource-facing services 5330, 5340, and 5350 (i.e., resources 5360, 5370, and 5380) are selected from an available inventory or created as needed. Thus, a by-product of fulfilling a customer order is a detailed model of a customer's service, together with an updated view of available versus allocated resources, in an embodiment.

Figure 54:
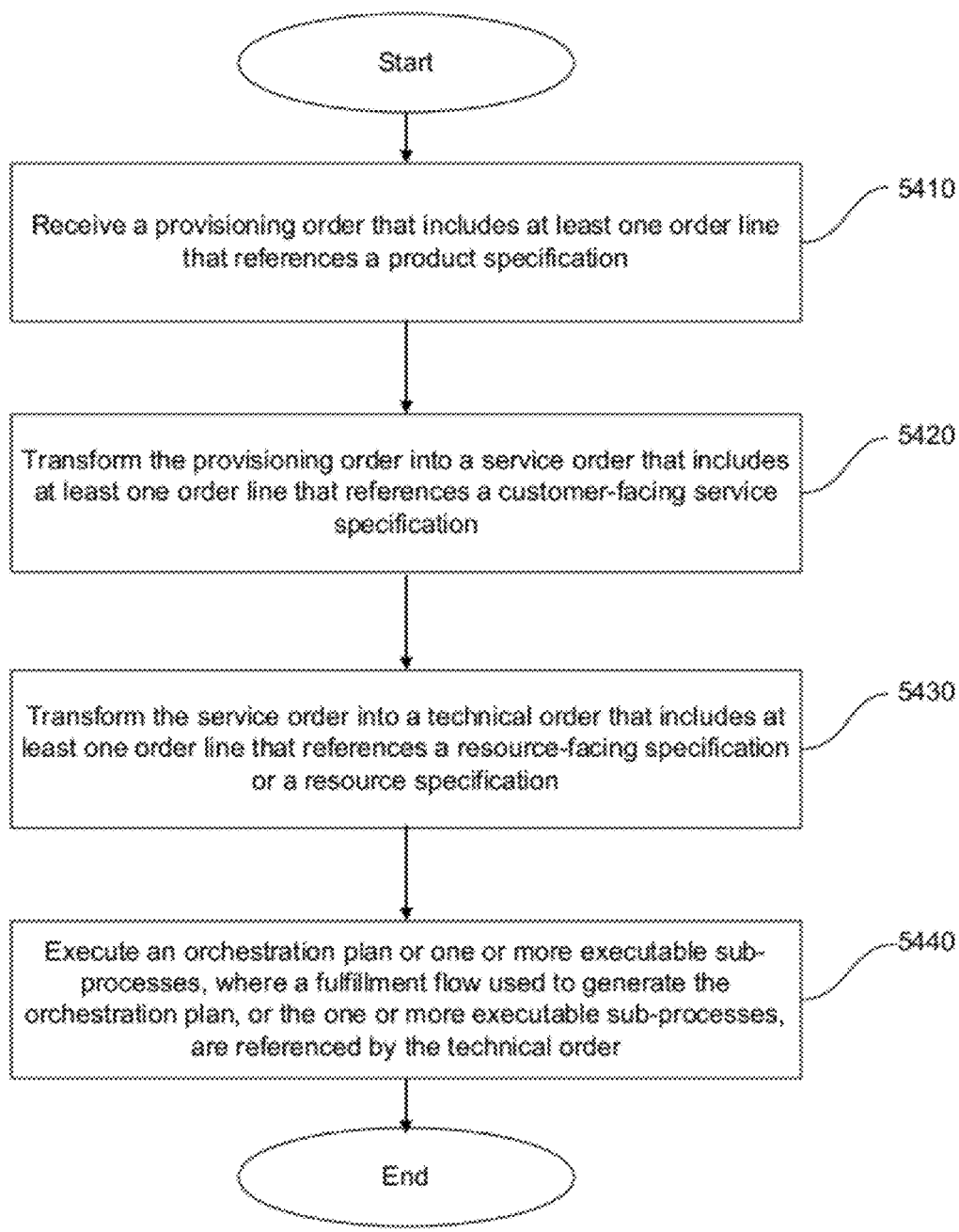
FIG. 54 illustrates another flow diagram of the functionality of an order management module, according to an embodiment of the invention.

FIG. 54 illustrates another flow diagram of the functionality of an order management module, according to an embodiment of the invention. At 5410, a provisioning order is received. The provisioning order includes at least one line that references a product specification.

At 5420, the provisioning order is transformed into a service order. The service order includes at least one order line that references a customer-facing service specification.

At 5430, the service order is transformed into a technical order. The technical order includes at least one order line that references a resource-facing service specification or a resource.

At 5440, an orchestration plan or one or more executable sub-processes, where a fulfillment flow used to generate the orchestration plan or the one or more executable sub-processes are referenced by the technical order, are executed to fulfill the technical order. In one embodiment, the transforming the provisioning order into the service order includes mapping the product specification to the customer-facing service specification, and the transforming the service order into the technical order includes mapping the customer-facing service specification at least one of the resource-facing service specification or the resource specification.

In one embodiment, the product specification can be an entity that contains data that describes a core capability that can be provided by a fulfillment provider. The customer-facing service specification can be an entity that contains data that describes a service, where the service can provide one or more core capabilities that are not technology-specific and do not include any commercial attributes. The resource-facing service specification can be an entity that describes a technical implementation that is utilized to provide the service, and that is technology-specific. The resource specification can be an entity that contains data that describes a technical resource that is utilized by the technical implementation to provide the service. According to the embodiment, the product specification, the customer-facing service specification, the resource-facing service specification, and the resource specification can each be part of a entity hierarchy stored within a product-service-resource catalog.

In one embodiment, the provisioning order is a provisioning order for services. According to an embodiment, the services are telecommunication services.

FIG. 55 illustrates an example of order perspectives, according to an embodiment of the invention. As previously described, in certain embodiments, order perspectives can be used to determine which order items (including their associated data) are available to each order component when each order component is compensated as part of a compensation plan. Using order perspectives, an order management system can determine what data is relevant and necessary for an order component in order for the order component to undo or redo its actions as part of a compensation plan. For example, when an order component performs a redo action, the order management system can use one or more order perspectives to provide the order component with access to the one or more order items on the modify order, but also to one or more order items as the one or more order items were the last time the order component was executed.

An order perspective is a view that defines one or more order items (and data that is associated with the one or more order items) that are available to an order component during compensation. In certain embodiments, there are two types of order perspectives, a historical order perspective and a contemporary order perspective. A historical order perspective is an order perspective of an order component that includes one or more order items (and associated data) from when the order component was last executed. A contemporary order perspective is an order perspective of an order component that includes a historical order perspective, one or more order items that have already been modified during compensation, and one or more order items that are to be modified by the order component as part of compensation.

As an example, an order can have three order lines, order lines 1, 2, and 3. A corresponding orchestration plan can have four order components, order components A, B, C, and D. In the example, order component A only includes order line 1, and order components B, C, and D each include all three order lines 1, 2, and 3. The order can begin executing, and can complete execution of order components A, B, and C. During the execution of order component C, one or more of order lines 1 and 2 can be modified. While the order is executing order component D, a modify order can be received for the order modifying only order line 2. This can cause a compensation plan to be generated requiring order component B to be redone as at least one of order component B's order items (i.e., order line 2) has been modified since the last time order component B was executed (which is also the first and only time order component B was executed). In order for a redo action of order component B to occur, and in order for order component B to be able to compensate for the modify order, order component B requires a contemporary order perspective, a historical order perspective, and a delta between the two order perspectives. Knowing the contemporary order perspective, the historical order perspective, and the delta between the two order perspectives, an order component can compensate for the data (i.e., order items) that have changed. Thus, in the example, given that order line 2 has been modified, but order line 1 has not been modified, order component B can compensate for order line 2 (such as only updating externals systems that are affected by order line 2), and thus, ensuring compensation is done efficiently.

Furthermore, in the example, both the contemporary order perspective and the historical order perspective exclude the modifications made by order component C to order lines 2 and 3 that are subsequent to the execution of order component B. During a redo action of order component B, order component B can only view the data that was modified up to the point of where the orchestration plan has executed. Order component B cannot view order component C's modifications to order lines 1 and 2 because, from a perspective of order component B, order component C's modifications have not happened yet. When order component B was originally executed, order component C had not been executed yet, and thus, order component B would not have been able to view order component C's modifications to order lines 1 and 2. Thus, for order component B to be able to compensate properly for the modifications between when order component B originally executed and the current modify order, all modifications to data visible to order component B that occurred subsequent to the previous execution of order component B are excluded from all order perspectives of order component B. Through the use of order perspectives, compensation is not contaminated with any modifications to data visible to an order component that occurred subsequent to any previous execution of the order component.

The illustrated embodiment of FIG. 55 provides another example of order perspectives. In the illustrated embodiment of FIG. 55, each row represents a timeline of an execution of an orchestration plan for an order. More specifically, FIG. 55 illustrates a timeline of an execution of an orchestration plan corresponding to an order 5110, and comprising order component A 5511, order component B 5512, order component C 5513, order component D 5514, and order component E 5515. FIG. 55 further illustrates a timeline of an execution of a modify order orchestration plan corresponding to first modify order 5520, and comprising order component A 5521, order component B 5522, order component C 5523, order component D 5524, and order component E 5525. FIG. 55 further illustrates a timeline of an execution of a modify order orchestration plan corresponding to second modify order 5530, and comprising order component A 5531, order component B 5532, order component C 5533, order component D 5534, and order component E 5535. FIG. 55 further illustrates a timeline of an execution of a modify order orchestration plan corresponding to third modify order 5540, and comprising order component A 5541, order component B 5542, order component C 5543, order component D 5544, and order component E 5545. FIG. 55 further illustrates a timeline of an execution of a modify order orchestration plan corresponding to fourth modify order 5550, and comprising order component A 5551, order component B 5552, order component C 5553, order component D 5554, and order component E 5555.

In the illustrated embodiment, each cell identifies boundaries on what order items (and associated data) are visible to the identified order component at that point in time. Furthermore, each order component in each cell can only view the order items (and associated data) corresponding to that specific cell, and any cell that is either to the left or below the specific cell. For example, order component C 5533 can only view the order items (and associated data) corresponding to the cells highlighted in gray (specifically, the cells that correspond to order component A 5511, order component B 5512, order component C 5513, order component A 5521, order component B 5522, order component C 5523, order component A 5531, order component B 5532, and order component C 5533). In the example, the order items (and associated data) corresponding to all other cells are excluded from order component C 5533's view.

Thus, in the example, a contemporary order perspective for order component C 5533 would include the cells highlighted in gray (specifically, the cells that correspond to order component A 5511, order component B 5512, order component C 5513, order component A 5521, order component B 5522, order component C 5523, order component A 5531, order component B 5532, and order component C 5533). Furthermore, a historical order perspective would only include the cells that correspond to order component A 5511, order component B 5512, order component C 5513, order component A 5521, order component B 5522, and order component C 5523. Using the contemporary order perspective, the historical order perspective, and a delta between the two perspectives, an order management system can generate a modify order orchestration plan that can compensate for order component C based on one or more order items (and associated data) available to order component C, without contamination of one or more order items that are not available to order component C. Furthermore, such compensation can be done for the other order components (i.e., order components A, B, D, and E), accordingly for each of the modify orders.

Thus, according to one embodiment, one or more dependencies of a fulfillment flow can be applied to one or more order components to generate an orchestration plan for managing a fulfillment of an order. Thus, according to the embodiment, the orchestration plan generation process can make it easier to model, configure, and implement order fulfillment at many levels. Furthermore, fulfillment flows can be much more simpler, more efficient, and provide the necessary flexibility to match ever-changing business requirements.

In another embodiment, a decomposition sequence can be executed to partition an order into one or more order components. According to the embodiment, the decomposition sequence can make it easier to model, configure, and implement a transformation of an order entity from a source hierarchy to a target hierarchy. Furthermore, the decomposition sequence can allow for a cleaner separation of issues that arise with transformation, as each level of transformation is implemented in a separate stage of the decomposition sequence.

In another embodiment, change management of an in-flight order can be performed. According to the embodiment, effort and time spent on modeling complex solutions or manual processes to handle changes to in-flight orders can be reduced, resulting in significant cost savings. Furthermore, customer satisfaction can be increased, as an order management system can efficiently respond to customers changing their mind after placing an order that is still being fulfilled.

In another embodiment, a fulfillment flow can be decoupled from a fulfillment topology. According to the embodiment, a fulfillment flow can be kept from being contaminated with fulfillment topology specifics. As a result, fulfillment flows can be simpler, faster to build, and more reusable. Furthermore, decoupling the fulfillment topology information from fulfillment flows can allow an order management system to respond to significant changes in fulfillment topology, such as mergers, acquisitions, and infrastructure consolidation of fulfillment providers.

In another embodiment, a service can be decoupled from a technical implementation used to provision the service. This technical decoupling can provide advantages for defining fulfillment flows. More specifically, in an entity hierarchy, a number of customer-facing service specifications is generally the fewest out of all the entities in the hierarchy. Thus, significantly fewer fulfillment flows are required in an order management system due to the reduced number of customer-facing service specifications. In addition, a customer-facing service specification generally has the most complex design processing. Thus, a significantly fewer number of customer-facing service specifications can result in significant savings in design time and processing time of an order management system. Thus, an order management system can provision orders more efficiently. Furthermore, the technical decoupling enables providers to upgrade their infrastructure to take advantage of newer technologies with a very localized impact to a small portion of their implementation.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A computer-readable medium having instructions stored thereon that, when executed by a processor, cause the processor to decompose an order, the decomposing comprising:

defining a decomposition sequence comprising computer-readable logic that decomposes an order, wherein the decomposition sequence further comprises a plurality of decomposition stages and a plurality of criteria, and wherein each decomposition stage comprises at least a portion of the computer-readable logic;

electronically receiving, at an order management system, the order from an order capture system using a computer network, the order comprising one or more order lines, fulfillment topology data, and fulfillment flow data;

defining one or more dependencies between the plurality of decomposition stages;

determining an execution order of the plurality of decomposition stages based on the one or more dependencies; and partitioning one or more order components from the order, the fulfilment topology data, and the fulfillment flow data using the decomposition sequence, wherein the plurality of decomposition stages are executed according to the execution order of the plurality of decomposition stages.

2. The computer-readable medium of claim 1, the generating the one or more order components comprising:
   receiving, at each decomposition stage, an input comprising the order or one or more order components generated by a predecessor decomposition stage;
   partitioning, at each decomposition stage, the input into one or more order components based on a criteria selected from the plurality of criteria;
   determining, at each decomposition stage, which of the one or more partitioned order components the one or more order lines of the order are to be applied to, based on the criteria selected from the plurality of criteria; and
   storing, at each decomposition stage, the one or more order lines of the order at the determined one or more order components.

3. The computer-readable medium of claim 2, the generating the one or more order components comprising:
   generating one or more first order components from the order, the fulfillment topology data, and the fulfillment flow data based on a first criteria, wherein the first criteria is based on a first stage of the decomposition sequence, wherein the decomposition sequence comprises one or more stages;
   determining which of the one or more first order components each order line of the order is to be applied to, based on the first criteria;
   storing each order line of the order at each of the determined one or more first order components;
   generating one or more second order components from the one or more first order components, the fulfillment topology data, and the fulfillment flow data based on a second criteria, wherein the second criteria is based on a second stage of the decomposition sequence;
   determining which of the one or more second order components each order line of each first order component is to be applied to, based on the second criteria;
   storing each order line of each first order component at each of the determined one or more second order components;
   generating one or more third order components from the one or more second order components, the fulfillment topology data, and the fulfillment flow data based on a third criteria, wherein the third criteria is based on a third stage of the decomposition sequence;
   determining which of the one or more third order components each order line of each second order component is to be applied to, based on the third criteria; and
   storing each order line of each second order component at each of the determined one or more third order components.

4. The computer-readable medium of claim 3, wherein the first criteria comprises a fulfillment function;
   wherein the second criteria comprises a fulfillment provider; and
   wherein the third criteria comprises a processing granularity.

5. The computer-readable medium of claim 1, wherein the decomposition sequence utilizes decomposition metadata that comprises fulfillment topology information.

6. The computer-readable medium of claim 1, wherein the order comprises an order for services.

7. The computer-readable medium of claim 6, wherein the services comprise telecommunication services.

8. A computer-implemented method, comprising:
   defining a decomposition sequence comprising computer-readable logic that decomposes an order, wherein the decomposition sequence further comprises a plurality of decomposition stages and a plurality of criteria, and wherein each decomposition stage comprises at least a portion of the computer-readable logic;
   electronically receiving, at an order management system, the order from an order capture system using a computer network, the order comprising one or more order lines, fulfillment topology data, and fulfillment flow data;
   defining one or more dependencies between the plurality of decomposition stages;
   determining an execution order of the plurality of decomposition stages based on the one or more dependencies; and
   partitioning one or more order components from the order, the fulfilment topology data, and the fulfillment flow data using the decomposition sequence, wherein the plurality of decomposition stages are executed according to the execution order of the plurality of decomposition stages.

9. The computer-implemented method of claim 8, the generating the one or more order components comprising:
   receiving, at each decomposition stage, an input comprising the order or one or more order components generated by a predecessor decomposition stage;
   partitioning, at each decomposition stage, the input into one or more order components based on a criteria selected from the plurality of criteria;
   determining, at each decomposition stage, which of the one or more partitioned order components the one or more order lines of the order are to be applied to, based on the criteria selected from the plurality of criteria; and
   storing, at each decomposition stage, the one or more order lines of the order at the determined one or more order components.

10. The computer-implemented method of claim 9, the generating the one or more order components comprising:
    generating one or more first order components from the order, the fulfillment topology data, and the fulfillment flow data based on a first criteria, wherein the first criteria is based on a first stage of the decomposition sequence, wherein the decomposition sequence comprises one or more stages;
    determining which of the one or more first order components each order line of the order is to be applied to, based on the first criteria;
    storing each order line of the order at each of the determined one or more first order components;
    generating one or more second order components from the one or more first order components, the fulfillment topology data, and the fulfillment flow data based on a second criteria, wherein the second criteria is based on a second stage of the decomposition sequence;
    determining which of the one or more second order components each order line of each first order component is to be applied to, based on the second criteria;
    storing each order line of each first order component at each of the determined one or more second order components;
    generating one or more third order components from the one or more second order components, the fulfillment topology data, and the fulfillment flow data based on a third criteria, wherein the third criteria is based on a third stage of the decomposition sequence;

determining which of the one or more third order components each order line of each second order component is to be applied to, based on the third criteria; and storing each order line of each second order component at each of the determined one or more third order components.

11. The computer-implemented method of claim 10, wherein the first criteria comprises a fulfillment function;
wherein the second criteria comprises a fulfillment provider; and
wherein the third criteria comprises a processing granularity.

12. The computer-implemented method of claim 8, wherein the decomposition sequence utilizes decomposition metadata that comprises fulfillment topology information.

13. The computer-implemented method of claim 8, wherein the order comprises an order for services.

14. The computer-implemented method of claim 13, wherein the services comprise telecommunication services.

15. An order management system, comprising:
a decomposition sequence definer that defines a decomposition sequence comprising computer-readable logic that decomposes an order, wherein the decomposition sequence further comprises a plurality of decomposition stages and a plurality of criteria, and wherein each decomposition stage comprises at least a portion of the computer-readable logic;
an order receiver that electronically receives, at the order management system, the order from an order capture system using a computer network, the order comprising one or more order lines fulfillment topology data, and fulfillment flow data;
a dependency definer that defines one or more dependencies between the plurality of decomposition stages;
an order determining unit that determines an execution order of the plurality of decomposition stages based on the one or more dependencies; and
an order component generator that partitions one or more order components from the order, the fulfilment topology data, and the fulfillment flow data using the decomposition sequence, wherein the plurality of decomposition stages are executed according to the execution order of the plurality of decomposition stages.

16. The order management system of claim 15, further comprising:
an input receiver that receives, at each decomposition stage, an input comprising the order or one or more order components generated by a predecessor decomposition stage;
an input partitioning unit that partitions, at each decomposition stage, the input into one or more order components based on a criteria selected from the plurality of criteria;
a determining unit that determines, at each decomposition stage, which of the one or more partitioned order components the one or more order lines of the order are to be applied to, based on the criteria selected from the plurality of criteria; and
a storing unit that stores, at each decomposition stage, the one or more order lines of the order at the determined one or more order components.

17. The order management system of claim 16,
wherein the order component generator further generates one or more first order components from the order, the fulfillment topology data, and the fulfillment flow data based on a first criteria, wherein the first criteria is based on a first stage of the decomposition sequence, wherein the decomposition sequence comprises one or more stages;
wherein the determining unit further determines which of the one or more first order components each order line of the order is to be applied to, based on the first criteria; and
wherein the storing unit further stores each order line of the order at each of the determined one or more first order components;
wherein the order component generator further generates one or more second order components from the one or more first order components, the fulfillment topology data, and the fulfillment flow data based on a second criteria, wherein the second criteria is based on a second stage of the decomposition sequence;
wherein the determining unit further determines which of the one or more second order components each order line of each first order component is to be applied to, based on the second criteria; and
wherein the storing unit further stores each order line of each first order component at each of the determined one or more second order components;
wherein the order component generator further generates one or more third order components from the one or more second order components, the fulfillment topology data, and the fulfillment flow data based on a third criteria, wherein the third criteria is based on a third stage of the decomposition sequence;
wherein the determining unit further determines which of the one or more third order components each order line of each second order component is to be applied to, based on the third criteria; and
wherein the storing unit further stores each order line of each second order component at each of the determined one or more third order components.

18. The order management system of claim 17, wherein the first criteria comprises a fulfillment function;
wherein the second criteria comprises a fulfillment provider; and
wherein the third criteria comprises a processing granularity.

19. The order management system of claim 15, wherein the decomposition sequence utilizes decomposition metadata that comprises fulfillment topology information.

20. The order management system of claim 15, wherein the order comprises an order for telecommunications services.

* * * * *